Figure 1:
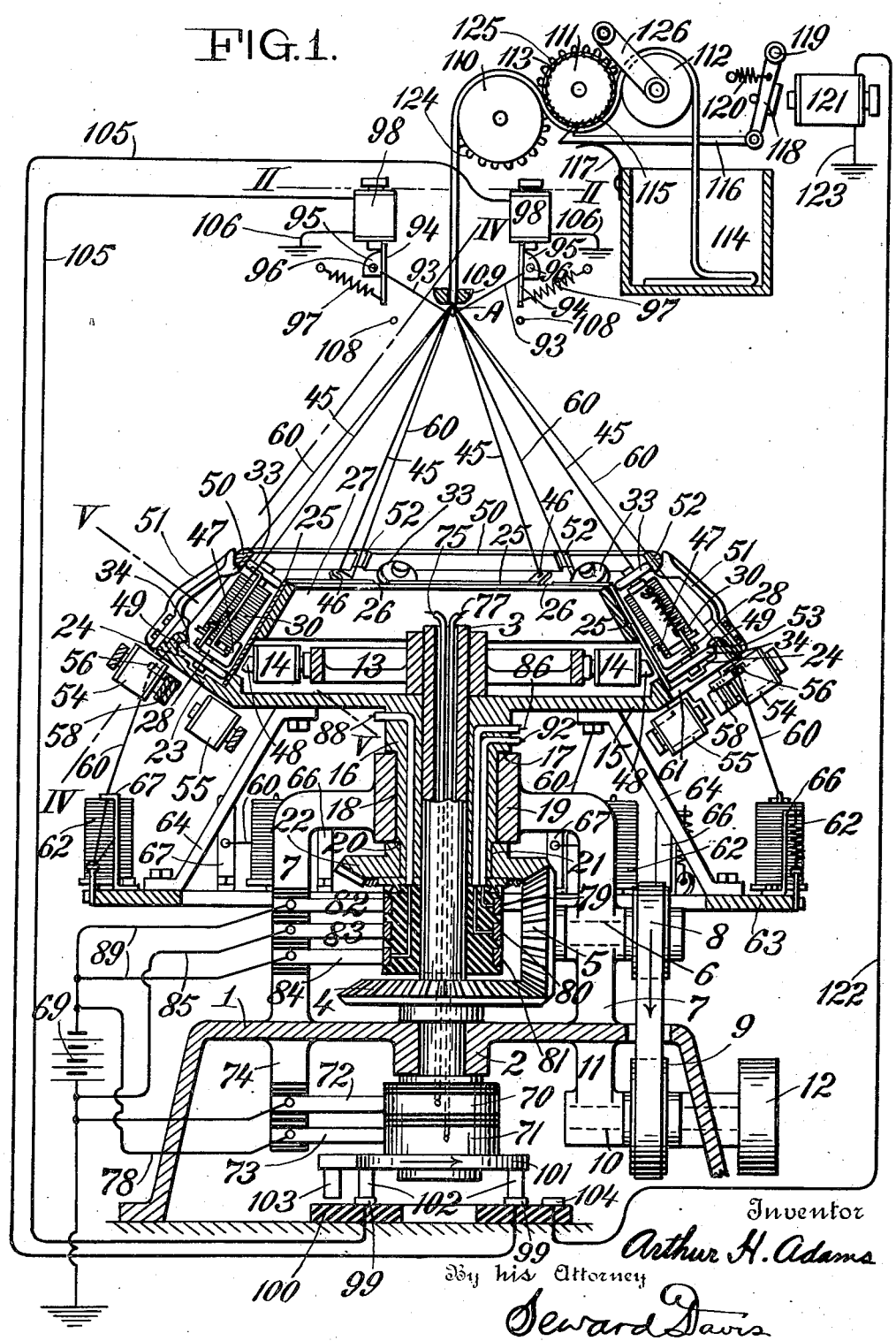

April 29, 1924.

A. H. ADAMS 1,491,839

ELECTROMAGNETIC BRAIDING MACHINE

Filed Jan. 31, 1916     23 Sheets-Sheet 1

Inventor
Arthur H. Adams
By his Attorney
Seward Davis

April 29, 1924.

A. H. ADAMS 1,491,839

ELECTROMAGNETIC BRAIDING MACHINE

Filed Jan. 31, 1916   23 Sheets-Sheet 2

Inventor
Arthur H. Adams
By his Attorney
Seward Davis

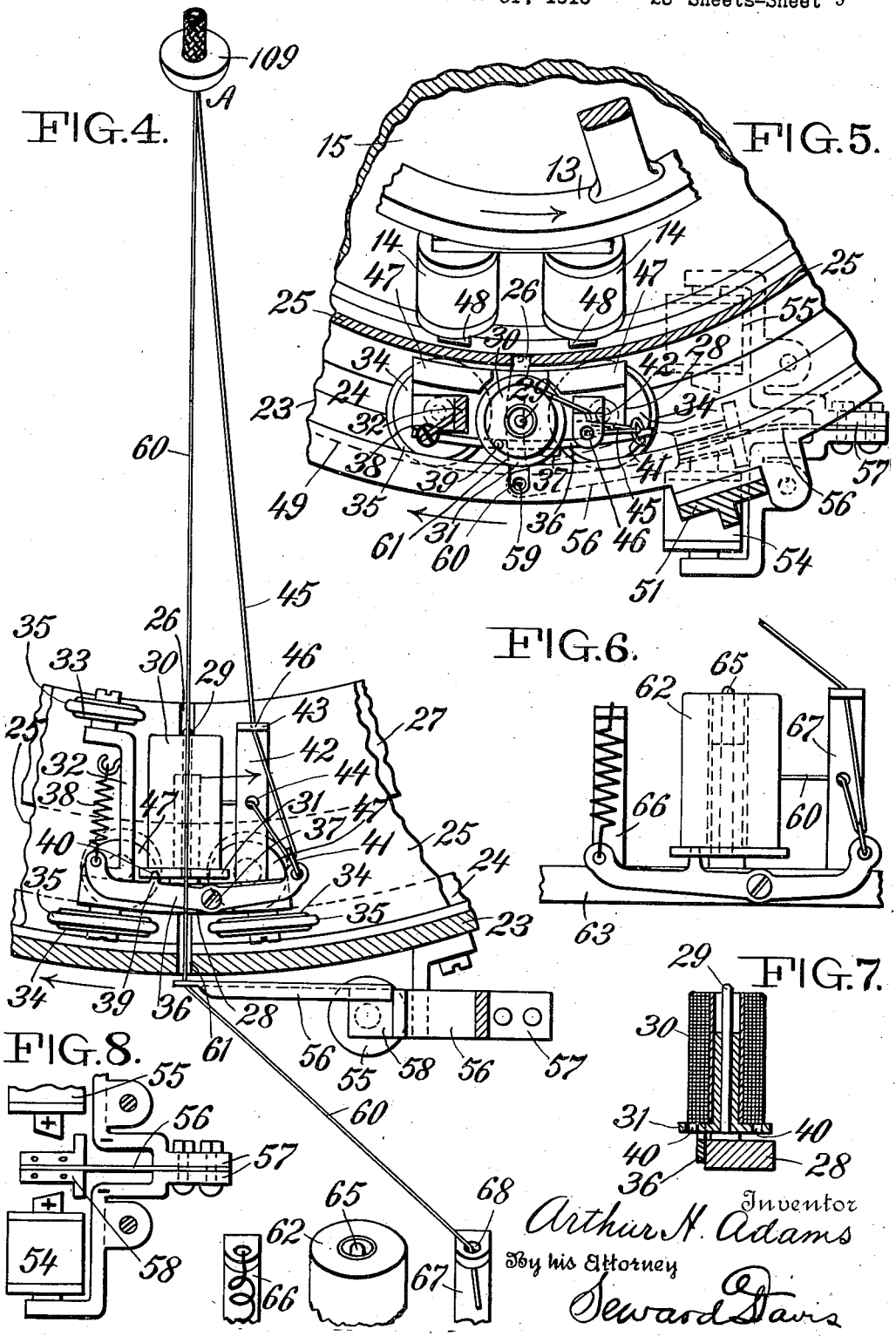

April 29, 1924.

A. H. ADAMS 1,491,839

ELECTROMAGNETIC BRAIDING MACHINE

Filed Jan. 31, 1916    23 Sheets-Sheet 4

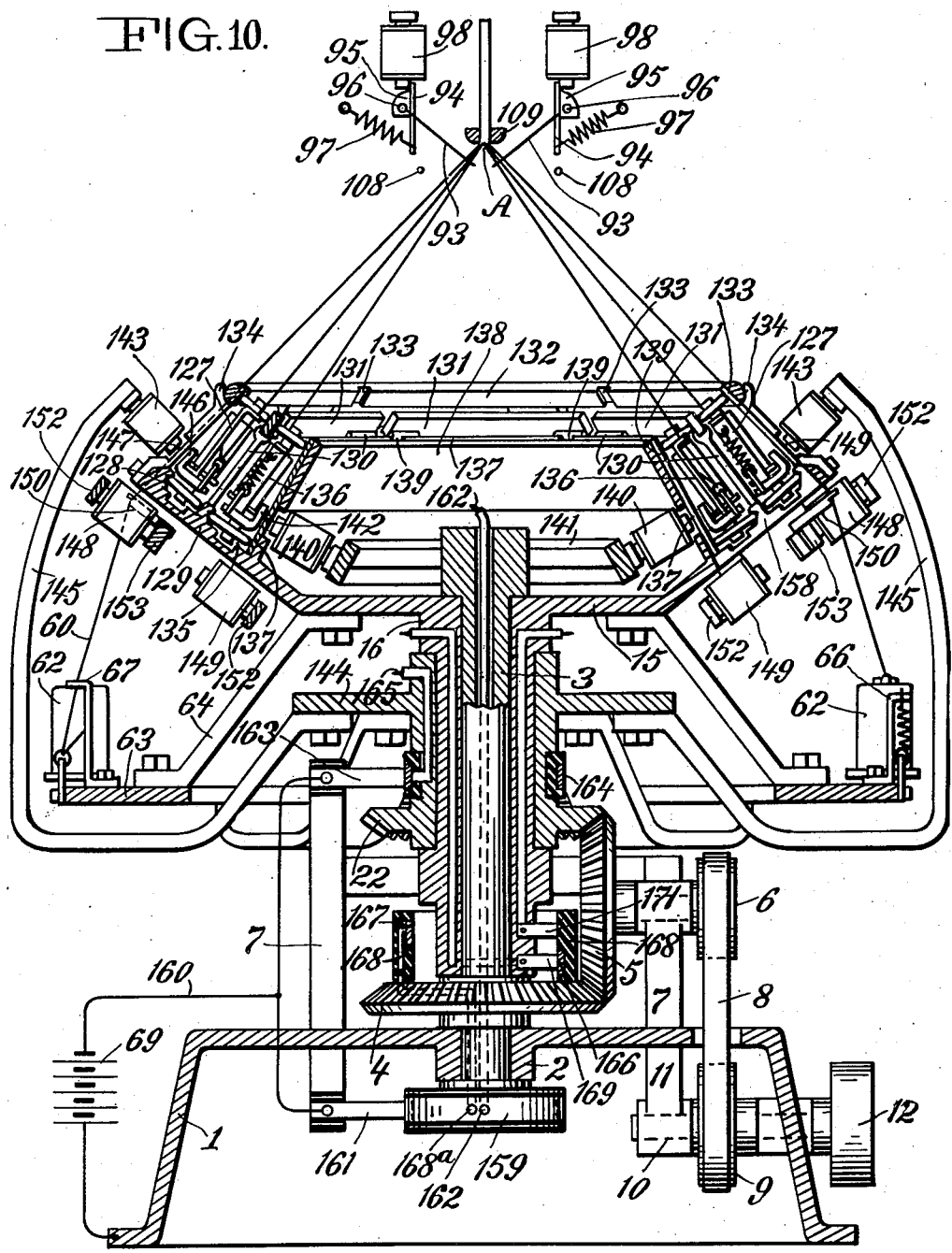

April 29, 1924.
A. H. ADAMS
1,491,839
ELECTROMAGNETIC BRAIDING MACHINE
Filed Jan. 31, 1916  23 Sheets-Sheet 6
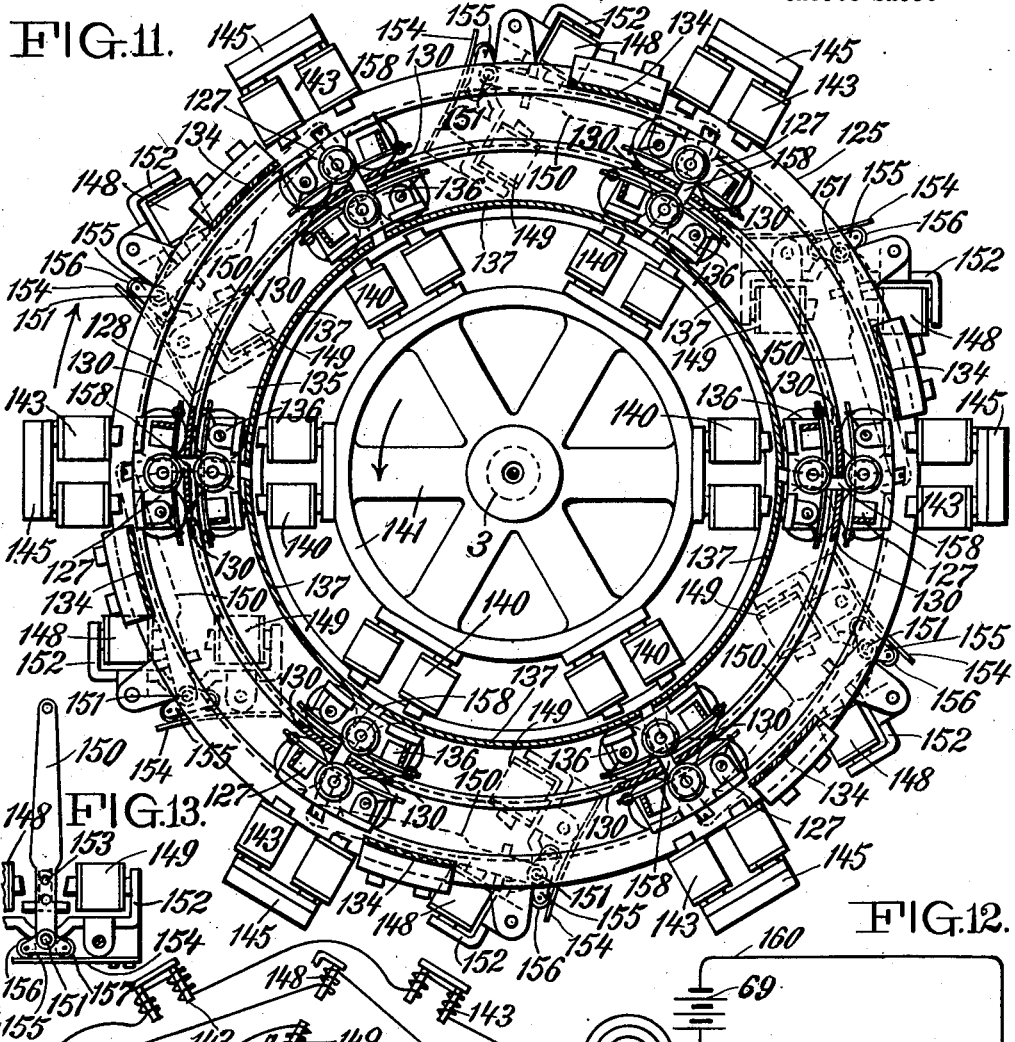
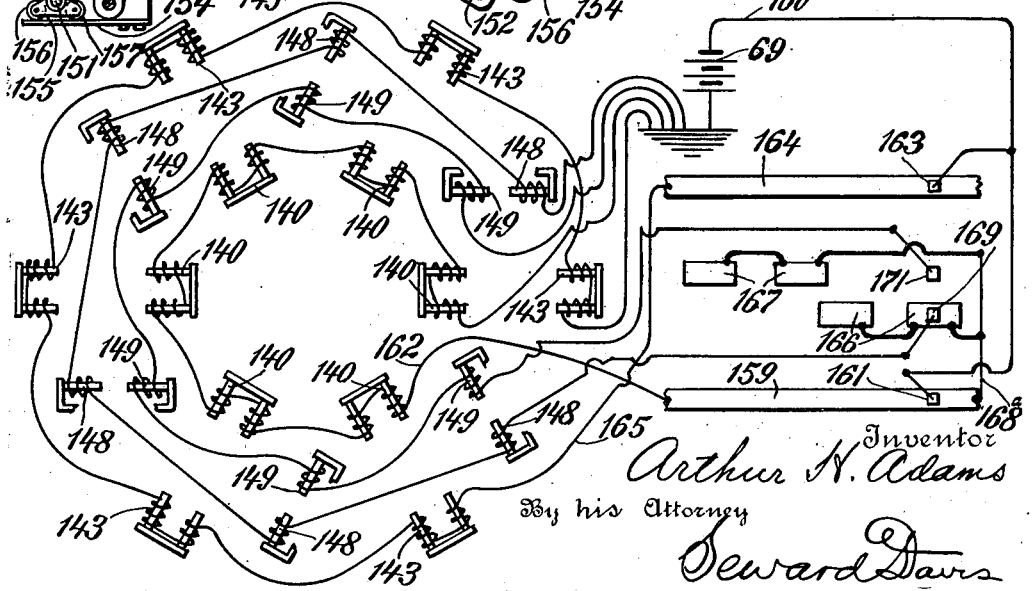
Inventor
Arthur H. Adams
By his Attorney
Seward Davis April 29, 1924.

A. H. ADAMS 1,491,839

ELECTROMAGNETIC BRAIDING MACHINE

Filed Jan. 31, 1916 23 Sheets-Sheet 7

Inventor
Arthur H. Adams
By his Attorney
Seward Davis

April 29, 1924.

A. H. ADAMS 1,491,839

ELECTROMAGNETIC BRAIDING MACHINE

Filed Jan. 31, 1916 23 Sheets-Sheet 9

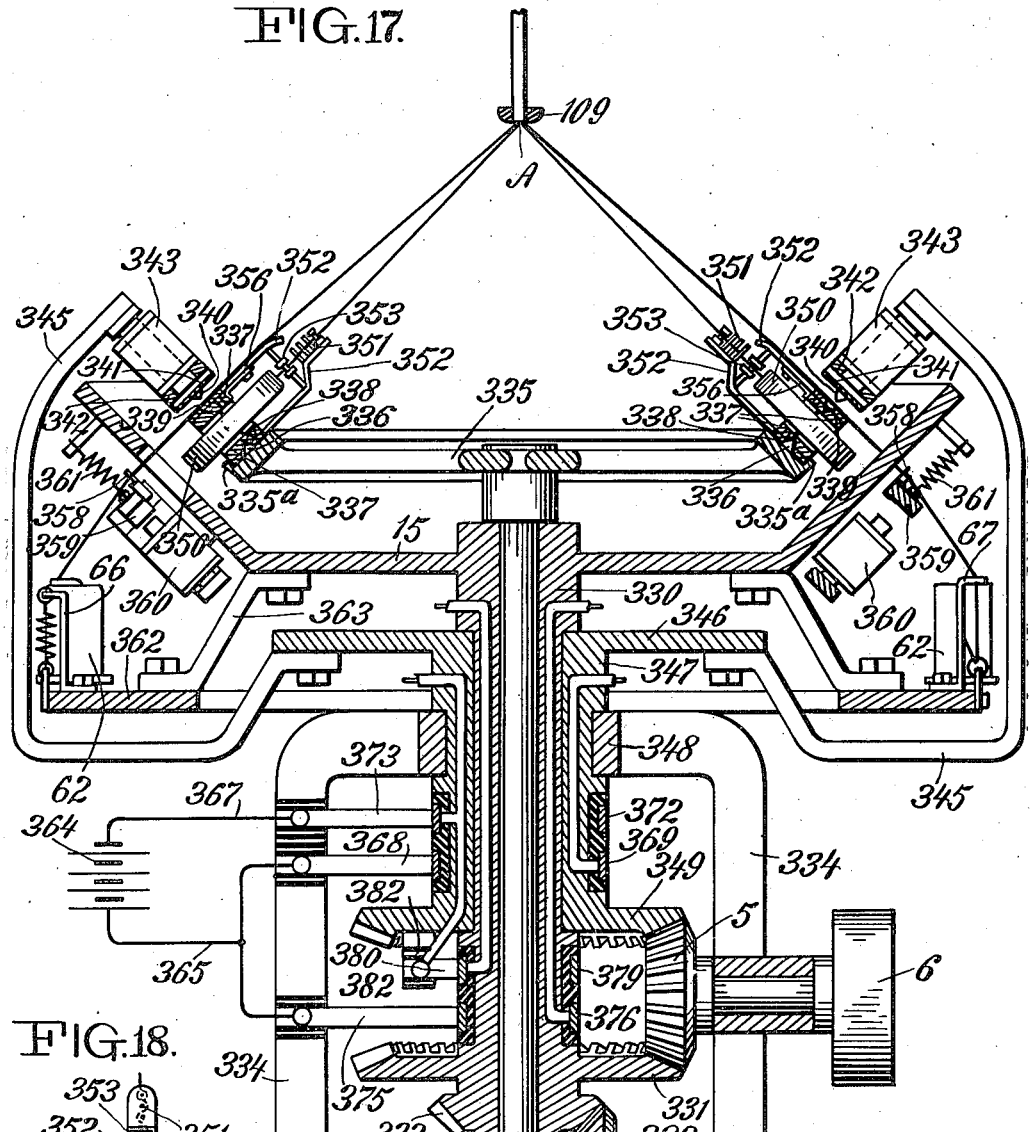

April 29, 1924.

A. H. ADAMS 1,491,839

ELECTROMAGNETIC BRAIDING MACHINE

Filed Jan. 31, 1916    23 Sheets-Sheet 11

Inventor
Arthur H. Adams
By his Attorney
Seward Davis

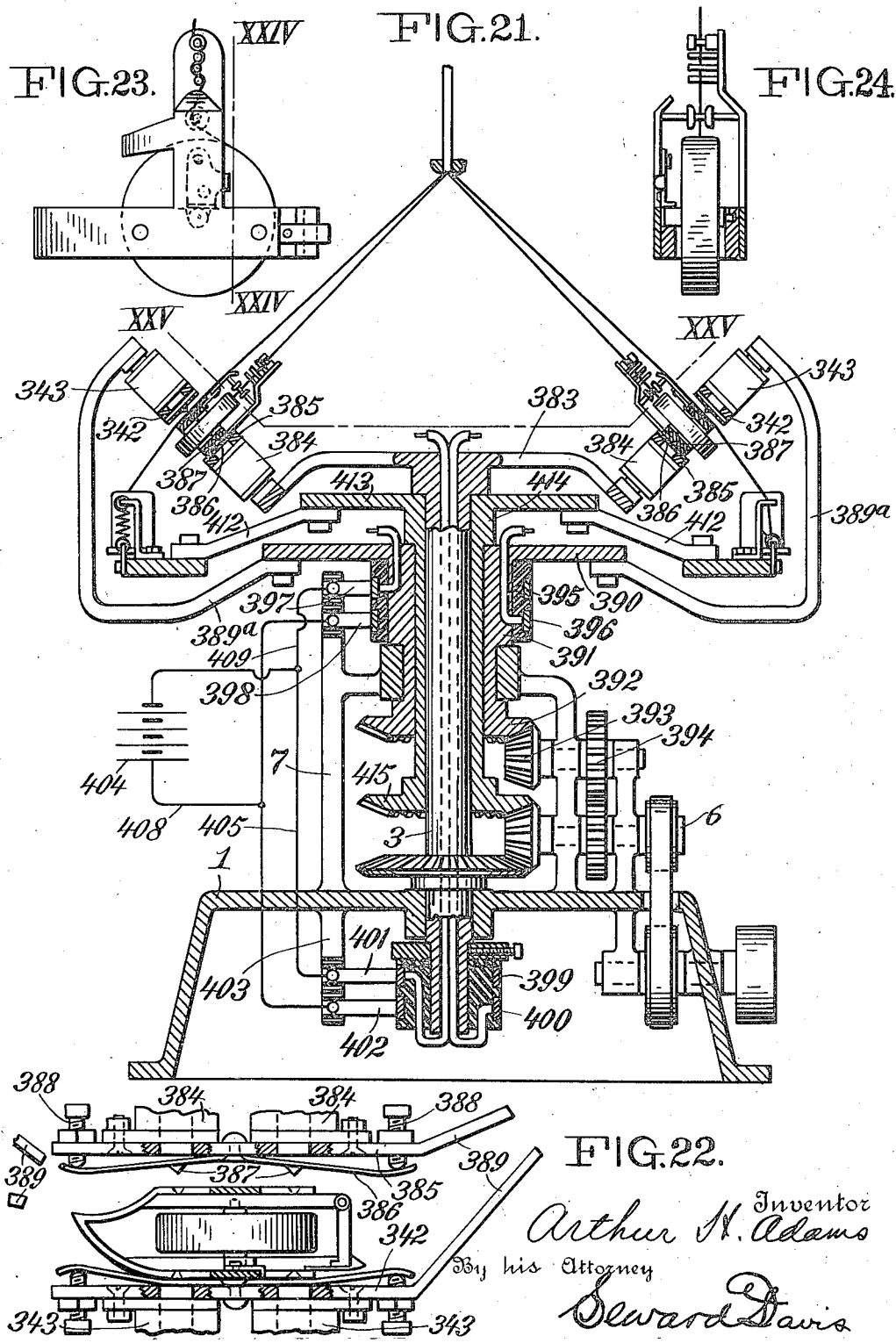

April 29, 1924.
A. H. ADAMS
1,491,839
ELECTROMAGNETIC BRAIDING MACHINE
Filed Jan. 31, 1916     23 Sheets-Sheet 13
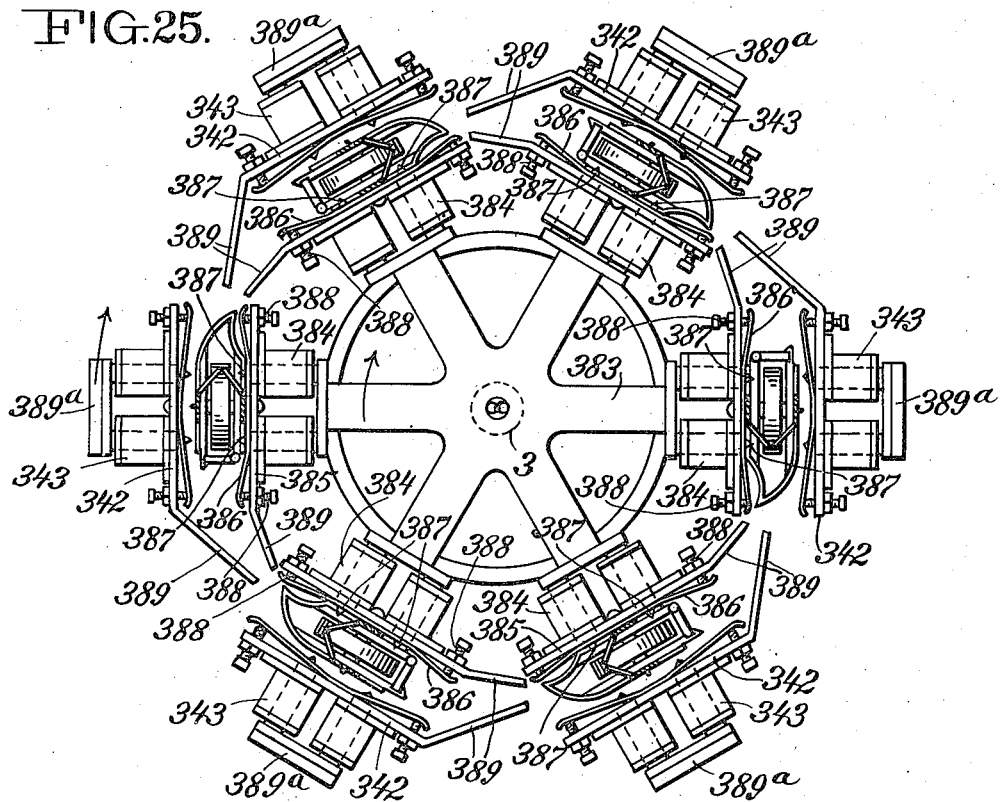
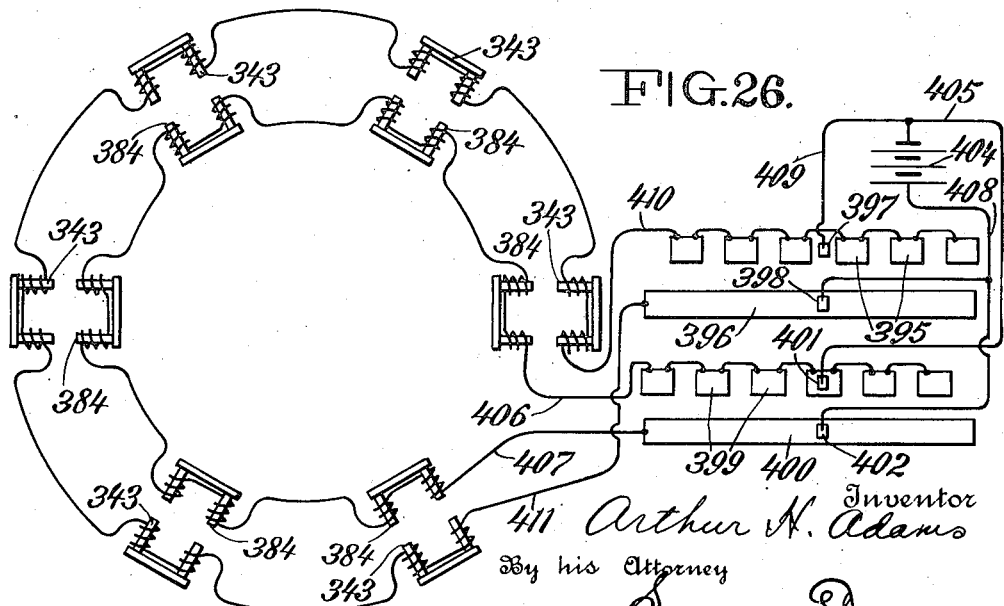
Inventor
Arthur H. Adams
By his Attorney
Seward Davis

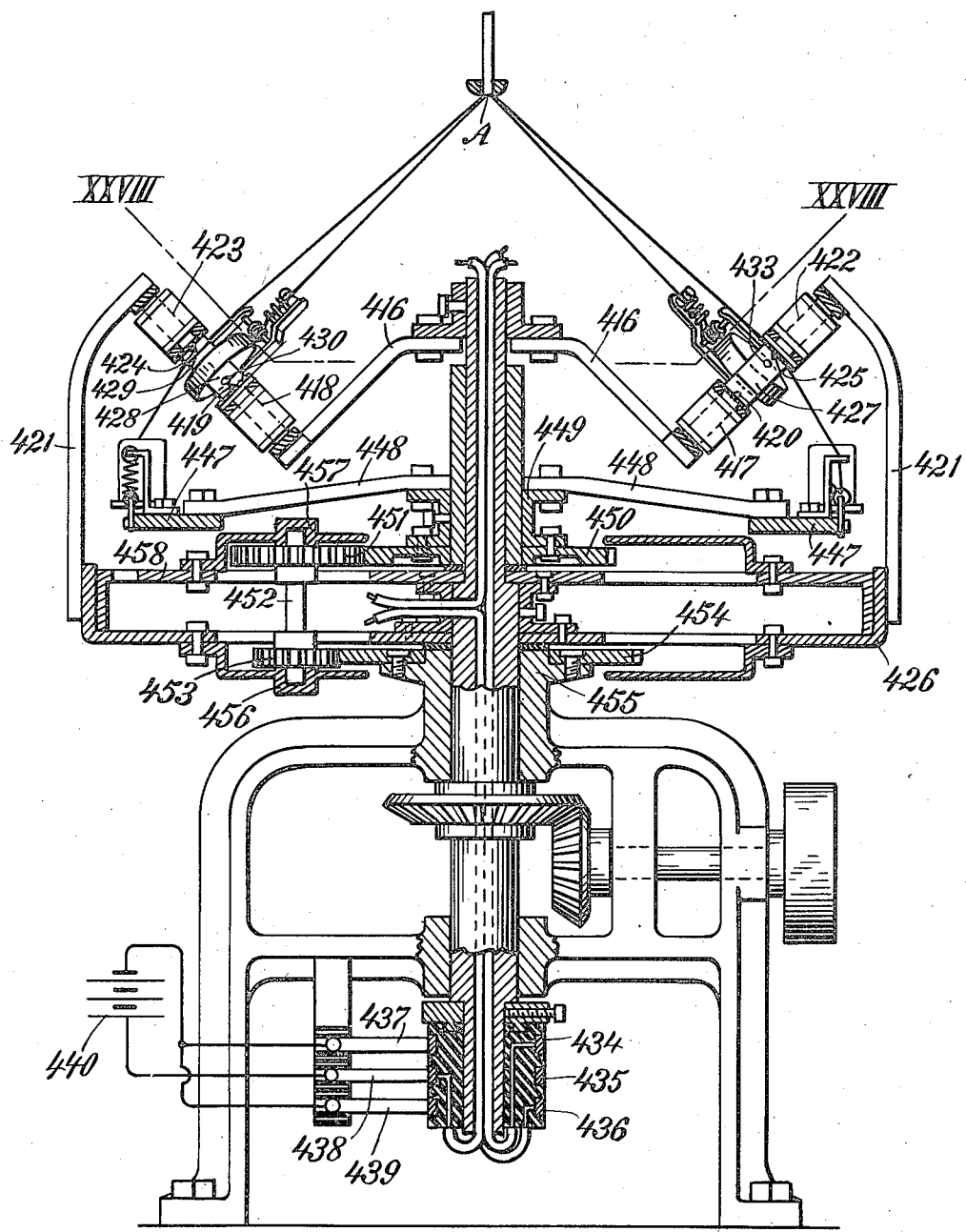

April 29, 1924.
A. H. ADAMS
1,491,839
ELECTROMAGNETIC BRAIDING MACHINE
Filed Jan. 31, 1916  23 Sheets-Sheet 15
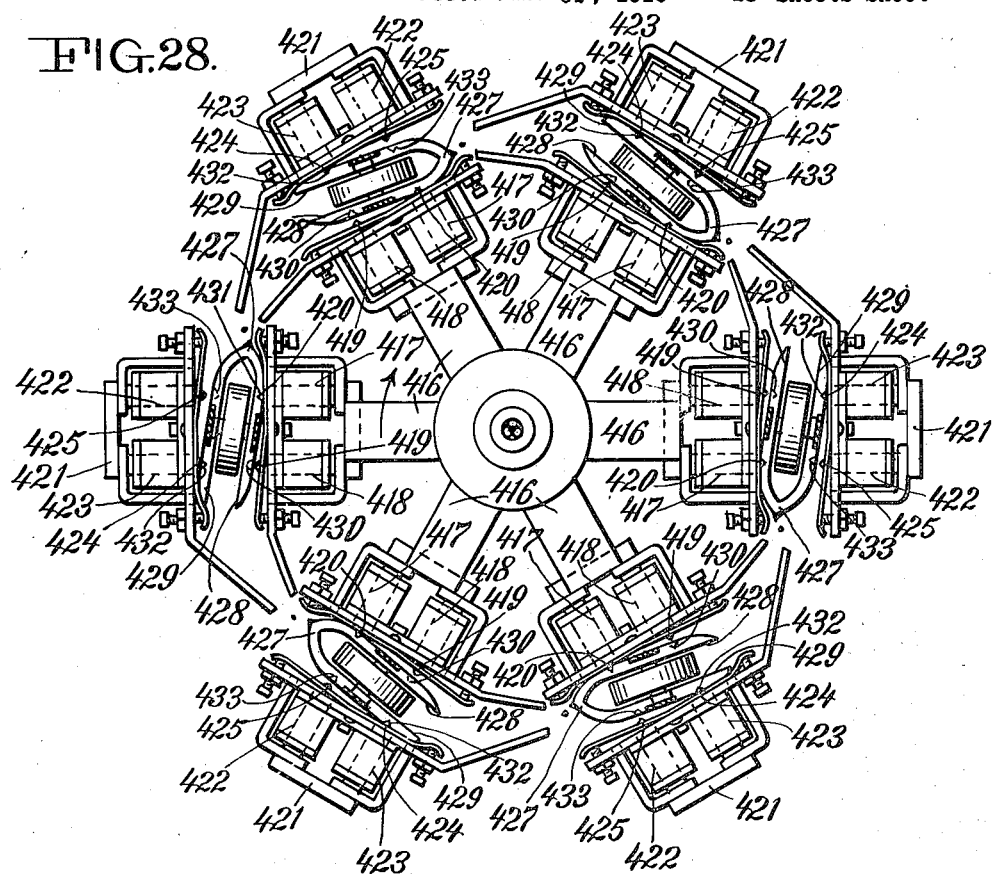
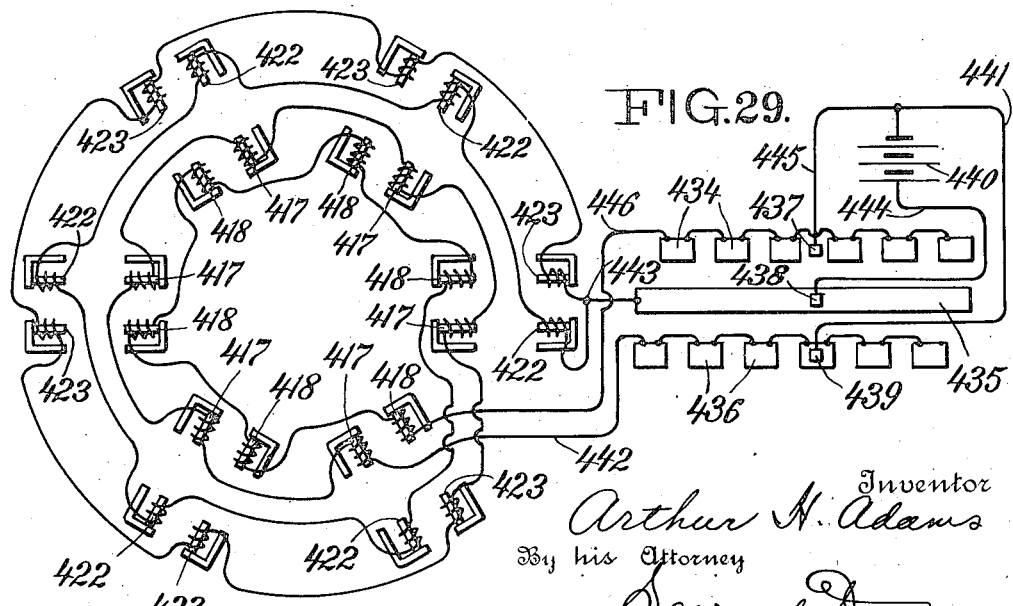
Inventor
Arthur H. Adams
By his Attorney
Seward Davis

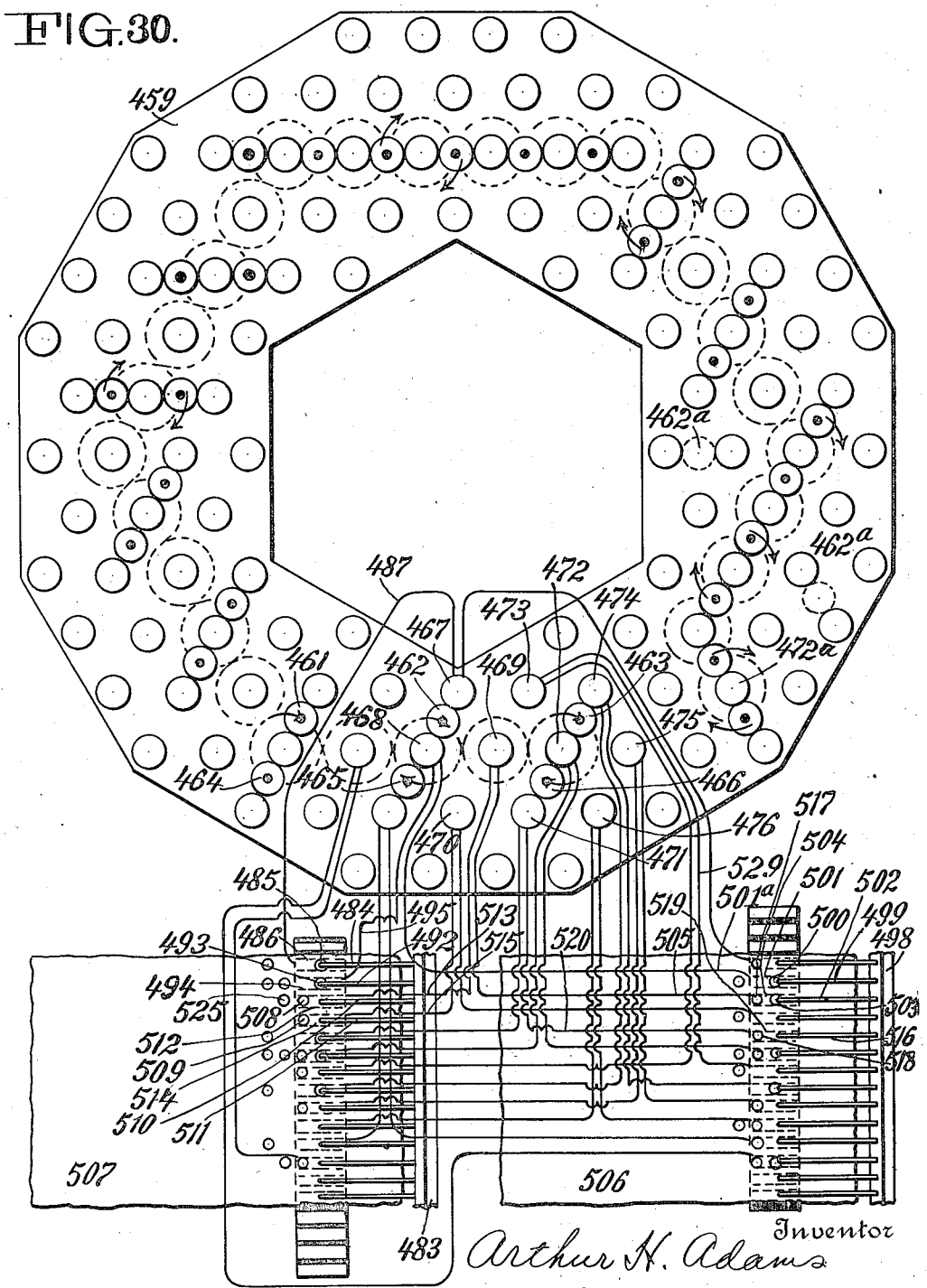

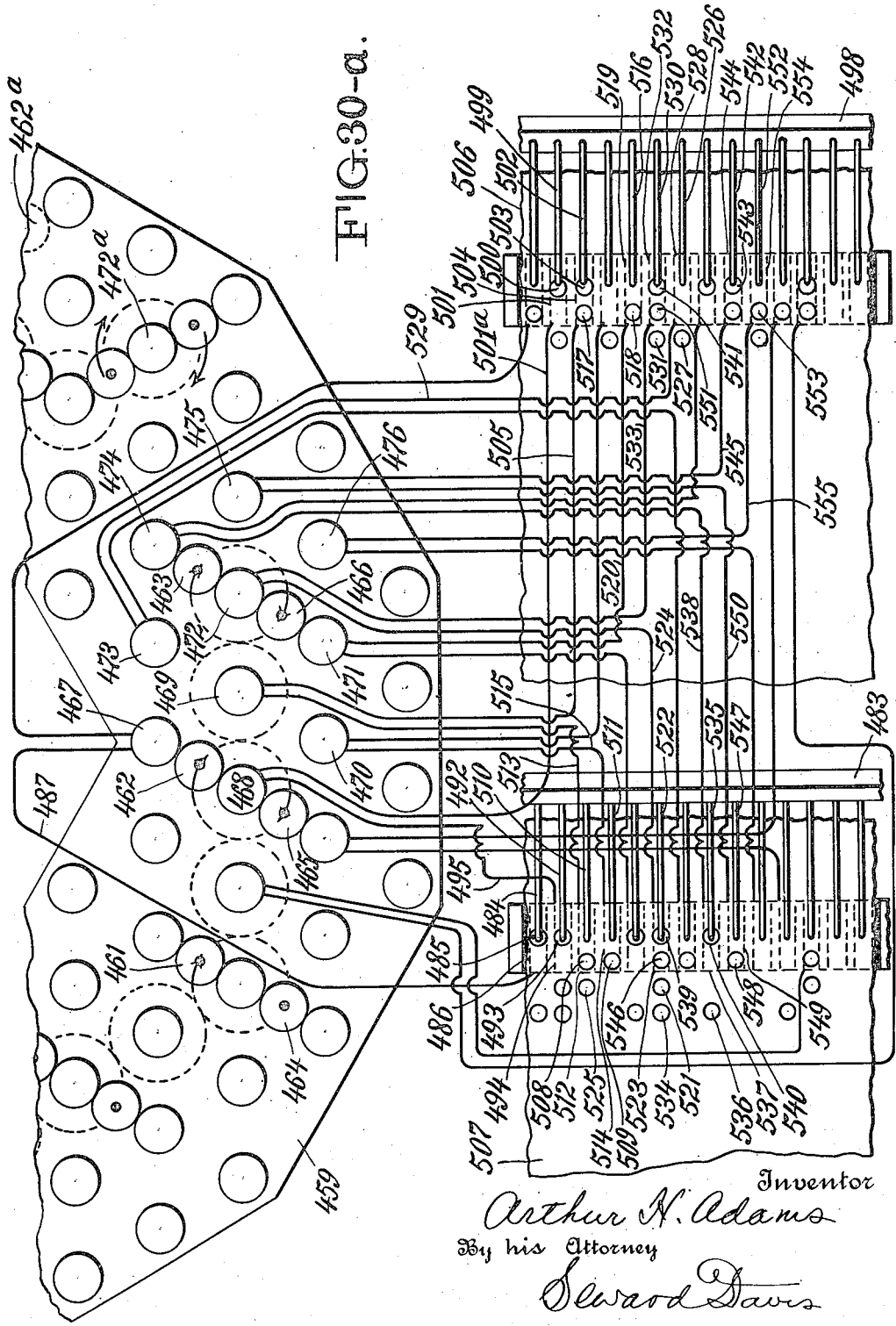

April 29, 1924.
A. H. ADAMS
1,491,839
ELECTROMAGNETIC BRAIDING MACHINE
Filed Jan. 31, 1916     23 Sheets-Sheet 18
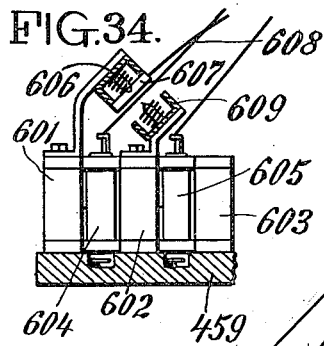
FIG.34.
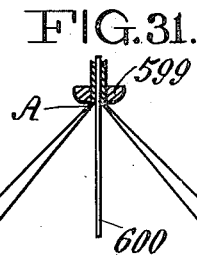
FIG.31.
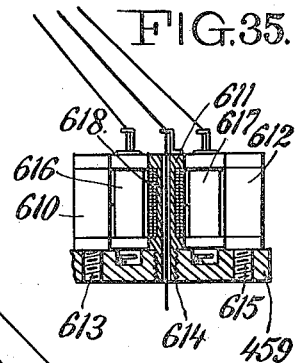
FIG.35.
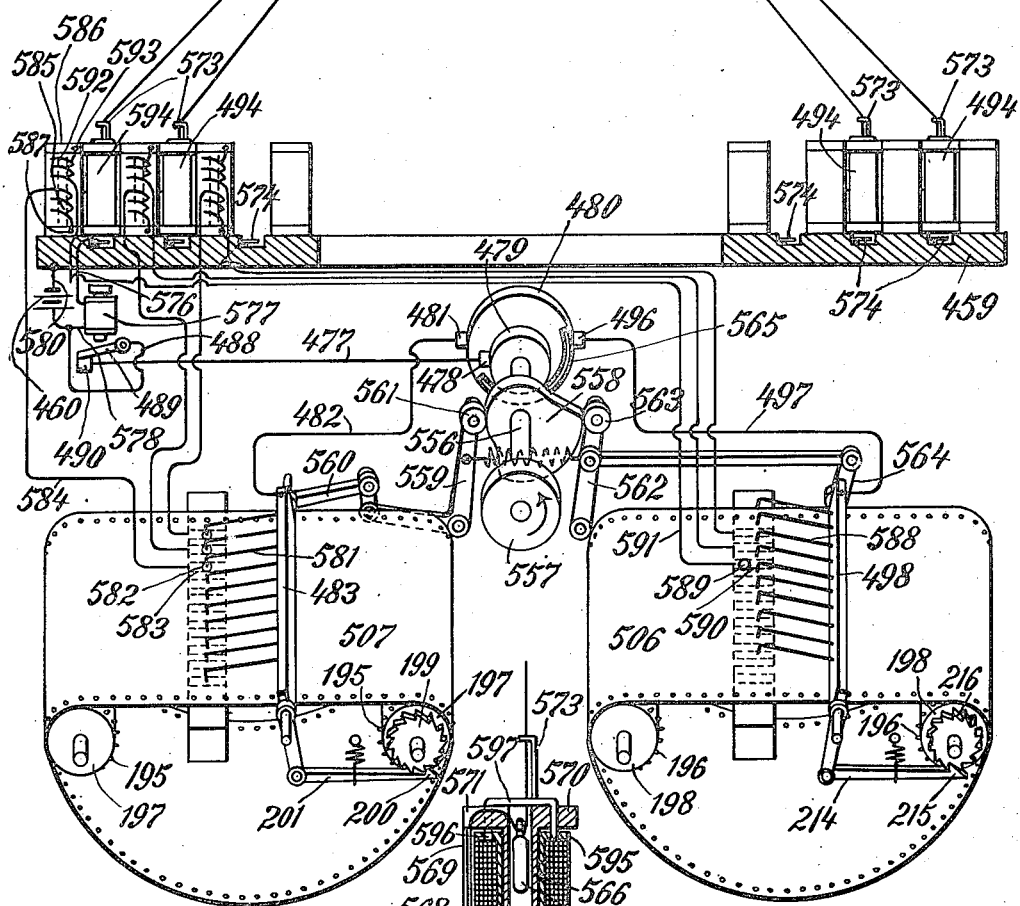
FIG.32.
FIG.33.
Inventor
Arthur H. Adams
By his Attorney
Seward Davis April 29, 1924.
A. H. ADAMS
ELECTROMAGNETIC BRAIDING MACHINE
Filed Jan. 31, 1916   23 Sheets-Sheet 19
1,491,839
FIG.37.
FIG.42.
FIG.43.ᵃ
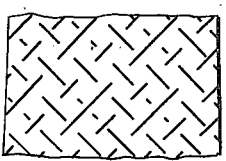
FIG.36.    FIG.41.
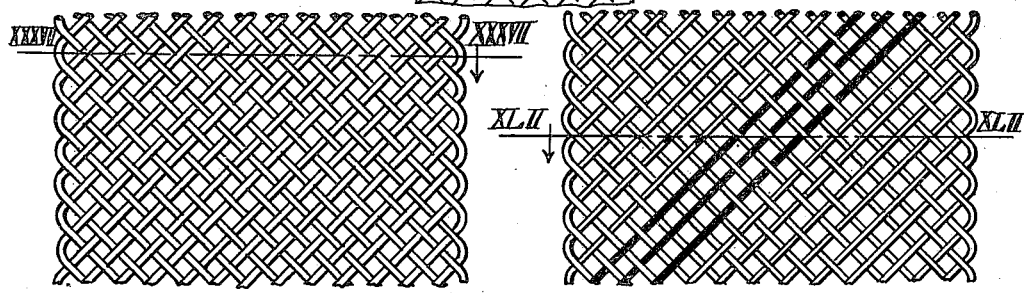
FIG.43.ᵇ
FIG.39.    FIG.43.
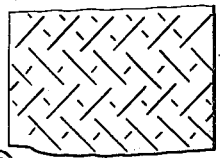
FIG.38.
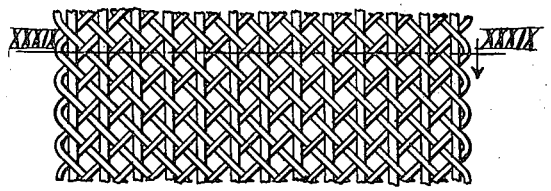
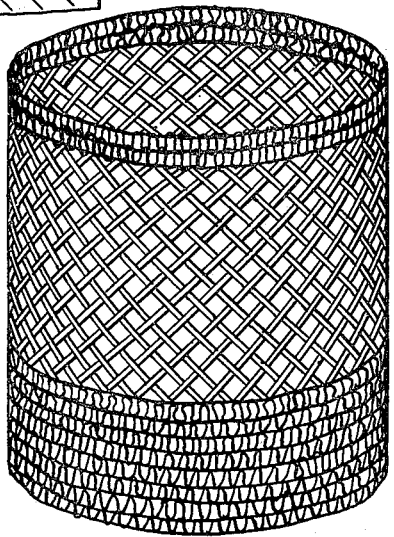
FIG.40.
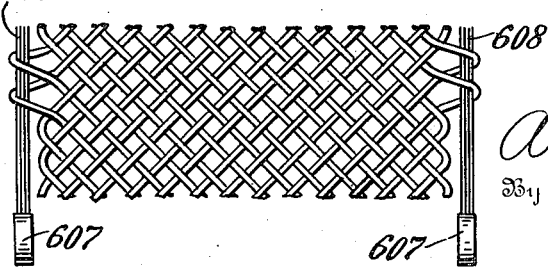
Arthur H. Adams, Inventor
By his Attorney
Seward Davis April 29, 1924.
A. H. ADAMS
ELECTROMAGNETIC BRAIDING MACHINE
Filed Jan. 31, 1916   23 Sheets-Sheet 20
1,491,839
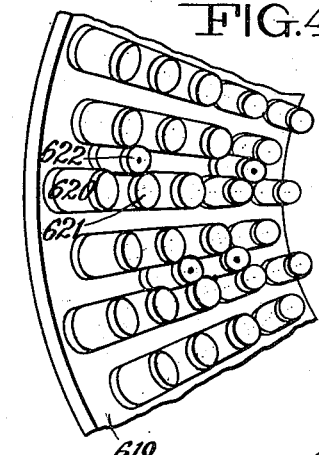
FIG.45.
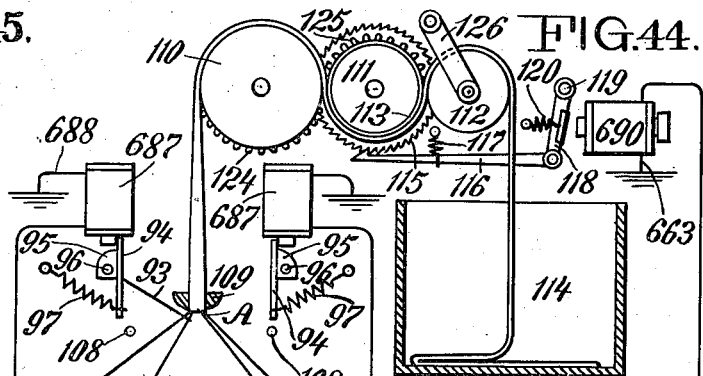
FIG.44.
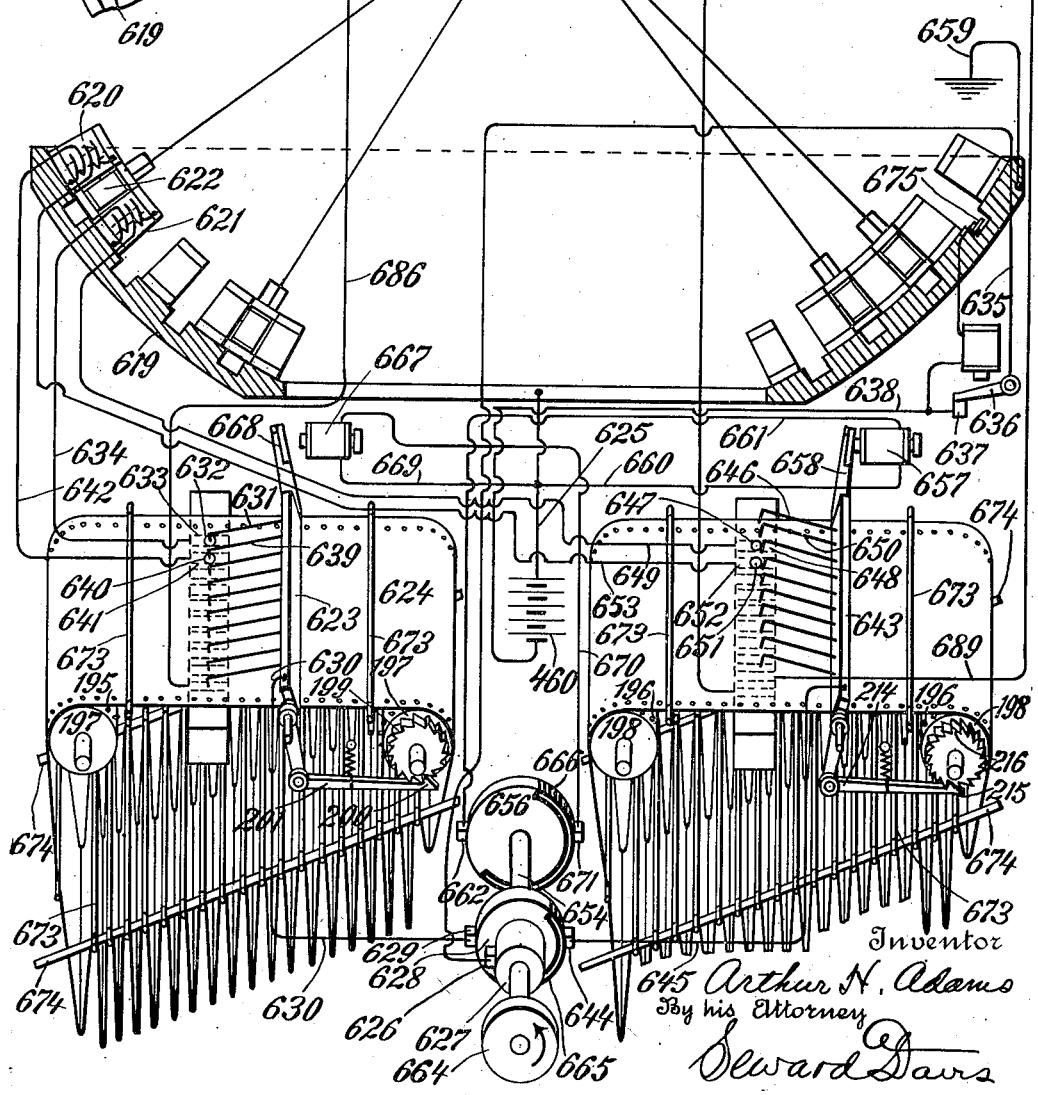
Inventor
Arthur H. Adams
By his Attorney
Seward Davis April 29, 1924.
A. H. ADAMS
1,491,839
ELECTROMAGNETIC BRAIDING MACHINE
Filed Jan. 31, 1916    23 Sheets-Sheet 21
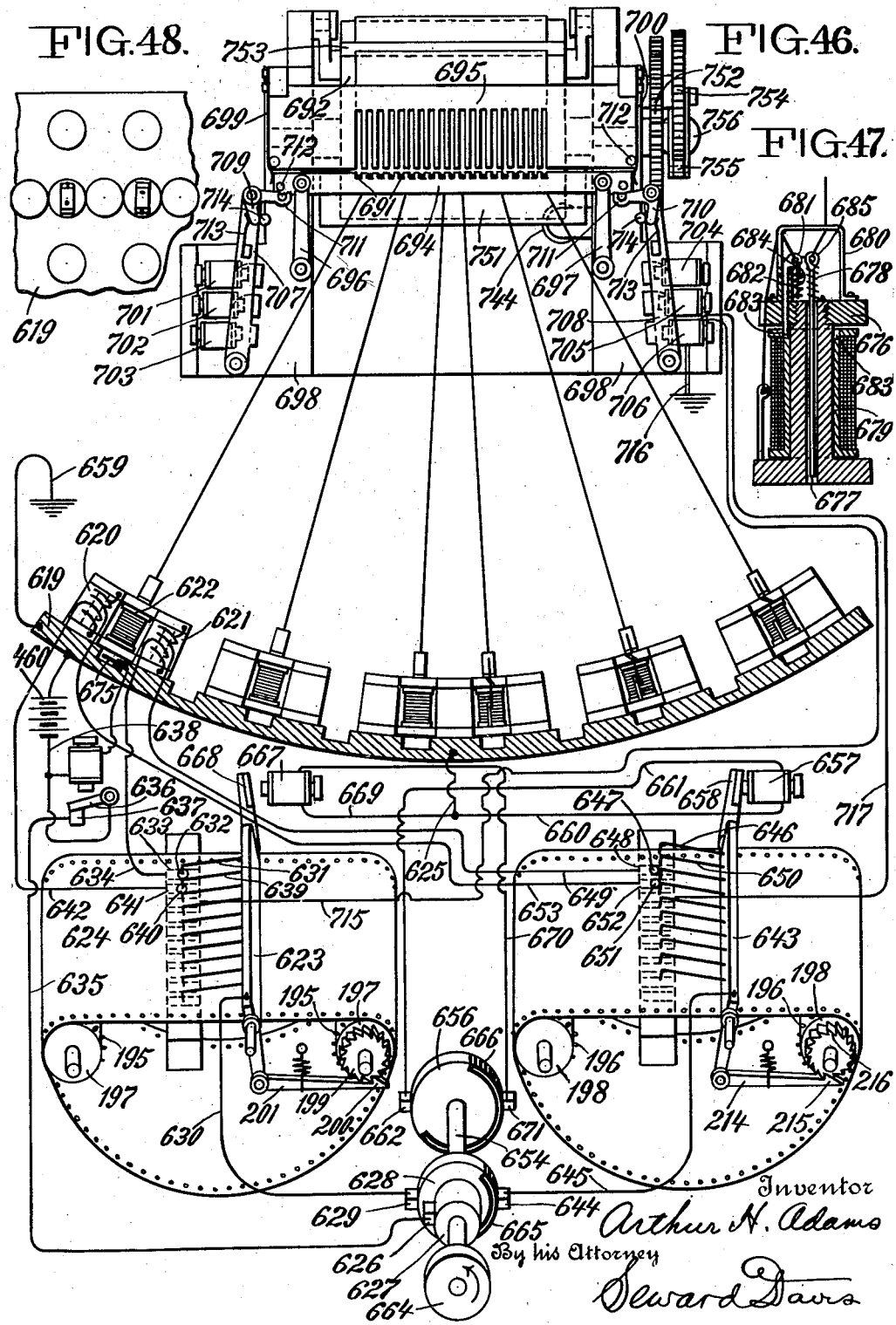

April 29, 1924. 1,491,839
A. H. ADAMS
ELECTROMAGNETIC BRAIDING MACHINE
Filed Jan. 31, 1916 23 Sheets-Sheet 22
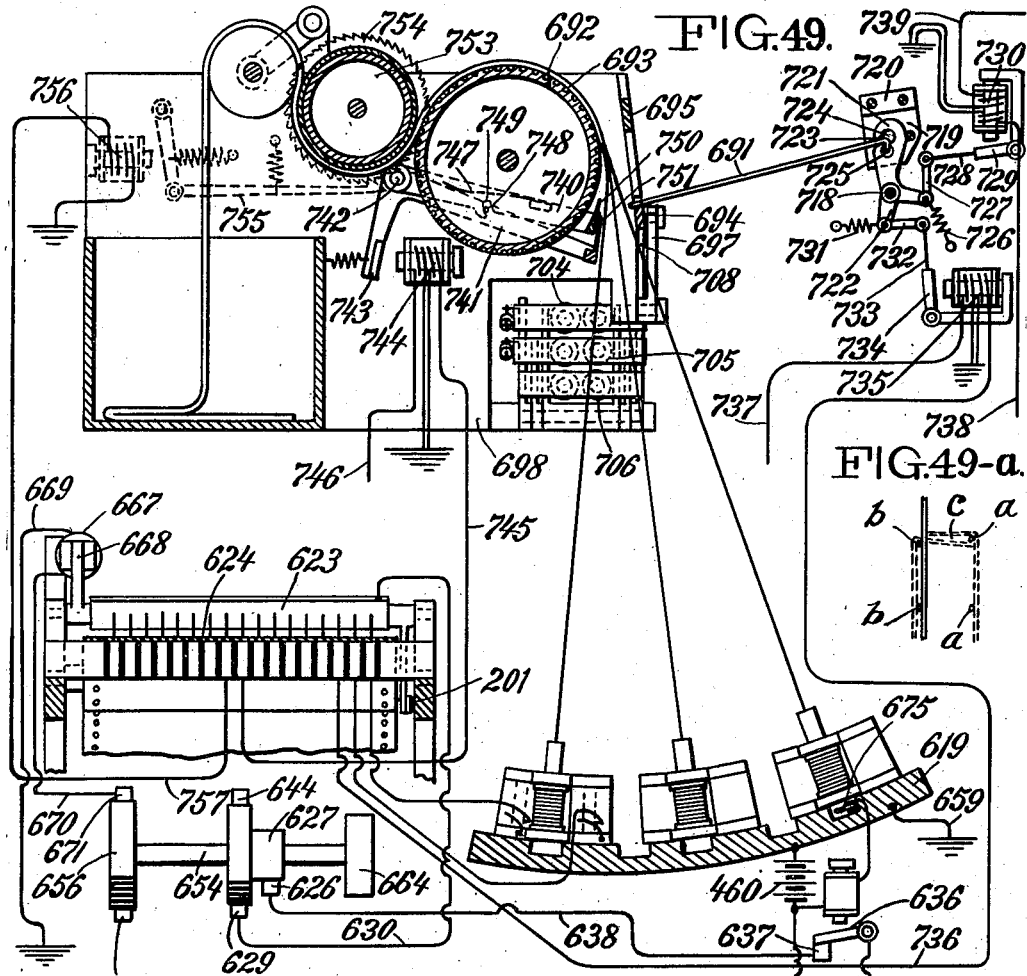
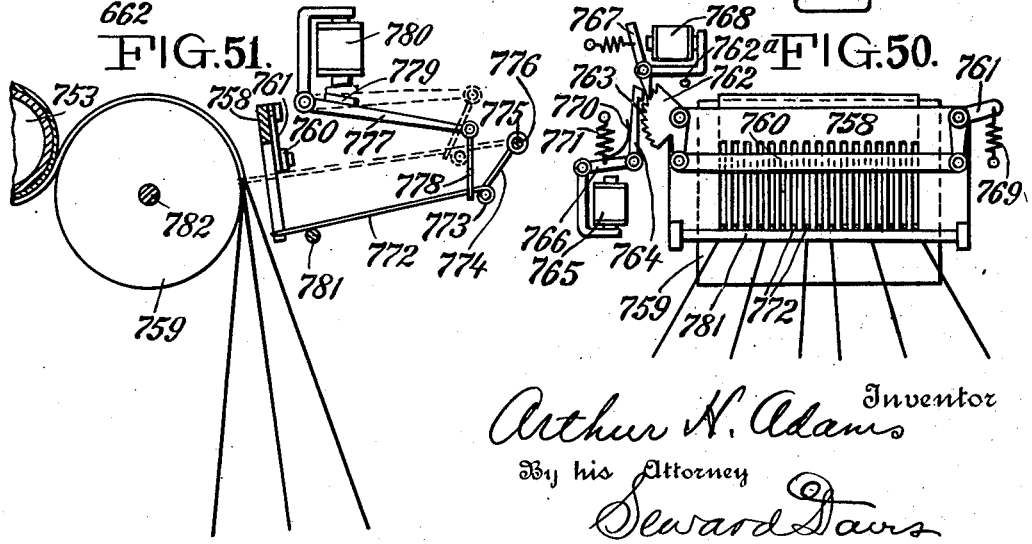

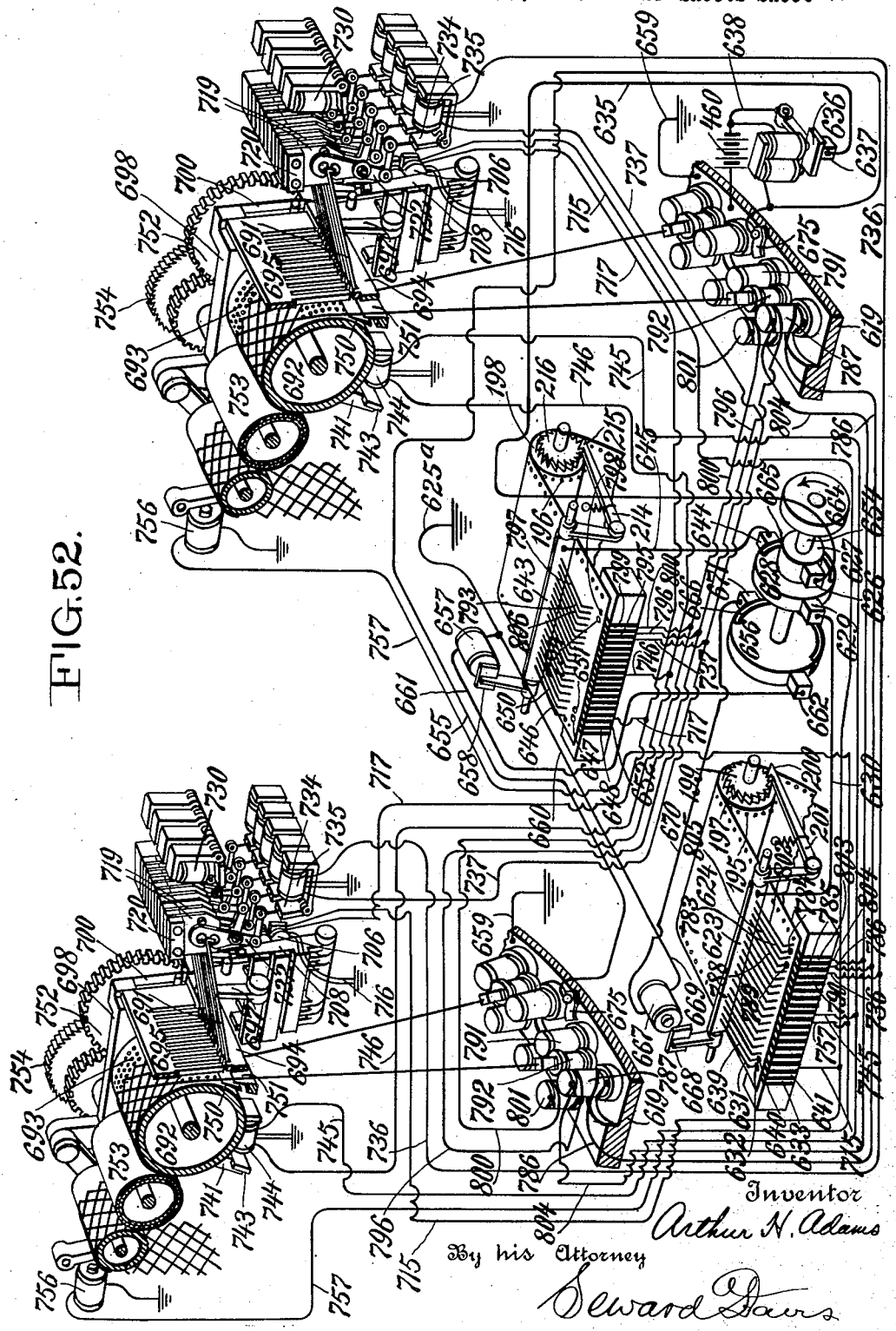

Patented Apr. 29, 1924.

1,491,839

UNITED STATES PATENT OFFICE.

ARTHUR H. ADAMS, OF SPARKILL, NEW YORK.

ELECTROMAGNETIC BRAIDING MACHINE.

Application filed January 31, 1916. Serial No. 75,321.

*To all whom it may concern:*

Be it known that I, ARTHUR H. ADAMS, a citizen of the United States, residing in the village of Sparkill, county of Rockland, State of New York, have invented certain new and useful Improvements in Electromagnetic Braiding Machines, of which the following is a specification.

This invention relates to machines for producing tubular, circular or flat braid, and other kinds of fabric of any desired pattern.

The principal objects of my invention are to accomplish the production of such fabrics by means of positively controlled mechanism having a limited number of moving parts and capable of increased rapidity of operation, and which mechanism shall operate comparatively noiselessly, and without substantial chafing of the filaments composing such fabrics.

The invention consists in its first aspect of magnetic means for controlling the position of strands of thread with reference to mechanically moving parts, which parts cause interlacing of the threads in order to produce the desired fabric. This is accomplished in the preferred form of my invention by means of shuttles carrying one set of threads, which shuttles are magnetically moved in a circular trackway formed on a mechanically rotated frame moving in the opposite direction and carrying the other set of threads. Electromagnets controlled either by a commutator or by pattern sheets cause oscillating movement of the threads on said frame across the path of the shuttle threads. Magnets mounted on a mechanically rotated wheel attract the shuttles and cause their continual movement in the circular trackway. The invention also consists in providing series of electromagnets controlling oscillating movement of threads, and in providing means for connecting part of said series to certain parts of a commutator, while another part of said series is connected to the other parts of said commutator. The invention further consists in providing means whereby electrical connections to the electromagnets controlling oscillating movement of threads in one machine can also be connected to such electromagnets of another machine. Further, the invention consists in providing means whereby oscillating movement can be imparted to the shuttle threads as well as to threads on a frame moving in the opposite direction.

The second part of my invention consists of magnetic means for controlling the position of strands of thread with reference to each other, and magnetic means for producing the movements of such strands which cause their interlacing, whereby all movements of the threads necessary to make the fabric are produced by means of electromagnets, and all surfaces with which such threads contact travel with them or in their same direction.

Finally, the invention consists of magnetic means for effecting movements of threads necessary to produce braided or woven strands, and in providing mechanically operative means for changing the position of some of such braided or woven strands, so that they may be joined to themselves or to other of such braided or woven strands, in a manner similar to the manufacture of lace.

Figure 2:
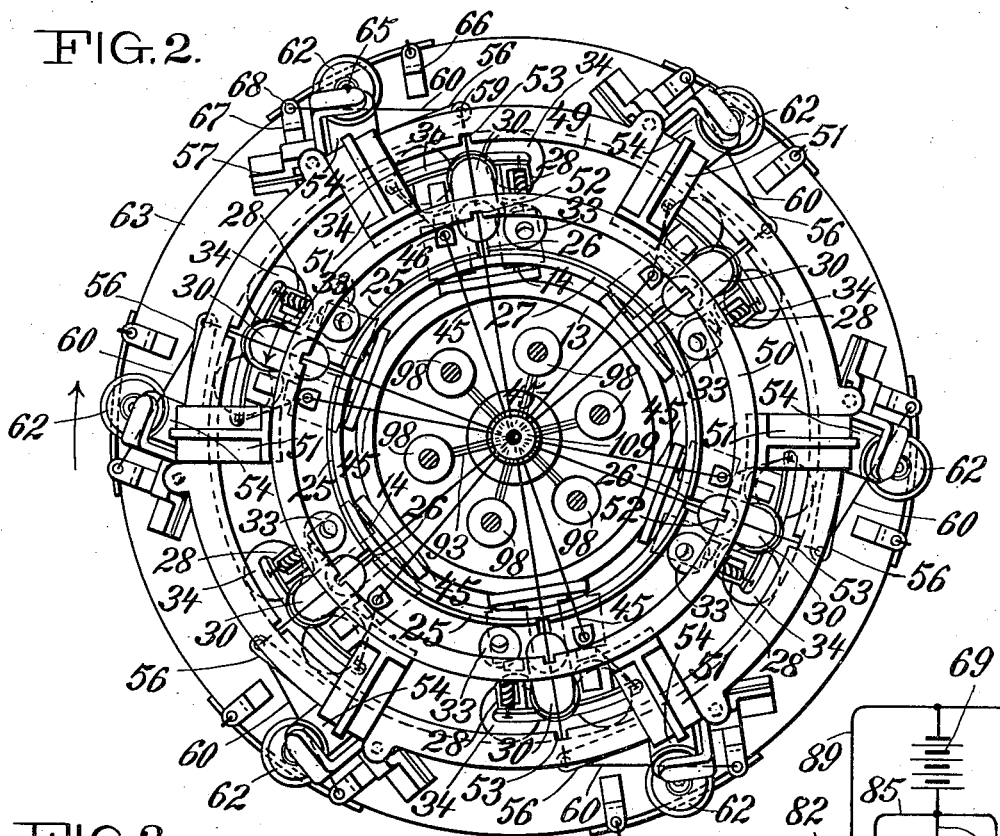
Figure 3:
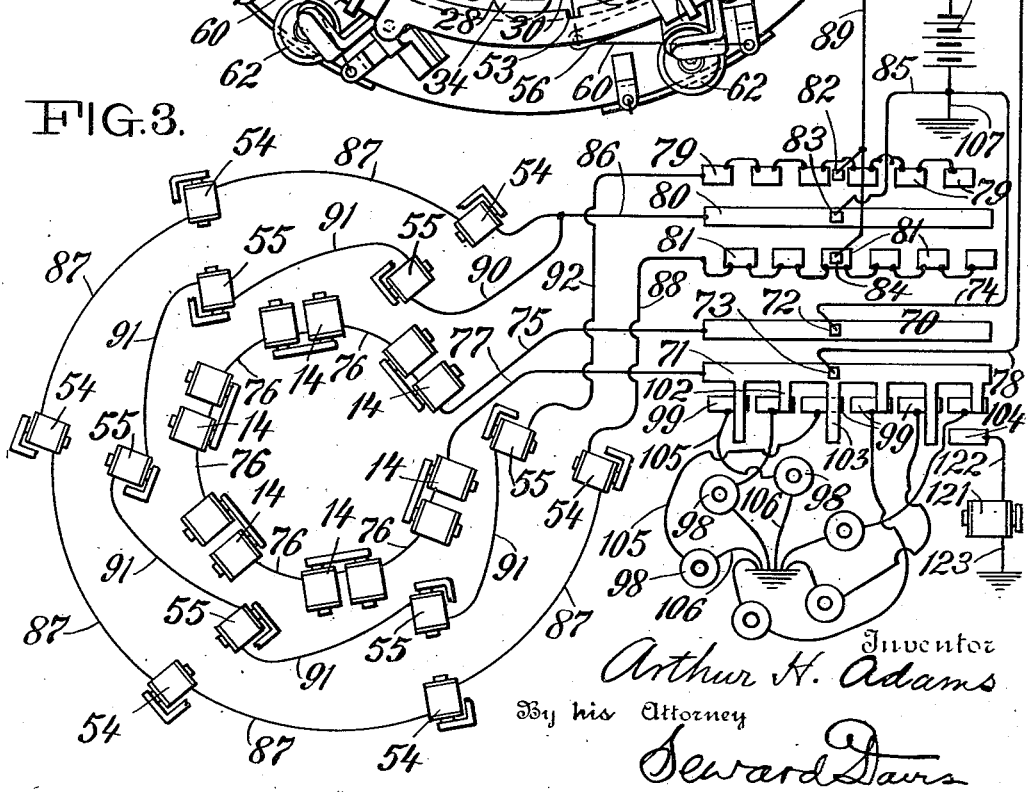
Figure 14:
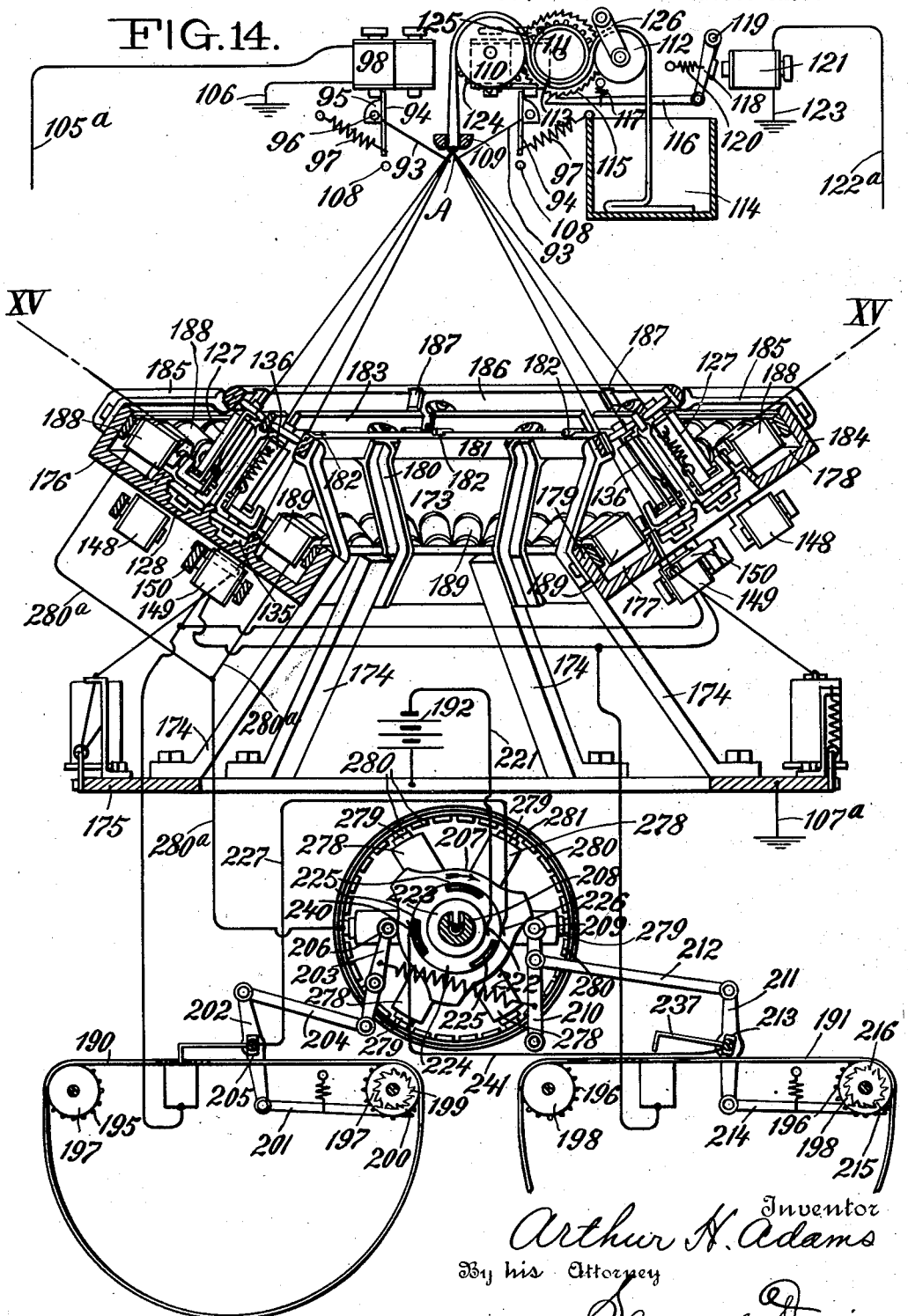
Figure 15:
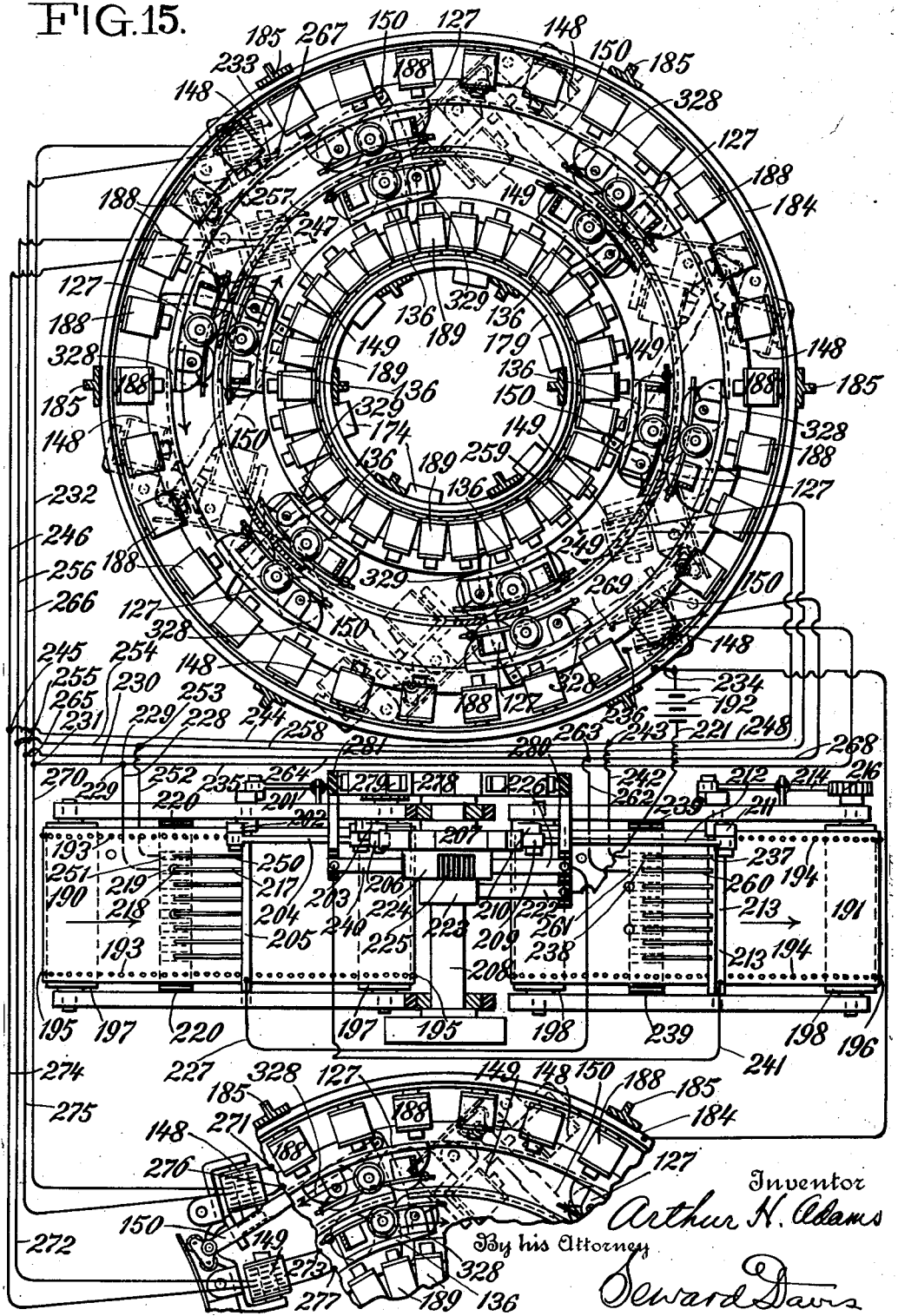
Figure 16:
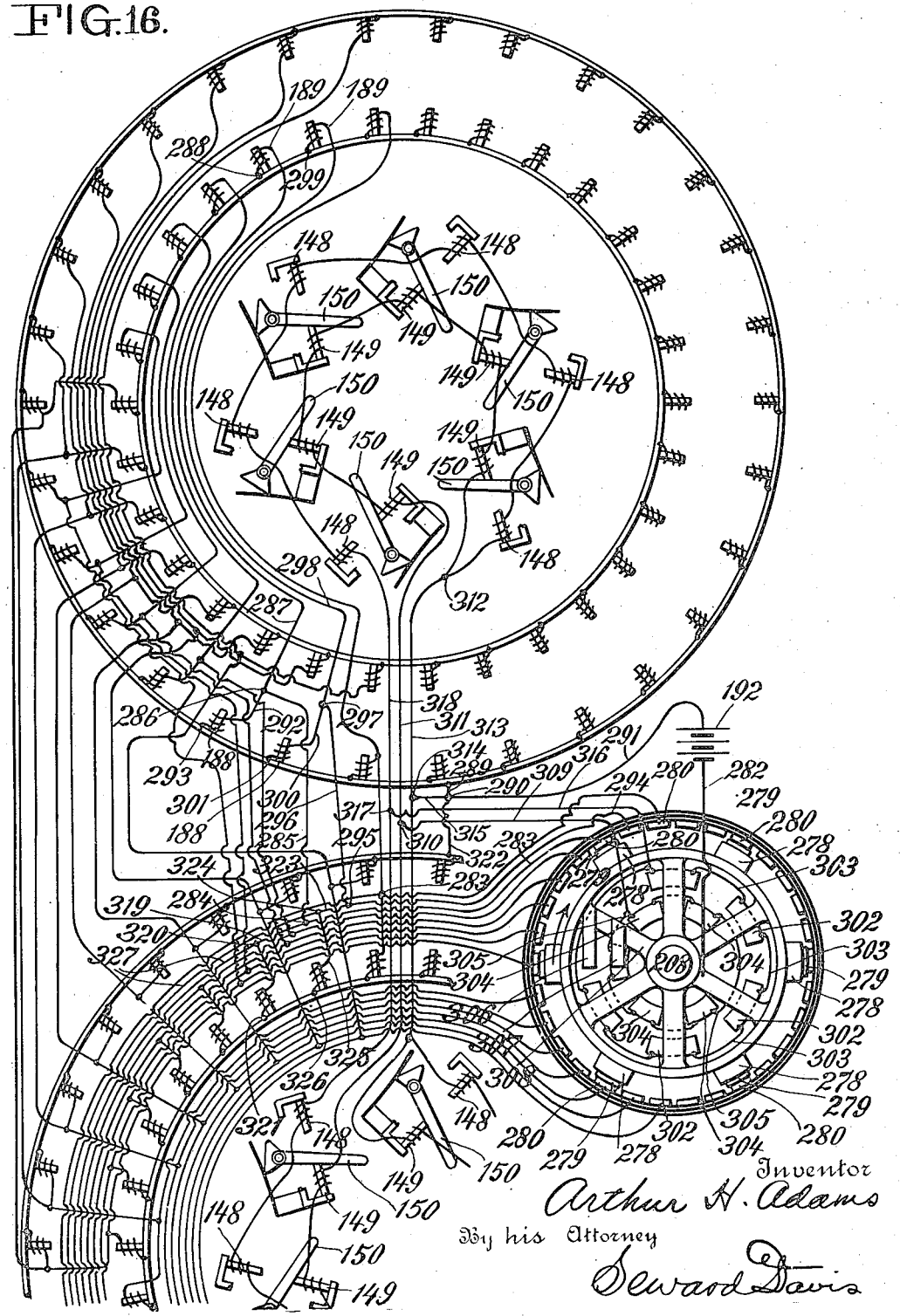
Figure 19:
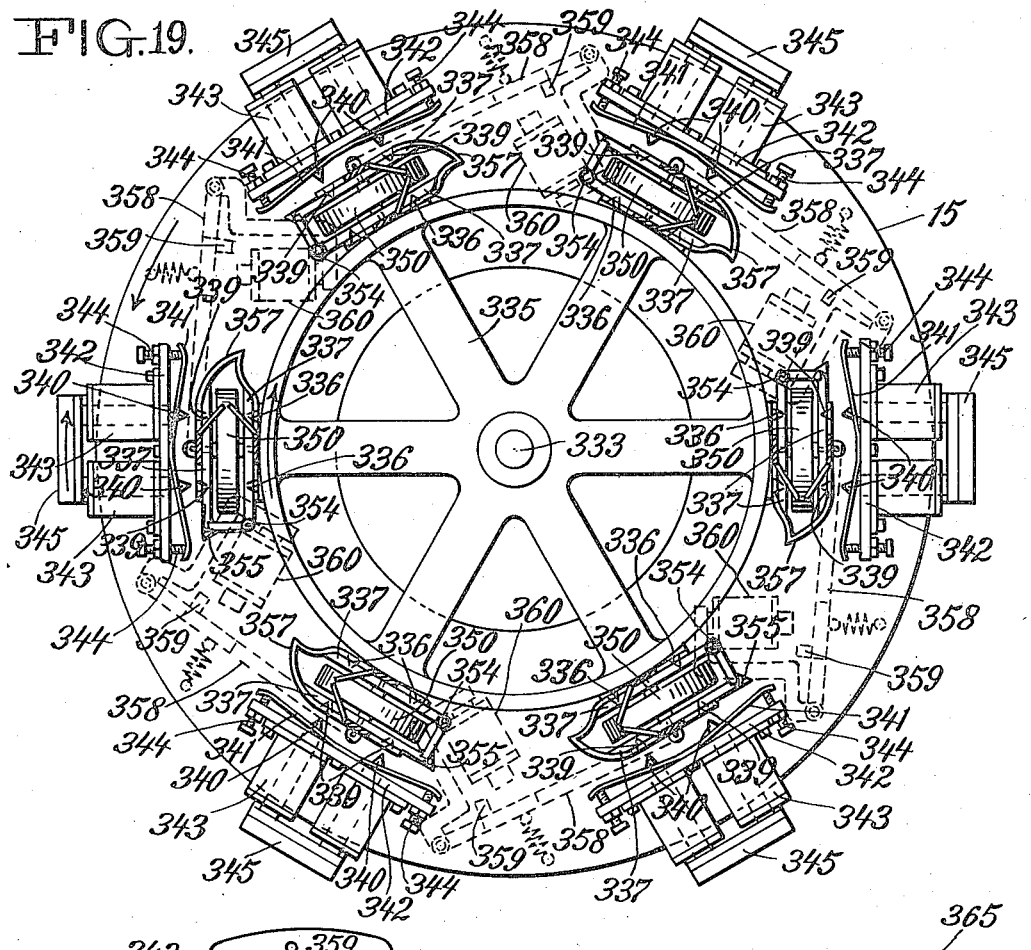
Figure 20:
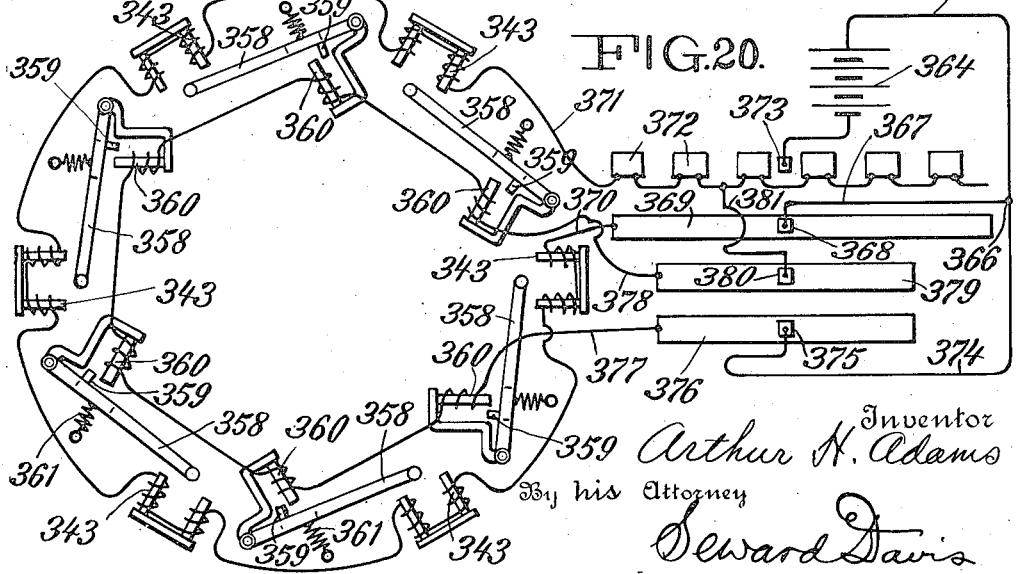

In the accompanying drawings, in which similar reference numerals refer to similar parts throughout, Fig. 1 represents a sectional elevation of the preferred form of the machine, certain portions of the parts associated therewith being shown diagrammatically; Fig. 2 is a plan view looking downwardly on the machine from a plane on the line II—II of Fig. 1; Fig. 3 represents diagrammatically the electrical circuits and associated parts used in connection with the control of the thread-carrying devices; Fig. 4 represents a fragmentary sectional elevation taken on the line IV—IV of Fig. 1; Fig. 5 represents a fragmentary cross-section taken on the line V—V of Fig. 1; Fig. 6 is a detail view of the support for the oscillating thread supply and tensioning mechanism associated therewith; Fig. 7 is a detail view in longitudinal section of the support for the thread supply; Fig. 8 is a detail view of the oscillating member with the armature attached thereto; Fig. 9 is a diagrammatic representation of a modification in which a series of electromagnets controlling oscillating movements of threads are divided into groups, a different set of commutator plates being connected to each group; Fig. 10 is a front sectional elevation of a type of machine similar to that shown in Figs 1 to 8; Fig. 11 is a sectional plan view corresponding to Fig. 10, with certain parts removed for the sake of clearness; Fig. 12 is a diagrammatic showing of the electrical circuits used in connection with the machine shown in Fig. 10; Fig. 13 is a detail view of the oscillating reed and parts associated therewith; Fig. 14 is a sectional elevation of a modified form of the machine shown in Fig. 10, including in place of the commutator control there shown a set of perforated bands for controlling the operations of the magnets; Fig. 15 is a sectional plan view taken on the line XV—XV of Fig. 14; Fig. 16 is a diagrammatic view of the electrical connections leading to and from the control apparatus, but showing in place of the perforated sheet control apparatus a commutator; Fig. 17 shows a sectional elevation of a form of the apparatus shown in Fig. 1, including a vibrating shuttle in place of the roller thread-carrier and a partially spring-controlled oscillating thread shift; Fig. 18 is a detail view of the shuttle shown in Fig. 17; Fig. 19 is a sectional plan view of the apparatus shown in Fig. 17; Fig. 20 is a diagrammatic showing of the electric circuits employed in connection with Fig. 17; Fig. 21 is a sectional elevation of a modified form of the apparatus shown in Fig. 1, including a vibrating shuttle and omitting the shift for the oscillating thread; Fig. 22 is a detail view on an enlarged scale of the shuttle shown in Fig. 21; Fig. 23 is another detail view of the shuttle shown in Fig. 21; Fig. 24 is a sectional view taken on the line XXIV—XXIV of Fig. 23; Fig. 25 is a sectional plan view taken on the line XXV—XXV of Fig. 21; Fig. 26 is a diagrammatic showing of the electric circuits employed in connection with the apparatus shown in Fig. 21; Fig. 27 is a sectional elevation of a modified form of the apparatus shown in Fig. 1, including a wriggling shuttle and omitting the means for shifting the oscillating thread; Fig. 28 is a sectional plan view taken on the line XXVIII—XXVIII of Fig. 27; Fig 29 is a diagrammatic showing of the electric circuits employed in the apparatus shown in Fig. 27; Fig. 30 is a plan view of a modification in which all movements of the threads necessary to produce a fabric are produced by means of electromagnets controlled by perforated pattern sheets; Fig. 30ᵃ is an enlarged view of a portion of Fig. 30; Fig. 31 is a sectional elevation of part of the machine, the perforated pattern sheets and means for actuating them being shown in perspective; Fig. 32 is a sectional elevation of a shuttle; Fig. 33 is a plan view of the shuttle shown in Fig. 32; Fig. 34 is a detail view of a modification in which a looping device is added to the machine shown in Fig. 31; Fig. 35 is a detail view of a modification in which threads are supplied in addition to the threads supplied by the shuttles; Fig. 36 represents a fabric which is formed by means of the machine shown in Fig. 31; Fig. 37 is a section on the line XXXVII—XXXVII of Fig. 36; Fig. 38 represents the fabric which is formed by means of the machine shown in Fig. 35; Fig. 39 is a section of the line XXXIX—XXXIX of Fig. 38; Fig. 40 shows the action of the looping device and the fabric produced by the machine shown in Fig. 34; Fig. 41 represents a thick fabric which is formed by increasing the number of shuttles to be used in the machine shown in Fig. 30; Fig. 42 is a section on the line XLII—XLII of Fig. 41; Fig. 43 represents a circular braid of the general type which is formed by the machine shown in Fig. 1 and the succeeding figures and is shown connected between bands of braided fabric; Fig. 43ᵃ represents the development of a portion of the pattern of braid formed by the machine of Fig. 1 when the commutator and connections are modified as shown in the diagram Fig. 9; Fig. 43ᵇ shows a development of the pattern of braid formed by the machine of Fig. 1 when connected as shown in Fig. 3, but assuming half the number of commutator segments there shown; Fig. 44 is a sectional elevation of a modification in which the electromagnets are arranged in the form of a bowl or hollow substantially hemispherical segment having a flat base, the perforated pattern sheets and means for actuating them being shown in perspective; Fig. 45 is a plan view of a portion of the machine shown in Fig. 44; Fig. 46 is a sectional elevation partly in perspective of a modification in which magnetic means for effecting movements of threads necessary to produce braided or woven strands are combined with an automatic device for picking up such strands and moving them to a given position with respect to a rotating support, similar to the use of a pin and pin cushion by a lace-maker; Fig. 47 is a sectional elevation of the shuttle to be used in the machines shown in Figs. 44 and 46; Fig. 48 is a plan view of a portion of the machine shown in Fig. 46; Fig. 49 is a transverse section of the machine shown in Fig. 46; Fig. 49ᵃ is a detail view showing the operation of moving a strand to form a loop therein; Fig. 50 is a front view of a modification in which means is provided for regulating the vertical movement of pins; Fig. 51 is a transverse section of the machine shown in Fig. 50, showing a modified means for moving the pins toward the pin cushion; and Fig. 52 is a perspective view showing portions of two machines constructed as shown in Figs. 46 to 49, with electrical connections to but one set of perforated pattern sheets, and a power-driven time shaft for controlling their movements.

Referring now more specifically to the drawings, and particularly to the showing in Figs. 1 to 7, the numeral 1 indicates a hollow base forming the foundation for the machine and adapted to seat upon the floor or other convenient support. The base is centrally pierced by a bore passing also through a boss 2 serving as a bearing for a substantially vertical hollow shaft 3. The shaft above and below the bore is provided with suitable bearing collars. Mounted above the upper bearing collar on the shaft is a beveled wheel 4 with upwardly projecting teeth driven by a beveled wheel 5 which in turn is mounted on a shaft 6 passing through one of a series of radially disposed supporting arms 7 projecting upwardly from the base 1. On the shaft 6 is mounted a pulley driven through a belt 8, by a second pulley 9 mounted on a shaft 10, supported by an arm 11 downwardly projecting from the under-surface of the base 1. To the outer end of the shaft 10 is secured a pulley 12 adapted to be driven from an outside source of power.

Secured to the upper end of the central shaft 3 is a substantially horizontal wheel 13, upon the periphery of which, at substantially equal intervals, is fastened a series of magnets 14 which drive the thread-carriers associated therewith, as hereinafter set forth.

Mounted about the shaft 3 is a turret or table 15 provided with a downwardly extending boss 16 having a central bore surrounding the shaft 3. The outer periphery of the boss has a shoulder 17, and from the shoulder extends downwardly a bearing surface 18, against which bears the inner surface of a ring 19 supported by the arms 7. The bearing surface 18 terminates in a shoulder 20 and a bearing surface 21, on which is mounted a beveled gear 22 having downwardly projecting teeth driven by bevel-gear 5.

The rim 23 of the table is inclined upwardly and serves as a support for the rotating thread mechanism, and is provided with a substantially circular channel 24 which in cross-section shows an irregular profile. Secured to the inner face of this channel is a series of thin segmental frustum-shaped plates 25, which as shown more clearly in Fig. 2 are circumferentially spaced from one another at short intervals, indicated at 26, for a purpose hereinafter set forth. Secured to the upper portion of these segments is a band 27 forming with the spaces between the plates 25 a series of grooves for a purpose hereinafter set forth.

Adapted to travel on these plates is a series of thread-carrying devices 28 which are substantially identical, and a description of one will suffice for all. Referring now to Figs. 4 and 5: The thread-carrying device as there shown comprises a carriage, upon the center of which is mounted a spindle 29, about which the bobbin 30 is mounted, the lower portion of the bobbin being supported by a substantially circular platform 31. The carriage is provided with an upwardly projecting arm 32 laterally positioned with respect to the bobbin and having an offset portion upon which a guide wheel 33 is mounted. Mounted beneath the base of the carriage are two similar guide wheels 34 whose axes, as well as the axis of the guide wheel 33, are positioned substantially in alinement with the radii of the frustum-shaped segments upon which they rest. Each of the rollers 33 and 34 is preferably provided with a peripheral band of cork, rubber, or the like, 35, serving as a quiet running-surface therefor.

Mounted on the outer edge of the carriage is a lever 36 pivotally held intermediate its ends by a screw 37. One end of a spring 38 is attached to an end of the lever, and the other end of the spring is attached to a hook secured to the upright portion of the arm 32. Intermediate the point of attachment of the spring and the screw 37 is an upwardly projecting lug 39 which is adapted to project into one of a series of cavities 40 situated in the lower face of the platform 31. The end of the lever opposite the spring 38 is provided with a thread-eye 41, and a thread guide consisting of an upright arm 42 having an offset flange 43 is positioned on the carriage laterally of the bobbin 30 and adjacent the end of the lever holding the thread-eye 41. This upright arm is provided with an aperture 44 through which the thread 45 passes from the bobbin and from which it then proceeds through the thread-eye 41 and thence through a second aperture 46 positioned in the flange 43. The thread then passes to the braiding point A.

The parts just described constitute a thread-tensioning device whose action is as follows: Assuming that the parts are in position, as shown in Fig. 4, the thread 45 will not move towards the braiding point until the lug 39 has been removed from the aperture 40 in which it rests. This is accomplished when the tension, occasioned by the movement of the fabric past the braiding point has increased to such an extent that sufficient pull is exerted by the thread upon the thread eye 41 to move the lever 36 about its pivotal point. This lever, due to the pull of the thread, will release the lug from its aperture against the pull of the spring 38. When released the bobbin will rotate and the thread will be supplied until such time that the tension of the thread becomes less than the pull of the spring, when the lug 39 will again engage an aperture to prevent further supply. The rotation of the thread-carrying devices is effected by means of the rotating electromagnets 14 which are constantly energized and consequently exert a constant drag upon short upwardly projecting armatures 47 on each carriage. As shown more clearly in Fig. 1, this upwardly projecting armature lies adjacent the outer face of the segment 25 and is inclined similar thereto. The projecting end 48 of the magnet 14 is similarly inclined and lies adjacent the inner face of the segment 25. Upon rotation of the carriages by the means mentioned, the wheels 33 and 34 of each carriage will bear at low speed upon the segmental frusta 25. At high speed, due to centrifugal action, the lower wheels 34 will bear upon the wall of the channel 24 adjacent thereto, which is provided with a substantially V-shaped groove 49, which serves at all times as a guide. The outer or high speed bearing points of the wheels 33 likewise are upon a ring 50 which is substantially frustum-shaped and which is mounted upon a series of inclined arms 51 fastened to the outer periphery of the raceway 23. These arms are provided with seats for holding the ring 50. It will be understood that there is sufficient separation between frustum 25 and grooved track 49 in the one case, and between frustum 25 and ring 50 in the other so that wheels 34 and 33 will pass freely between them.

According to the description of the above-mentioned parts, each of the carriages and associated parts may be removed from its position, as indicated, for replacement by a fresh bobbin, or for repairs, as necessary, by lifting the ring 50 from its seat and grasping the carriage, which may be tilted outwardly, the V-shaped groove 49 permitting the lower wheels 34 to pivot and slide therein until these wheels clear the overhang of the grooves 49. The ring 50 is provided on its inner surface with grooves 52 radially alined with respect to the spaces 26 and spaced angularly from one another to correspond to the angle spanned by the segments 25. The grooves 52 and the spaces 26 between the segments thus are placed opposite one another. Alined with the grooves 52 are grooves 53 situated in the wall 23. The grooves 52 and 53 are in alinement with the spaces between the segments 25 for a purpose hereinafter explained.

The mechanism for vibrating one of the threads so that it interweaves with the rotating thread comprises two sets of concentrically positioned electromagnets 54 and 55 which are attached to the under-surface of the raceway. These magnets are equidistantly spaced from one another and are placed in pairs, which are radially alined. As shown more clearly in Figs. 5 and 8, the magnets 54 and 55 operate to vibrate a flanged plate-like reed which is secured within the stem 57 of a two-pieced Y-shaped framework. The arms of the Y-shaped framework are provided with ears for attachment to the table 15, and the magnets 54 and 55 are attached adjacent the extremities of the arms. Intermediate its attachment to the stem 57 and its opposite end, the reed 56 is provided with a split armature 58 which oscillates to and fro between the beveled poles of the magnets 54 and 55. The switch arm 58 tends to a neutral or central position between the extremes of its throw, and displacement either way puts the spring under stress. This spring stress is properly proportioned to the pull of the magnet 54 or 55 and the moment of inertia of the switch, and provides a storage or potential energy giving rapid acceleration of the switch arm up to the neutral position; the momentum attained then carries the switch to, or nearly to, the opposite limit of its movement, with decreasing velocity, increasing spring tension and consequent energy storage. This action is that of a form of vibrating reed, generically defined as spring pendulum action. Due to the fact that opposed electromagnets 54 and 55 are provided, the opposite magnet attracts the switch slightly farther than the momentum would carry it. The switch then gets an increment of energy at each end of its stroke.

In the outer extremity of the reed 56 is an aperture 59 through which passes the thread 60 which is adapted to oscillate back and forth and thereby to interweave with the thread 45. The thread passes upwardly from a bobbin, below the reed 56 through the aperture 59 and thence through an arc-shaped slot 61 whose edges are segments of concentric circles drawn with radii equal to the length of the reed from the point of attachment to its extremity, and a distance slightly less than this. The thread passes upwardly from this slot to the braiding point. During its oscillation from side to side of the raceway 23, it will be braided together with the thread 45 fed by the carriage 28. It will be understood that the thread 60 must be out of the path of the carriage before the latter passes thereover to avoid danger of breakage, or of bruising the thread. In order to accomplish this the spaces between the segments 25 heretofore mentioned and the grooves 52 are provided so that when the thread 60 is swung radially inward to its extreme position it will lie within the space between the segments 25, and when, with the actuation of the magnet 54, it is swung outward again, it will lie in the grooves 52 provided therefor. Thus it will lie below the surface over which the wheels 33 and 34 pass. According to this construction it will be observed that the thread 45 will revolve in an even path without oscillation or deviation from the path, and that the oppositely rotating thread 60, while it moves in a curve, passes in its motion just out of the path of the carrier for thread 45. Thus the threads 45 and 60 each have different motions, that of the former being rotary, and that of the latter rotary and oscillatory.
The oppositely rotating thread 60 is supplied to the series of oscillating reeds 56 from a series of bobbins 62 and thread-tensioning devices similar to those already described in connection with thread 45. This mechanism is mounted on a ring 63 which is secured to the under-side of the table 15 by means of arms 64. Each of the bobbins and thread tensioning devices is substantially identical, and a description of the mounting of one will suffice for all. A spindle 65 is seated on a ring 63, upright arms 66 and 67 projecting from the ring 63 on either side of the bobbins 62, the arms being provided at their upper extremities with apertured flanges, as heretofore set forth. Intermediate these arms is the oscillating tension lever, having attached to one end the tension spring which is secured to the arm 66 and provided intermediate this spring and its pivotal point of support with a lug coacting with the apertured base of the bobbin carrier. The opposite end of the tension lever is provided with the tension ring for receipt of the thread 60 proceeding from the bobbin after passing through the intermediate aperture in the arm 67. The aperture 68 in the flange of the arm 67, it will be noted, is placed in exact alinement with the line of bending of the reed 56, which line is directed substantially toward the braiding point. This positioning of the aperture is important in connection with the oscillating feed of the thread 60 by the reed member 56. By virtue of this arrangement there is no sagging of the thread between the aperture 68 and the braiding point. If the aperture were positioned outside of the alinement mentioned, the oscillation of the reed 56 would either cause a momentary loosening and sagging of the thread or might cause breakage by stretching or jerking.

As has been previously mentioned, the magnets 14 are permanently energized so that they may continually act to cause the rotation of the carriage holding the bobbins and tensioning devices about the braiding point. In order that the magnets 54 and 55 may be alternately energized, as will be necessary in order to oscillate the reed, according to the embodiment shown in the drawings, a timing device is employed, the parts, as shown in Fig. 1, being preferably mounted on shafts.
The source of power may consist, as here shown, of a storage battery 69, diagrammatically shown in the figures, and mounted in any desired position with respect to the machine. Of course it is to be understood that any other convenient source of power, for example, a dynamo, might be used. Means for supplying current to the magnets 14 comprises a pair of slip rings 70 and 71 mounted adjacent the lower extremity of the shaft 3 and suitably insulated from one another. Contacting with these slip rings are brushes 72 and 73 mounted on a downwardly projecting support 74 attached to the lower face of the base 1. These brushes are suitably insulated from one another. As shown diagrammatically in Fig. 3, the storage battery 69 is connected with brush 72 through which current passes to the slip ring 70, thence by means of a wire 75 through the electromagnets 14 connected by wires 76 and thence by a wire 77 to slip ring 71; thence through brush 73 and wire 78 to the other pole of the battery. Through this circuit it will be seen that current will continuously travel to energize the magnets 14. It will be noted, as shown in Fig. 1, that the wires 75 and 77 pass upwardly through the hollow shaft 3 and thence to their magnets.

Mounted in the space between the beveled wheels 4 and 22 is a series of contacts 79, 80 and 81 mounted about and suitably insulated from the shaft 3 with contact brushes 82, 83 and 84, bearing respectively thereagainst. Contacts 79 and 81 are in the form of segments and contact 80 is a slip ring. The brushes are suitably mounted and insulated from the arm 7.

Referring to the diagrammatic showing in Fig. 3, it will be noted that the outer group of magnets 54 is connected to the storage battery 69 by means of wire 85 connected with the brush 83 which contacts with the slip ring 80, which in turn is connected by the wire 86 with the series of magnets 54 and which are connected to one another by the wires 87. The last magnet in the series is connected by means of wire 88 with the commutator segments 81, through which current passes, when brush 84 is in contact on a segment 81, along the wire 89 to the other pole of the battery. The inner set of magnets 55 are energized by means of the wire 85, brush 83, slip ring 80, and wire 86 from which passes a wire 90 to the first of the series of these magnets. Each of the magnets is connected to its adjacent magnet by means of a wire 91, the last magnet in the series being connected by means of wire 92 with one of the segments 79, which, when the brush 82 contacts therewith, transmits current by means of the wire 89 back to the other pole of the battery. It will be noted that portions of the circuit connecting the poles of the battery with the two series of electromagnets are used in common and that the commutator segments 79 and 81 are substantially equal in length and the spaces between the segments in each set are substantially equal and shorter than the length of a segment. The commutator segments 79 and 81 are positioned with respect to one another so that those in the set 81 break joints with those in the set 79. According to this construction, as the brush 82 contacts with one of the segments 79, the brush 84 will still be in contact with one of the segments 81. This arrangement will cause the armature 58 to be subject to a continuous magnetic flux, and there will be no time at which some one of the magnets of either of the two sets is not energized. In other words, there is no complete cessation of flow of current to one or the other of these sets of segments. As a consequence the armature will be attracted towards one magnet before the other magnet has released it. This will insure a clean cut direct passage of the armature. The reed spring 56, when released, will also tend to move the armature across to the other magnet by its natural period of vibration. The accelerating effect of a properly chosen reed is very considerable, and the economy of current is therefore appreciable.

The wires 86, 88 and 92, as shown more clearly in Fig. 1, pass upwardly from their respective commutator segments or slip ring to L-shaped channels in the boss 16. These wires are provided with an insulating covering for that portion of them passing through the boss.

Assuming that the parts are in the position shown diagrammatically in Fig. 3, the energization of the sets of magnets 54 and 55 will take place substantially as follows: Upon the passage of the commutator segments in a counter-clockwise direction, the brush member 82, which in the position indicated in the drawings is not making contact but rests in one of the spaces between the commutator segments 79, will come into contact with the adjacent commutator segment. The brush 84 which has been in contact with one of the series of commutator segments 81 will at the same time break contact with the commutator segment upon which it rests, as shown in the figure. As heretofore explained, this making of the contact between the brush 82 and the adjacent commutator segment of the set 79 will occur shortly before the breaking of the contact of the brush 84 with the commutator segment of the set 81 upon which it rests. The brush 83 will be in continuous contact with the slip ring 80. When the commutator segments have moved counter-clockwise, as indicated, the outside series of magnets 54 will be de-energized and the inner set 55 will be energized. Upon further motion the brush 82 will break contact and the brush 84 will make contact in the manner already described. So that upon continuous rotation a continuous alternation of energization of the two sets of magnets will take place. Thus the series of reeds 56 will continuously oscillate while rotating to throw the threads 60 back and forth across the raceway 23 to provide a braiding of these threads with the thread 45; this braiding will be, with the arrangement shown, of the general type displayed in Fig. 43.

It will be obvious that the arrangement of segments 79 and 81 shown and described is purely arbitrary, and that the plain "over-one under-one" pattern of the general type shown in Fig. 43, and which is produced by the arrangement just described, can be varied by making other arrangements of the wiring connections to the magnets 54 and 55 and of commutator segments 79 and 81; an example is shown in the modification diagrammatically displayed in Fig. 9, which is described below. Or a mere change of the number and length of the commutator segments, without change or wiring connections, will suffice. For example, if in Fig. 3 we assume that only three segments 79 and three of 81 constitute the complete development of this commutator, an "over-two under-two" pattern is produced such as is shown in Fig. 43$^b$. A great variety of patterns will suggest themselves to one skilled in the art, and the variety is clearly greater,—according to the general laws of combinations,—with a machine having a larger number of thread carriers 28 and bobbins 62 than in the machine illustrated.

At the braiding point a substantially circularly disclosed series of magnetically operated beater arms 93 is placed. Each of the series is identical, and a description of one will suffice for all. Each beater arm is connected by means of a plate 94 with an arc-shaped armature 95 pivoted at 96, the armature being situated at one extremity of the plate 94 and to the opposite end thereof is attached a spring 97. Situated above the armature and acting to swing it to throw the beater arm upwardly is the magnet 98.

The operation of the electromagnets 98 is accomplished by making and breaking connection with a series of contacts 99 circularly disposed upon an insulating plate 100 fixed on the ground beneath the machine. Positioned on the lower end of the shaft 3 immediately above this contact plate is a plate member 101 having projecting downwardly therefrom two series of contact fingers 102 and 103. The series of six contact fingers 102 pass in a counter-clockwise direction over the contacts 99 to energize the magnets 98 and cause the consequent throw of the beaters 93. The fingers 103 are less in number than fingers 102, and make contact for each revolution of the shaft 3 with a contact member 104 also secured to the plate 100 for a purpose hereinafter set forth.

Referring to the diagram, Fig. 3 of the connections utilized for energizing the series of magnets 98, the six fingers 102, (of which only three are shown distinct from fingers 103 in the diagram), are shown in electrical connection with the slip ring 71 and thus adapted to permit the flow of current through the series of contacts 99 to their respective electromagnet 98. Each of the electromagnets is connected with its corresponding contact by means of wire 105 and is then grounded through a wire 106. The storage battery 69 is also grounded through wire 107. The energization of the magnets by the contacts shown in the drawing is as follows: Current flows from one pole of the storage battery to the wire 78, brush 73, slip ring 71, through the series of contact fingers 102, contacts 99, wires 105, magnets 98, and to the ground through the wires 106. Current then returns to the other pole of the battery through ground and wire 107. Upon movement of the plate in a counter-clockwise direction the contacts 99 will permit, through the connections thus established, the energization of the series of magnets corresponding thereto during each revolution of the shaft 3.

The successive rising and falling of the beater arms will cause the urging together of the parts of the fabric, thus avoiding non-uniformity in the body thereof as well as avoiding difficulties in stretching and sagging of the fabric and threads. The action of the beaters, according to the construction outlined is efficient and rapid. A series of stops 108 are provided against which the beater arms come to rest under the action of the springs 97.

It will be obvious upon reference to the diagrams Fig. 3 and Fig. 9 that my invention is not limited to the exact arrangement of contacts 99 and fingers 102 that is shown. An almost unlimited number of arrangements could be made. For example, when all but one of the fingers contacting on contacts 99 are removed, each beater arm operates only once in a revolution of the machine, and the six beater arms operate successively in rotation producing a faintly visible spiral effect in the otherwise uniform round braid. Or when the contacts 99 are all disconnected from their magnets except one or two, the result is action only of the one or two corresponding beater arms, and the production of a marked striped effect. Other combinations in great variety will occur to one skilled in the art.

The material passes from the braiding point A through the eye ring 109 to an automatically-operated takeup mechanism which is also electromagnetically controlled. The take-up mechanism comprises rolls 110, 111 and 112 which are spaced a distance apart to permit the passage of the material therebetween. The braided fabric passes over the roll 110, under the roll 111, which is provided with a sandpaper face 113, and over the roll 112, and thence into a box 114. The travel of the fabric is secured by a ratchet 115 positioned on one end of the roll 111, which is driven by means of a pawl 116 held thereagainst by means of a spring 117 positioned on the box 114. The pawl is pivoted to an armature 118 pivoted at 119 and held by a spring 120. This armature is actuated by an electromagnet 121 in such manner that for each complete rotation of the shaft 3 the ratchet is moved up a predetermined distance, in accordance with the throw of the armature by the pawl 116 and with the number of contact arms 103.

Current flows to the magnet 121 upon contact of the fingers 103 with the contact member 104, which occurs, as illustrated in Fig. 1 once, and as illustrated in diagram Fig. 3, three times, for each revolution of the shaft 3. The circuit through which the current passes when this contact is established is indicated diagrammatically in Fig. 3. Upon contact 103, 104 being established, current will pass from one pole of the battery through wire 78, brush 73, slip ring 71, finger 103, contact 104, and from contact 104 by wire 122 to electromagnet 121 and thence by wire 123 to the ground, returning thence through wire 107 to the other pole of the battery.

Teeth 124 positioned on one end of the roll 110 coact with teeth 125 on the end of the roll 111 opposite the ratchet 115, so that as motion is given the roll 111 it will be transmitted to the roll 110. In passing through these rolls, the braided fabric is thus urged along not only by the motion of the roll 110, but also by the friction grip provided by the sandpaper 113 on the roll 111. The roll 112 is suspended by the lever 126 in position to press against the face of the roll 111, thereby serving as a doctor or pressure roll to cause a substantial engagement of the fabric by rolls 111 and 112.

It is so well known in the art as not to be worthy of illustration that the speed of the take-up device must be capable of adjustment. This adjustment is usually, and in my machine may be provided by change gears. There is a peculiar advantage however in the take-up device I have invented and described, which is that the distance through which ratchet 115, and rolls 111 and 110, may be moved for each rotation of shaft 3, depends upon the number of contact arms 103 or contact members 104. To illustrate this advantage, in the drawing Fig. 1 I have shown one arm 103 and in the diagram Fig 3 I have shown three arms 103 and in both one contact member 104 giving respectively one and three operations of magnet 121 per revolution of shaft 3. Three operations I consider to be a minimum number that will, under proper conditions produce even braiding on a 12 thread machine. With a single finger 103 the intermittent operation of the magnet 121 produces a novel unevenness in the braiding which may be a desirable effect in some fabrics. Other variations of this sort will suggest themselves to one skilled in the art.

In the modification shown in Fig. 9, current flows from battery 69 through wire 78, brush 72$^a$, slip ring 70$^a$, wire 75, magnets 14 and wires 76, 77$^a$ to the ground, returning through wire 107 to the opposite pole of the battery. Current also flows through wire 78 to brush 73$^a$, slip ring 71$^a$, fingers 102, passing over the contacts 99 to energize the magnets 98 and cause throw of the beaters 93, as has been described. Movement of member 71$^a$ causes contact finger 103 to pass over contact 104 and thereby energize magnet 121 and cause movement of the take-up roll 111.

Current flows from battery 69 through wire 78, brush 84$^a$, contact plates 81$^a$, wire 90$^a$, magnets 55$^a$, and wires 90$^b$ to the ground, returning through wire 107 to the opposite pole of the battery. Current flows through wire 78, brush 83$^a$, contact plates 80$^a$, wire 86$^a$, through the group of magnets 54$^a$, and wires 86$^b$ to the ground and returning to the battery. Current also flows through wire 78, brush 82$^a$, and contact plates 79$^a$ which extend a distance equal to two of the contacts 81$^a$ and 80$^a$, the current then passing through wire 87$^a$, the group of magnets 54$^b$, and wires 87$^b$ to the ground, returning to the battery through wire 107.

When the brushes are in the position shown, the brush 82$^a$ having been on contact 79$^a$ longer than brush 84$^a$ has been on contact 81$^a$, the armatures of the group of magnets 54$^b$ will not be drawn away therefrom by the action of magnets 55$^a$, but as the brush 83$^a$ is not on a contact 80$^a$, the group of magnets 54$^a$ will not be energized, and consequently the armatures of such magnets will be drawn toward magnets 55$^a$. Then, as the contacts are moved past the brushes, brush 84$^a$ will not be on a contact 81$^a$, while brush 83$^a$ will be on a contact 80$^a$, and brush 82$^a$ will be on a contact 79$^a$. Accordingly, the magnets of both groups 54$^a$ and 54$^b$ will be energized, and magnets 55$^a$ will not. As the contacts are moved further past the brushes, brushes 82$^a$ and 83$^a$ will not be on a contact, while brush 84$^a$ will be on a contact 81$^a$. The group of magnets 55$^a$ will then be energized, while the groups of magnets 54$^a$ and 54$^b$ will not. Further movement of the contacts past the brushes cause brush 84$^a$ to be moved clear of contacts 81$^a$, while brush 83$^a$ will be moved onto a contact 80$^a$ and brush 82$^a$ will be moved onto a contact 79$^a$. The magnets of both groups 54$^a$ and 54$^b$ will then be energized, and magnets 55$^a$ will not. Further movement of the contacts past the brushes will cause them to assume a relation to each other similar to that shown in the drawing, but with the brushes having such relation to the series of contacts next succeeding those shown.

By this means an unusual pattern is produced in which of one spiralling set of threads the first lies "over-one under-one, over-one under-one," etc., the second "over-three under-one, over-three under-one," etc., the third like the first, the fourth like the second, etc. While of the other set of threads the first lies "over-one under-one, over-one under-one," etc., the second "over-one under-three, over-one under-three," etc., the third like the first, the fourth like the second, etc. A development of a portion of this pattern is shown in Fig. 43$^a$.

Referring now to the modification shown in Figs. 10 to 13: The table in this type of machine is altered in design to provide a double track or raceway for two sets of carriages furnishing thread supplies which rotate in opposite directions about the braiding point. In addition to these oppositely rotating threads the table, which is stationary, also supports a series of reed members which are magnetically controlled and which serve to oscillate a third thread across the path of the oppositely rotating threads mentioned. Provision is also made during this oscillation to hold the third thread in central position, that is, between the two rotating threads.

The outer rotating thread, we may assume for convenience, rotates in a clockwise direction and passes to the braiding point from a carriage 127 which is substantially identical with the carriage 28 heretofore described. The lower portion of this carriage is guided in a manner similar to that already described, in the raceway 128, which is situated adjacent the outer edge of the frustum-shaped rim 129 of the table. Mounted adjacent the inner wall of the raceway channel is a segmental partition 130 constituting a series of spaced frustum-shaped posts, and upon the upper edges of these segments is mounted a series of removable bands 131 spaced from one another and each of the same length. The purpose of the removable bands 131 will appear hereinafter. Upon the outer face of these bands the inner face of the upper rolls of each carriage 127 travels. The outer face of these upper rolls is guided in a manner similar to that already described by a removable band 132 provided with equidistantly spaced grooves 133 on the inner periphery thereof. This band is seated upon and held in position by a series of supports 134 corresponding to supports 51 described heretofore.

The wall upon which the partition 130 is mounted serves as a common wall between the raceway 128 and a second channel 135 forming a raceway concentric therewith and positioned wholly within the rim of the table 15. The lower wheel members of a second carriage 136, which rotates in an opposite direction to carriage 127, or counter-clockwise, are held in position and guided within the walls of this channel 135. Fastened against the inner wall of the channel 135 is a series of segmental plates 137 constituting spaced frusta. The spaces serve, in conjunction with a band 138 fastened to the inner faces of the plates, to provide a series of grooves 139. The spaces between the plates and bands 130 and 131 and the grooves 133 and 139 are in substantial alinement for a purpose hereafter set forth.

The carriages 127 and 136 may be removed from the machine in a manner similar to that already related by virtue of the construction above set forth. In order to remove the carriage 127, the band 132 is lifted from its seat on the uprights 134 and the carriage may then be tilted so that the lower wheel members clear the overhanging edge of the V-shaped groove in the outer wall of the channel 128, whereupon the carriage may be lifted out bodily. The removal of the carriage 136 is effected in a similar manner by the removal of the bands 131, permitting a similar tilting of the carriage.

The rotation of the carriages 127 and 136 is magnetically accomplished in a manner similar to that already set forth. A series of magnets 140 is positioned upon the periphery of a wheel 141 mounted to be rotated by the shaft 3. These magnets 140 operate through the thin plates 137 upon the upstanding magnetic arms 142 of the carriage 136. Upon rotation of the shaft 3 and energization of these magnets, the carriage will be forced to rotate counter-clockwise therewith.

Similarly, the series of carriages 127 are rotated by a second series of magnets 143 positioned slightly above and about the outer edge of the rim 129. These magnets 143 are rotated in a clockwise direction upon rotation of the gear 22, which is provided with a flange 144 on the sleeve thereof, to which flange the magnets 143 are secured by yoke-shaped arms 145. The poles of magnets 143 act upon the upright magnetic arms 146 of the carriage 127. The supporting arms 134 are grooved at 147 in order to bring the magnet poles closer to the upright magnetic arms 146 of the carriage.

Attached to the under-surface of the rim 129 is a double set of radially alined electromagnets 148 and 149, between each pair of which an armature-controlled reed member 150 oscillates. Instead of occupying one or the other of two positions, as described in connection with Figs. 1 to 8, the reed member 150 in Figs. 10 to 13 occupies one of three positions when at rest at any given time. In other words, it occupies a position at one time against magnet 148, then an intermediate position between the two magnets, and then a position against magnet 149. This is accomplished as follows: The reed is pivotally mounted at 151 opposite the end through which the thread passes, upon the framework 152 which is attached to the rim 129 and supports the magnets 148 and 149, as shown more clearly in Fig. 13. Intermediate its ends the reed is provided with an armature 153 by which it is attracted towards the magnets. The intermediate position is secured through the action of a leaf spring 154 also secured to the frame 152 and projecting rearwardly of the pivotal point 151. Mounted on the reed adjacent this pivotal point is a plate 155 provided with rollers 156 and 157, which are pressed by the spring. When the reed is attracted to the left in Fig. 13 it will swing about the pivotal point and the roller 156 will alone remain in engagement with the spring and will force it downwardly. When the magnetic attraction exerted by the magnet 148 ceases, the spring will tend to resume its normal position and thus force the reed back into its middle position, which is also the normal position thereof. Similarly, when the reed is attracted to the right, the roller 157 will bear down upon the spring, and when the magnet 149 is de-energized the spring will return the reed to its middle position.

The thread supply and thread tensioning means for this oscillating thread which passes through the reed 150 is substantially identical to that described in the previous figures, the whole being fixed on the table. It will be also understood of course that the arc-shaped slots 158 (see Fig. 11) are substantially the same and serve a similar purpose as the slots 29 already mentioned.

The control of the various magnets as set forth diagrammatically in Fig. 12 is somewhat similar to that described in connection with Fig. 3. The inner set of magnets 140 is controlled through the slip ring 159 mounted on the lower end of the shaft 3 below the base 1. Current flows from the battery 69 through wire 160, through brush 161 bearing on the slip ring 159, through wire 162 and the series of magnets, returning through a ground on the machine. Thus these magnets will be continuously energized.

Similarly, the set of magnets 143 are connected to the battery through wire 160, brush 163, slip ring 164, mounted on the sleeve of the beveled gear 22, through wire 165, then through the series of magnets to a ground on the machine.

The oscillation of the reed effected by the magnets 148 and 149 is controlled by the two sets of commutator segments 166 and 167 which are mounted upon an insulating sleeve secured to the bevel gear wheel 4, which control, respectively, magnets 148 and 149. These commutator segments 166 and 167 are rotating in a counter-clockwise direction and according to the showing in Fig. 12 the set 148 has attracted the armature to throw it outwardly or to the left in Fig. 13. The current then passes from the battery through wire 160, brush 161, slip ring 159, through wire 168ᵃ connected to the commutator segments, through brush 169 resting on one of the commutator segments 166, then through the series of magnets 148, returning to the ground on the machine and back to battery.

It will be noticed that the brush 171 which contacts with the series of commutator segments 167 has reached a longer space than those provided between the commutator segments generally. When the brush 169 moves off of its segment the brush 171 will still be within this space, so that both sets of magnets will at that time be de-energized, which will permit the reed to assume its middle position. Further movement in a counter-clockwise direction will bring the brush 169 again into contact with the next commutator segment 166, and shortly before this contact is broken the brush 171 will contact with the next commutator segment 167 to throw the reed across to magnet 149. The making of the circuit for the series of magnets 149 before the interruption of the circuit in series 148 is accomplished in a manner heretofore indicated, namely, by spacing the commutator segments a shorter distance apart than the length of an individual segment. When circuit has been made by the brush 171 with the segment 167, current will flow from the battery 69 through wire 160, brush 161, slip ring 159, wire 168ᵃ, commutator segment 167, brush 171, through the series of magnets 149 to a ground on the machine, and back to battery.

Referring now more specifically to the embodiment shown in Figs. 14 to 16, there is shown a stationary table or turret 173 supported by legs 174 on an annular base 175 which is attached to the floor or other suitable support. The outwardly inclined flange 176 of the turret provides two raceways similar to the raceways 128 and 135 shown in Fig. 10. These raceways support the lower roller members of carriages 127 and 136, also similar to the showing in Fig. 10.

Concentric with the raceways mentioned and occupying positions respectively on either side thereof are channels 177 and 178. One wall, 179, of channel 177, which is substantially perpendicular to the base 176 of the turret, is secured to the extremities of the legs 174. Extending upwardly from the wall 179 is another series of supports 180 used to retain an annular band 181 provided with grooves 182 in the outer periphery thereof. A series of removable segmental bands 183 mounted in a similar manner to the segmental bands 131 upon posts intermediate the raceways 128 and 135 is also provided. The bands 183 are spaced apart, the spaces being positioned in radial alinement with the grooves 182 in a manner similar to that heretofore related. Mounted on the outer wall 184 of the channel 178 is another series of inwardly inclined supports 185, upon which is seated a third band 186 having grooves 187 in the inner periphery thereof in radial alinement with the spaces between the bands 183 and the grooves 182. The spaces, as heretofore, serve to permit the passage of the oscillating thread therethrough, and the grooves permit the thread to rest therein at the extremities of its throw during the passage of the thread carriages thereover. By the removal of the bands 183 and 186, the thread carriages 127 and 136 may be removed in a manner similar to that heretofore related.

The thread carriages 127 and 136 are rotated by rotating magnetic fields induced respectively by a series of magnets 188 substantially radially alined in the channel 178 and a series of similarly positioned magnets 189 fixed in the channel 177. The rotation of the magnetic fields is effected in a manner hereinafter set forth and as shown in Fig. 15 is counter-clockwise for the magnets 188 and clockwise for the magnets 189. The device for oscillating the thread which interweaves with the two rotating threads is similar to that described in connection with Fig. 10, comprising two oppositely disposed radially alined electro-magnets 148 and 149 which control an armature-operated reed 150, which, as in the figures already described, occupies successively a middle position, a position to the left of the middle, or a position to the right of the middle. The oscillating thread is fed from a bobbin or other supply similar to that heretofore set forth and circumferentially spaced about the annular support 175.

The means for providing the successive positions of the reeds 150, as shown in Fig. 14, comprises a pair of pattern mechanisms or perforated-sheet control devices 190 and 191, through which contact is made and broken in the electric circuits. Joining the sets of magnets 188 and 189, 148 and 149 is a source of current supply 192.

Sheets 190 and 191 are provided with longitudinal rows of perforations 193 and 194 respectively (see Fig. 15), which are positioned adjacent the edges and which are adapted to receive the pins 195 and 196 positioned on the peripheries of the sets of rollers 197 and 198. One of the rollers 197 is used as a driving means for the perforated sheet 190, the driving being effected by means of a ratchet 199 and pawl 200 associated therewith positioned on the end of a spring-held link 201 pivotally connected to a lever 202, which in turn is joined to a second lever 203 by an intermediate link 204. At the pivotal point of the lever 202 is a bar 205 of conducting material from which projects a series of spring fingers having ends projecting vertically downward and at right angles to the body portion.

On the extremity of the lever 203 opposite its connection with the link 204 is a cam roller 206 operating upon a cam surface 207 which is secured to a shaft 208 adapted to be driven by a suitable source of power. Substantially diametrically opposite the roller 206 is a second roller 209 positioned on the end of a lever 210 connected with a second lever 211 by a link 212. Situated on a bar 213 projecting horizontally at the pivotal point of the lever 211 is a second series of contact fingers similar to those already described as projecting from the bar 205. The lever 211 operates through a link 214 situated at its lower extremity through a pawl 215 and ratchet 216 to drive the roller 198, whose pins 196 projecting through the perforations 194 serve to rotate the perforated sheet 191.

The two sets of contact arms situated on bars 205 and 213, respectively, serve to control the passage to its successive positions of each of the armature-controlled reeds 150, operated by the series of electromagnets 148 and 149.

Referring to Fig. 15, it will be noticed that when the contact bar 205 is lowered the finger 217 will make contact in the perforated sheet 190 with a segment 219 forming part of a segmental bar 220 consisting of alternate plates of conducting and non-conducting material. The segmental bar 220 extends beneath the perforated sheet and from side to side thereof in such position that the tips of the downwardly projecting portions of each of the fingers may contact with the conducting segments to transmit current thereto. Of course, the establishment of contact between the fingers and the segmental bar will be accomplished only when a perforation permits the finger to project through the perforated sheet.

When the bar has been lowered a circuit is closed from the storage battery 192 through wire 221, through contact brush 222 lying against a conducting ring 223, and through timer ring 224 mounted about the shaft 208, and provided with circumferentially spaced peripheral segments 225, the circuit being completed through brush 226 bearing on the periphery of the timer, through wire 227 to bar 205, through contact finger 217, segment 219, wire 228, to branching point 229, where the current passing through the circuit divides, part passing by wire 230 to branching point 231, where the current again divides, part passing by wire 232 through a winding which surrounds a portion only of one of the outer magnets of the group 148. This portion of the winding is grounded on the frame of machine at 233 and the current passes from this frame back to the battery via wire 234.

That portion of the current which is diverted at the branching point 229 passes via wire 235 to an outer magnet of the group 148, this magnet being diametrically opposite the magnet just described in this group. The current traveling along the wire 235 passes through a winding on its magnet occupying approximately half of its length and is grounded on the machine at 236, passing thence back to the battery via the wire 234.

It will be noted that the establishment of these circuits will cause the reed members 150, associated with the magnets mentioned, to move outwardly to their outermost position in a manner already described in connection with Figs. 10 to 13. It is intended that the timer 224, according to this embodiment, will rotate in a clockwise direction, and it will be noted that when it has moved through a comparatively short arc the brush 226 will make contact with one of the peripheral insulating segments 225, whereby the flow of current will be cut off from the two diametrically disposed magnets of the group 148, and they having been de-energized, the reed 150 will return to its middle position in a manner heretofore described. Subsequent to the cessation of current in the circuit mentioned, the bar 205 will be raised and simultaneously the perforated sheet 190 will be advanced as hereinafter set forth.

When the sheet 191 has been advanced to a position where it will permit the establishment of a circuit through the fingers attached to the bar 213, this contact will be established by the finger 237 passing through a perforation on the sheet into engagement with a segment 238 forming a part of a segmental conductor 239 similar to the conductor 220 heretofore described. When contact has thus been established current will pass from storage battery 192, wire 221, brush 222, contact ring 223, timer 224, which, having rotated clockwise, will have brought a conducting portion thereof into engagement with a brush 240, through which current will pass via wire 241, conducting bar 213, finger 237, wire 242 to branching point 243, where the current will split, part passing by wire 244 to branching point 245, where the current will again split, part passing by wire 246 to one of the group of magnets 149 through a winding thereof occupying approximately half the length of the magnet, and to a ground 247 on the machine. From thence via wire 234 to the battery 192.

The current which splits at 243 passes by wire 248 to a second magnet of the group 149 which is diametrically disposed with respect to the magnet of this group just mentioned. The current passes through a partial winding on this magnet and is grounded on the machine at 249, passing thence to the battery via wire 234.

The number 217 forms one of a pair of brushes mounted on the bar 205, the other brush of this bar, designated 250, being adapted to control the diametrically disposed magnets of the inner group 149 just mentioned. This control is effected when contact is made by the downward throw of the fingers connected to bar 205, the finger 250 passing through a suitably spaced perforation in contact with a segment 251 of the conductor 220. Current will then pass from battery 192 through wire 221, brush 222, ring 223, timer 224, brush 226, wire 227, bar 205, finger 250, contact segment 251, wire 252 to branching point 253, where the current will split, part passing via wire 254 to branching point 255, where the current will again split, part passing via wire 256 to one of the group of magnets 149, by which it will pass by a partial winding to a ground at 257, thence by wire 234 to the other pole of the battery. Current will pass also from branching point 253 via wire 258 to a diametrically opposite magnet of the group 149 heretofore mentioned, through a partial winding to the ground 259, thence to the other pole of the battery, via wire 234.

Similarly, brush 237 is one of a pair of brushes, the other one designated by the numeral 260 being adapted to control the diametrically disposed magnets of the outer group 148. When the sheet 191 has been advanced so as to bring a perforation to a point where finger 260 may pass therethrough, contact will be established with a segment 261 in the segmental bar 239. When such contact has been established current will flow from the battery 192 through wire 221, brush 222, ring 223, timer 224, brush 240, wire 241, bar 213, finger 260, wire 262 to branching point 263, where the current will split, a portion passing via wire 264 to branching point 265, where the current will again split, part passing via wire 266 to a second partial winding on one of the group of magnets 148, and thence to a ground 267 on the machine, and thence to the other pole of the battery by the wire 234.

From branching point 263 current will also pass via wire 268 to a second partial winding on a magnet 148 diametrically disposed with respect to the magnet of group 148 just mentioned. Current will pass through this partial winding to a ground 269 on the machine, and thence via wire 234 to the other pole of the battery.

According to the arrangement of the circuits thus noted, a control of any one of the magnets in either of the groups 148 or 149 may be effected from either one or the other of the perforated sheets 190 and 191. The pattern sheets 190 and 191 can be provided with perforations which will cause fingers on bars 205 or 213 to make contact with conductor segments to which are connected wires 105ª leading to the beater magnets 98, as indicated in Fig. 14. The magnets 98 will operate the beaters 93 in the manner previously described. The take-up mechanism is similar to that previously shown and described and will be operated by means of perforations in the pattern sheets, which perforations will cause fingers on bars 205 or 213 to make contact with a conductor segment to which is connected a wire 122ª (see Fig. 14) leading to the take-up magnet 121. It will be evident that the pattern sheets can be arranged to cause the beaters to operate in different times adapted to patterns woven. A similar provision can be made for controlling the take-up mechanism.

The cam surface 207 which serves to effect the alternate throw of the bars 205 and 213, as hereinafter more specifically set forth, is in this embodiment substantially triangular in outline, and it will be observed that the peripheral insulating segments 225 on the timer 224 are placed in such position with respect to the cam surface that their central points lie substantially opposite the central points of the three sides, respectively, of the cam surface. It will furthermore be noted that the segments 225 are shorter in peripheral length than the intermediate conducting portions of the timer therebetween, but longer than the points of the cam. According to this construction the brushes 226 and 240, which are substantially diametrically disposed, will make contact and permit the flow of current through those circuits of which they form part only after the throw of either of the bars 205 or 213 to conducting position. On the other hand, the interruption of the circuit will occur just before the throw of either of these bars out of contacting position. Thus, in either case, the throw of the bars into contacting position or out of contacting position occurs when there is no current passing. This provision is made in order that there shall be no arcing between the ends of the fingers and the segmental bars 220 and 239, with consequent excessive wear of the fingers and injury to the perforated sheets, particularly if they are made of paper. According to this construction, further, the circuits due to the perforations in sheet 190 are set up before the circuits due to perforations in sheet 191 are broken, and vice versa. By this peculiarity any magnet or set of magnets desired can be kept continually energized, first through one of its windings and then through the other of its windings, and this in spite of the intermittent action of the perforated sheets and attendant mechanism.

From branching point 231 part of the current which has proceeded from storage battery 192, through wire 221, brush 222, ring 223, timer 224, brush 226, wire 227, finger 217, wires 228 and 230, will proceed via wire 270 to a partial winding of one of a group of outer magnets 148 on a second braider situated adjacent the braider just described. The current after passing through this partial winding will be grounded at 271 on the machine and from thence will pass to the same source of current in a similar manner to that already described. The operations of this magnet may thus be controlled by the pattern mechanism, as well as, if desired, a diametrically opposite magnet 148 (not shown) in the second loom. There is shown a magnet of the group 149 in the second loom which may also be controlled by member 190 through circuit passing from the branching point 255, and already heretofore traced up to that point, by a wire 272 to the partial winding of this magnet of the group 149 and thence to a ground 273 on this second loom, this magnet, as shown, being oppositely disposed to the magnet just mentioned. Similarly, control may be effected through the sheet 191 and parts associated therewith, current passing therefrom as desired to branching points 245 and 265, and thence by wires 274 and 275, respectively, to partial windings on the magnets of the groups 148 and 149, and thence, respectively, to grounds 276 and 277.

Although only a partial winding of this second loom and its control by the perforated sheets is shown, it will be readily understood that the whole of its operation may be readily controlled from this single pattern mechanism. The pattern mechanism is, in other words, capable of acting as a master control for a number of looms, which may be operated thereby at any convenient distance.

In order that the thread shift magnets shall operate uniformly at such times, during movement of the oppositely rotating shuttles, as will permit the shifting movement of the threads, the shaft 208 controlling the thread shift magnets is also used for rotating a commutator which causes oppositely rotating magnetic fields for actuating the oppositely rotating shuttles. The commutator for developing the rotating magnetic fields comprises a series of six radial arms 278 which in the embodiment shown in Fig. 14 are electrically connected to the shaft 208 carrying the conducting ring 223. The arms 278 are equidistantly spaced and provided on their ends with contact members 279, which in their rotation are adapted to successively contact with a circularly arranged series of contact blocks 280 positioned on the inner periphery of an annular supporting member 281. The contact members 280 are suitably connected by wiring 280ª with the sets of magnets 188 and 189, there being one contact block for one magnet of each set. Upon rotation of the arms 278 by the shaft, the two sets of magnets will be successively energized as successive contacts are made between the contact members 279 and contact blocks 280, thus setting up the oppositely rotating magnetic fields.

The actual wiring of the fields is shown more clearly by the diagram in Fig. 16. Current passes from the storage battery 192 there shown through wire 282, through shaft 208, one of the arms 278 and contact member 279, through one of the contact blocks 280, wire 283, to a branching point 284. Thence by wire 285 to a branching point 286, thence by wire 287, through the winding of one of the inner sets of magnets 189, from which it passes to a ground 288 on the machine, thence by a wire 289 to branching point 290, and from there through wire 291 to the other pole of the storage battery 192. From branching point 286 current will also pass through wire 292, through the coil of one of the outer sets of magnets 188, and thence to a ground 293, thence by wires 289 and 291 to the opposite pole of the battery 192.

It will be seen, according to this construction, that the making of contact between the contact members 279 and 280 will serve to energize one magnet in each of the sets 188 and 189.

Upon further rotation of the member 278 in a clockwise direction the next contact member of the series 280 will be engaged by the contact member 279 and current will then flow, as heretofore pointed out, from the battery 192, through the wire 282, shaft 208, arm 278, contact members 279 and 280, through wire 294 to branching point 295, thence by a wire 296 to branching point 297, thence by a wire 298 to the coil of one of the series of electromagnets 189, shown to the right, or in a clockwise advanced position with respect to the last described magnet of this series. From thence current passes to a ground 299 on the machine and thence via wires 289 and 291, to the opposite pole of the battery 192.

From branching point 297 current passes via wire 300 through the coil of one of the series of electromagnets 188 shown to the right, or in a counter-clockwise advanced position with respect to the last magnet mentioned in this series. From thence current passes to a ground 301 on the machine, and thence via wires 289 and 291 to the opposite pole of the battery 192. It will be noted, according to this construction, that as the arm 278 has rotated in a clockwise manner to make successive engagements with the contact members 280, a current flow has been established in both the outer and inner sets of electromagnets 188 and 189. In the outer set, however, the energization of the electromagnets has proceeded in a counter clockwise direction, and in the inner set the energization of the electromagnets has proceeded in a clockwise direction. It will be readily understood that as the arms 278 progress about the circularly disposed series of contacts 280, since there is provided one such contact for each pair of outer and inner magnets 188 and 189, magnetic fields progressing in a circular direction will be set up by these magnets in a manner similar to that already indicated for the two magnets in each set described.

It will be observed that in place of the perforated sheet pattern control mechanism shown in Figs. 14 and 15, in the diagrammatic showing in Fig. 16, a commutator has been employed to actuate the magnet controlling the throw of the oscillating reed member 150. It will be understood that this commutator control may be employed under certain circumstances where simplicity of the weaving process warrants it, but in those cases where a more intricate pattern is being produced, it will be preferable to employ the perforated sheet control. It will be evident that the perforated sheet control is also preferable, owing to the fact that the pattern to be produced by the perforated sheet can be more readily changed than can the pattern to be produced by means of the commutator.

The commutator control comprises a series of circularly disposed segments 302 connected by wires 303 and a second inner set 304 concentric therewith similarly joined by wires 305. Brush members 306 and 307 mounted on the spoke 308 of a supporting wheel contact respectively with the outer and inner segments. The brush 307 is shown as in contact with one of the series of segments 304. In this position current passes from battery 192 through wire 282, spoke 308, brush 307, segment 304, wire 309 to branching point 310, through wire 311, through the magnets 149 of the inner set, which are connected in series, to branching point 312; thence by a wire 313 to branching point 314, by wire 315 to branching point 290, and thence by wire 291 to the other pole of the battery. It will be observed that at the position indicated during the passage of the brush 307 over commutator segment 304 the brush 306 is out of contact with the series of segments 302. Further rotation of the brush 307 in a clockwise direction will break the circuit mentioned through the inner set of magnets 149, when the reed 150 will assume its intermediate position. Before brush 306 makes contact with segments 302, the brush 307 will again make contact with one of the segments 304 to again establish the circuit mentioned and the attraction of the armatures to the position shown in Fig. 16. Just before this second circuit is broken the brush 306 makes contact with one of the segments 302, and upon slight further rotation the contact with the inner segment will be broken. Current will then pass from the outside segment through wire 316 to branching point 317, thence by wire 318 to the outer series of magnets 148 which are connected in series, returning then to branching point 312 through wires 313, 315 and 291 to the battery. This will serve to throw the reed member 150 into its outer position.

It will be noted that the circle of the inner segment 304 has a wide gap corresponding to that already mentioned in connection with the outer circle, and during the period when the brush 307 is passing over this gap brush 306 makes and breaks circuit.

It will be noted that the commutator reed control, as well as that of the rotating magnetic fields may be applied to a series of braiders employing fields and magnetically controlled oscillating reeds as described in connection with Fig. 15. In Fig. 16 the circuit branches from branching point 284 and current flows from that point via wire 319 to branching point 320, where it splits and a portion passes through one of the series of inner magnets 189 to a ground on the machine at 321, returning via wire 322 to branching point 290 and wire 291 to the storage battery 192. From the branching point 320 current travels via wire 327 to one of the set of outer magnets, 188, this pair of magnets being similarly disposed with respect to one another, as the pair of magnets in the first loom.

Current also flows from the branching point 295 when the rotating arm has advanced clockwise to the next contact block, shown in Fig. 16, passing via wire 323 to branching point 324 and via wire 325, through a magnet in the inner group of magnets in advanced clockwise position with respect to the one just previously described, to a ground 326, thence via wires 322 and 291 to the battery. Current also continues from branching point 324 via wire 327 to a magnet in the outer group disposed in a counter-clockwise advanced position with respect to the magnet in this group just previously described.

By similarly connecting the pairs of magnets in different looms with the control apparatus, a series of looms may be so controlled; and the commutator and allied parts may be positioned at a near or remote point, as desired.

In summary of the preceding detailed explanations, the operation of this embodiment of the device is as follows: The shaft 208, upon rotation, will bring the surfaces of the cam member into contact with the rollers 206 and 209 to alternately raise and lower the contact fingers positioned on the bars 205 and 213. Upon lowering of these contact fingers, one or more thereof will pass through perforations in either one or the other of the perforated sheets 190 and 191, and upon raising the fingers the ratchet and pawl mechanism will serve through the driving pins on the rollers 196 and 197 to move the sheets along to a new position for the making of another contact. Of course, it is to be understood that this cam surface may be of any desired form and that the contact established may be regulated in accordance therewith. Furthermore, it will of course be obvious that various perforations may be made in the sheet to permit of a variety of contacts and the weaving of an extremely intricate or extremely simple design, as required.

Contact having been established through either one or the other of the sets of fingers, current will flow according to the contact made from the battery 192, through the fingers which are contacting with the segmental conductor, and through wires to the magnets 148 and 149 for controlling the throw of the reed member 150 in the manner heretofore set forth in detail. Thus the throw of the various oscillating threads may be controlled in any desired manner.

The rotation of the shaft 208 will also cause the continuous rotation of the arms 278, which will establish successive contact between the circularly arranged contact blocks 280 and contact members 279 located on the ends of the arms. Contact having been established, current will flow from the battery in the manner heretofore set forth in detail to the various magnets of the inner and outer set 188 and 189, which will be energized in a counter-clockwise and clockwise manner, to set up similar rotating magnetic fields. It will be noted, as shown more clearly in Fig. 15, that the armatures of the thread carriers 127 and 136 are provided with beveled portions 328 and 329, respectively. The bevel 328 is on the right end of its armature in Fig. 15, and the bevel 329 is on the left end of its armature in co-operation with the advancing fields. These beveled portions will cause the carriages with which they are associated to travel in a counter-clockwise and clockwise direction, respectively, since the armatures of each carriage extend for a distance equal approximately to that between the three magnets. By this arrangement the flux traveling from the magnet adjacent the bevel 328 will be normal to the bevel and hence inclined to the lines of flux passing through other parts of the armature. As a consequence the armature will move to assume a position with the greatest number of normal lines of flux therethrough. This movement will be in the direction in which the bevel points.

As the two sets of carriers revolve as described, and as the reeds 150 are oscillated from side to side or from side to center or center to side, in sequence and at times determined by the perforated pattern mechanism or commutator mechanisms described, it is clear that the threads controlled by the reeds 150 will be traversed across the paths of the carriers 127 and 136. These threads, therefore, while not revolving will be intertwined with the two sets of oppositely revolving threads from the carriers in such manner as to form a fabric, in which many novel patterns may be produced.

Referring now more specifically to the modification shown in Figs. 17 to 20: The embodiment of my invention as here set forth is similar to those already described. The dished turret or table 15 is here shown as rotatable and suitably held by an elongated hollow shaft 330 projecting from the lower portion of the table. This shaft is driven by an outside source of power through a pulley 6 and beveled gear similar to that heretofore described, the beveled gear 5 coacting with a second beveled gear 331 driving a second set of beveled gears 332 comprising three gears, the lowermost of which is attached directly to a shaft 333 extending upwardly through the shaft 330. The gears and structure in general are suitably supported by uprights 334.

The upper end of the shaft 333 is secured to a spoke wheel 335, and spaced at intervals about the outer periphery of this wheel, as shown more clearly in Fig. 19, is a series of short knobs or spikes 336 attached to the periphery. The surface of the wheel is frustum-shaped and the spikes project substantially perpendicularly from its surface.

Spikes 336 serve as a support for a series of bobbins which comprise a framework (see Fig. 18) having side bars 337 of magnetic material provided with conical shaped cavities therein for the reception of the spikes 336. The retention of the bobbins on the wheel surface is aided by a projecting flange 335ª on the bottom of the wheel 335, the flange extending outwardly so that its outer extremity is on a line with the tips of the spikes.

Opposite the cavities 338 in the side bar 337 are similarly shaped cavities 339 adapted to be engaged by similar spike members 340 attached to a curved leaf spring 341 secured to bars 342 attached to the ends of a pair of horse-shoe magnets 343. These magnets form one pair of a circumferentially spaced series of magnets, which, with the parts just described, are suitably secured in a manner hereinafter described, in a position to attract and hold the shuttle members. The leaf spring 341 is bent inwardly and secured between magnets 343, so that its inner face contacts with the bar 342. The outer ends of the spring are adjusted to position by means of screws 344 and lock nuts.

The series of magnets 343 are supported by a series of substantially radially disposed arms 345, which in turn are attached to a revoluble plate 346 having a boss 347 on the lower surface thereof providing shoulders which bear against the upper surface of an annulus 348 supported by the arms 334. The boss 347 surrounds the hollow shaft 330, and its lower end is provided with a beveled gear 349 coacting with the driving gear 5, whereby the arms 345 with their attached magnets are driven in the same direction as the shuttles, at the same speed, so that the magnets are always opposite the shuttle to be attracted.

The shuttles each comprises a spool 350 mounted on an axle and suitably supported by bearing surfaces in the side bars 337. The spools supply thread or other material to be woven upwardly toward the weaving point A, suitable tension being provided for the thread by a series of tension pegs 351 supported adjacent the extremity of one of the two upwardly projecting vertical bars 352 attached adjacent the middle of the side bars 337. Between the two vertical bars 352 is a roller 353 over which the thread passes on its way to the tensioning device.

The rear of the frame of each shuttle is hinged at 354 and a catch 355 is provided so that it may be held firmly closed. In order to remove the spool for replacement or other reason, the rear of the bobbin is opened and a latch 356, which is held on one of the vertical arms 352 in position above the cavity in the side bar 337, in which one side of the axle of spool 350 rests, is swung aside so that the spool may be lifted away from its bearings and retracted through the open end of the bobbin. The forward portion 357 of the framework of the bobbin is prow-shaped for a purpose hereinafter described.

An oscillating thread is provided which interweaves with the rotating thread supplied by the bobbin in a manner similar to that heretofore set forth. The oscillating thread is held by a reed 358 provided with an armature 359 thereon adapted to be attracted by one of a series of electromagnets 360 secured to the underside of the turret.

This series of reeds, electromagnets and devices associated therewith is the same for each oscillating thread, and a description of one will suffice for all. The thread passes through an eye in the reed and upwardly to the weaving point. It is adapted to be thrown to its innermost position by means of the magnet 360, and when the magnet 360 has been de-energized is adapted to be thrown to its outermost position by means of a spring 361 suitably secured to the underside of the turret and substantially radially disposed with respect to the magnet. The oscillating thread is fed from a bobbin and thread tensioning means supported on an annulus 362 held in fixed position by means of arms 363 attached to the under part of the rotating turret.

The means for energizing and de-energizing the two series of magnets 343 and 360 is shown more clearly in the diagrammatic representation of Fig. 20. Current flows from the storage battery 364, through wire 365 to point 366, thence via wire 367 to a brush 368 contacting with a slip ring 369 connected by a wire 370 with the series of horse-shoe electro-magnets 343 which are connected in series, returning by wire 371 to a series of commutator segments 372 which are connected by means of a brush 373 to the other pole of the battery 364.

Current passes also from point 366 via wire 374, brush 375, ring 376, wire 377 to the magnets 360, which are connected in series, returning by wire 378 to ring 379, thence through brush 380, wire 381, to the series of commutator segments 372, thence via brush 373 to the other pole of the battery. Slip rings 376 and 379 are attached to the hollow shaft 330, as shown in Fig. 17. Slip ring 369 and commutator segments 372 are attached to the boss 347. The brushes 375, 368 and 373 are supported on the upright members 333 of the frame. Brush 380 is supported by a downwardly projecting member 382 attached to the under-side of the beveled gear 349. The wires joining these parts are preferably led up through suitably insulated channels to the magnets which they control.

It will be noted according to the structure set forth that the commutator segments and brush are adapted to control both of the circuits leading to the two sets of electromagnets.

The operation of the device is substantially as follows: Upon rotation of the wheel 335 and of the revoluble plate 346 carrying the arms 345 with their attached magnets, the threads from the bobbins are given a rotary motion, and as the brush 373 makes and breaks contact with the commutator segments 372, the magnets 343 will alternately attract and let go the bobbins. The interval during which the magnet 343 is deenergized is normally so short, that the bobbin cannot fall. It will be thrown sharply away from the magnet 343 by spring 341, will engage conical spikes 336, and will as it rebounds be reattracted by magnet 342 onto other guide spikes 340 before gravity can have a sensible effect. The spikes 336 and 340 thus continually re-position the bobbin. It is moreover impossible for it to entirely fall as the distance between the tips of opposing spikes is slightly less than the width of the bobbin frame, as is evident from the drawings. At the same time that the contact is made and broken through the magnets 343 the circuit through the magnets 360 will, by means of contacts 372, wire 381, brush 380 and slip ring 379, be made and broken with consequent throw of the oscillating threads towards these magnets and an alternate throw away from the magnets by the spring members 361 when the magnets 360 are de-energized. The shuttles will thus follow a sinuous circular path, interweaving with the oscillating thread which travels in the opposite direction through a circular sinuous path, the front 357 of each shuttle member serving to aid the throw of the oscillating thread from side to side as it contacts therewith.

In the embodiment shown in Figs. 21 to 26 a construction is set forth similar to that already described in connection with Figs. 16 to 19. The present type differs from the previous type in that rotating electromagnets aided by springs cause the shuttles to reciprocate across the path of a non-oscillating thread which is rotating in the opposite direction. As shown in Fig. 21, a dished wheel 383 is mounted on one end of the central shaft which is driven, as heretofore, from an outside source of power through a set of beveled gears and supported as in Fig. 1, by the hollow base 1. The lower end of the spokes of the wheel diverge downwardly and on their periphery and perpendicular thereto is seated a series of horse-shoe magnets 384. A description of one of these magnets will suffice for all. Mounted across the face of each magnet are non-magnetic bars 385, against the center of which rests a leaf spring 386 provided on either side of the center thereof with conical spikes 387. The extremities of the spring are forced outwardly into a curved position by adjusting bolts 388. This construction of the inner magnets mounted on the rim of the wheel 383, as well as the construction of the oppositely disposed adjacent magnets, is substantially the same as the construction of the series of magnets 343. The bobbin carriage forming part of the shuttle is constructed as shown in Figs. 23 and 24, in substantially the same manner as the carriage set forth in detail in Fig. 17, including the side bars 337 with their conical cavities 338 and 339 for the reception of the conical shaped spikes mounted on the spring members. The bars 342 and 385 are provided with angularly disposed extremities 389, for a purpose hereinafter set forth.

The series of magnets 343 is held by a set of substantially radially disposed arms 389ª secured to a rotating shelf 390 provided with a boss 391, in the lower extremity of which is mounted a beveled gear 392 driven by a beveled pinion 393 mounted for operation by a set of gears 394, one of which is mounted on the main driving shaft 6.

About the boss 391 and suitably insulated therefrom is a set of commutator segments 395 and a contact ring 396, and coacting respectively therewith two brushes 397 and 398 mounted on an extension of one of the arms 7 of the supporting frame. Mounted about the lower extremity of the central shaft 3 is another set of suitably insulated commutator segments 399 and a contact ring 400, and contacting respectively therewith brushes 401 and 402 suitably supported by a downwardly extending member 403 attached to the hollow base 1.

Referring to the diagram of Fig. 26 there is shown the means for energizing the circuits passing through the two series of magnets. Current flows from the storage battery 404 via wire 405 to brush 401, which is shown as in contact with one of the segments of the series of 399. It then flows via wire 406 through the magnets 384 connected in series, returning to the contact ring 400 by wire 407, thence by brush 402 and wire 408 to the other pole of the battery. Similarly, the outer set of magnets is energized upon further rotation and contacting of brush 397 with its commutator segments 395. When this contact is made current flows from the battery 404 by wire 409 through brush 397, commutator segments 395, wire 410, through the outer magnets which are connected in series, returning to the contact ring 396 by wire 411, thence by brush 398 and wire 408 to the other pole of the battery. It will be noted that here, as in the preceding cases, the commutator segments 395 and 399 are arranged so that the former break joints with the latter, so that whenever a contact is to be made or broken, current will flow through the circuits including each set of commutator segments for a short interval.

Coacting with the rotating thread supplied by the shuttle is an oppositely rotating thread supplied from a bobbin and thread-tensioning device similar to that already described in the other figures. This device is mounted on arms 412 substantially radially disposed and attached to a rotating shelf 413 having a boss 414, to the lower end of which is secured a beveled gear 415 driven in a counter-clockwise direction by the main beveled pinion. Rotation in a counter-clockwise direction is thus imparted to the second thread supply.

The operation of this embodiment of the invention is as follows: The wheel 383 with its attached magnets is rotated in a clockwise direction and at an equal speed with the magnets 343. Simultaneously the second thread supply is rotated in a counter-clockwise direction, and as the shuttle follows a sinuous rotary path it interweaves the first and second threads in the well-known manner. The angular converging guides 389 insure prompt return of the deflected thread to a central position, eliminating errors due to vibration of this thread.

Referring now to the invention set forth in Figs. 27 to 29: A loom similar to those already described is here represented, including a rotating shuttle furnishing one thread supply and a second thread supply rotating in the opposite direction, being thus generally similar in these respects to the embodiment set forth in Figs. 21 to 26. In the present embodiment, however, the shuttle is given a "wriggling" motion by means of oppositely disposed magnets.

Referring now more particularly to Figs. 27 and 28: The central tubular shaft is there driven by a set of beveled gears, as heretofore, and on the upper end thereof is mounted a series of radial arms 416 having downwardly divergent portions on the extremities of which are mounted a series of pairs of single spool magnets, comprising the cores 417 and 418 provided with non-magnetic bars across the face thereof and leaf springs similar to the showing in Fig. 22. Each one of the leaf springs is provided with conical spikes or knobs 419 and 420 adapted for engagement with the shuttle, similar to those heretofore mentioned. Held by radially disposed arms 421 in an adjacent opposed position is a second series of pairs of magnets comprising core pieces 422 and 423. The outer magnets are also provided with the bars and leaf spring arrangement heretofore set forth and provided with similar conical engaging members or spikes 424 and 425 on the face of the spring.

The non-magnetic arms 421 are supported on the outer periphery of a table 426 which is mounted to revolve with the central shaft. According to this construction the inner and outer magnets, being held by members which are attached to the central shaft, will rotate at the same speed in the same direction.

A wriggling motion is given to the shuttle through the action of the magnets, and as shown more clearly in Fig. 28, this wriggling is caused by urging the shuttle to alternate diagonal positions between the two sets of magnets. By energizing pole 417 of one of the pairs of magnets of the inner set and the diagonally opposite pole 423 of one of the pairs of magnets of the outer set, the shuttle will lie in a diagonal position therebetween and consequently when these two poles are de-energized and the poles 418 and 422 which are diagonally disposed in a similar manner are energized, the shuttle will assume the alternate diagonal position. The shuttle shown in this embodiment is similar in general outline to those previously described, being provided with a substantially V-shaped head 427 and side bars 428 and 429, the side bar 428 being provided with cavities 430 and 431 to receive respectively the conical engaging members 419 and 420. Similarly, side bar 429 is provided with conical cavities 432 and 433 to engage respectively the conical engaging members 424 and 425. When the shuttle is thrown into the diagonal position shown in Fig. 28, the engaging members 420 and 424 will coact with their respective cavities to hold the shuttle in position, and when the shuttle is in its alternate diagonal position the engaging members 419 and 425 will engage with their respective cavities.

In order to carry out the energization and de-energization of the poles of the magnets, the electrical arrangement shown diagrammatically in Fig. 29 is employed. There is included a series of commutator segments 434 mounted about the lower portion of the central shaft and suitably insulated therefrom, a contact ring 435 similarly mounted and a second set of commutator segments 436, also mounted in a like manner. Brushes 437, 438 and 439 mounted on a downwardly projecting portion of the frame coact respectively with the commutator segments 434, ring 435 and segments 436. Commutator segments 434 control poles 418 and 422, these poles being connected in series. Similarly, commutator segments 436 control poles 417 and 423 which are likewise connected in series. When brush 439 makes contact as shown in Fig. 29 with one of the commutator segments 436, current flows from the battery 440 through wire 441 to brush 439 through segments 436, wire 442 to the poles 417 of each of the pairs of magnets of the inner series, thence through the poles 423 of the outer series of magnets to branching point 443, thence to the ring 435 and through brush 438 and wire 444 to the other pole of the battery. Subsequently, when the commutator segments of the series 434 have moved into contact with brush 437, the circuit will be broken through the poles mentioned and a new circuit established. Current will then flow from the battery 440 through wire 445, brush 437, commutator segments 434, thence by wire 446 to poles 418 of the inner series of magnets, thence to the poles 422 of each pair of the magnets of the outer series, thence to branching point 443, thence by ring 435, brush 438 and wire 444 to the other pole of the battery.

It will be observed that here, as in previous cases mentioned, the contact of the brushes with the commutator segments is alternately made, and that the segments of the series 436 break joints with those of the series 434 for the purpose herebefore stated.

The second thread supply is mounted on an annulus 447 and comprises the bobbin and thread-tensioning means similar to that heretofore described. The annulus is supported by radially disposed arms 448 loosely held about the central shaft by a collar 449 which is secured to a gear 450. The gear 450 meshes with a gear 451 mounted on the extremity of one end of the shaft 452, to the other extremity of which is attached a gear 453 meshing with a gear 454 secured to an annular boss 455 forming part of the fixed supporting frame for the loom. The shaft 452 has bearings in a cap 456 attached to the rotating table 426, and the other end is secured in a second cap 457 mounted on a frame-work 458 secured to the table 426. According to this disposition, as the table 426 rotates it will carry around with it the gear 453, which will rotate about the fixed gear 454 and will transmit its motion to the gear 451, which, being of larger diameter than gear 453, will cause the gear 450 to rotate in an opposite direction to the table. Thus the second thread supply will rotate in a counter-clockwise manner, while the shuttle will rotate in a clockwise direction.

In operation, clockwise rotation of the shuttle having been set up through rotation of the central shaft, the thread from the shuttle will pass in a wriggling manner with the alternate diagonal energization of the poles of the inner and outer magnet pairs, and the thread coming from the second thread supply will rotate in a counter-clockwise manner, and in accordance with the wriggling motion of the shuttles will cross over and under the first thread with the resulting interweaving at the point A.

One point of superiority of this embodiment of my invention lies in the fact that by this wriggling motion of the shuttle, the whole mass of the shuttle is not translated or reciprocated, but pivots instead substantially about its center of gravity, consuming much less energy and therefore allowing of more rapid operation than the embodiment of Figs. 21 to 26.

Referring now to the showing in Figs. 30 to 35, there is shown a type of machine which is suited for the production not only of the simpler patterns, but also to the manufacture of lace materials in intricate designs, as well as those fabrics of various degrees of complexity between the simple and intricate designs mentioned.

This machine comprises a flat field 459, in this embodiment shown as a regular twelve-sided structure, mounted upon the surface of which are a number of fixed magnetic poles, visible in elevation in Fig 31 and in sectional elevation in Fig. 35, which are so arranged that shuttles comprising magnetic material and acting as armatures may be magnetically held therebetween and passed to adjoining magnetic poles along any desired paths in the production of the required design. The paths followed by the shuttles may be regulated by any desired control mechanism, similar, for example, to those already described, being preferably controlled as shown in Figs. 30 and 30ª by a perforated sheet mechanism similar to that set forth in Figs. 14 and 15. Each of the electro-magnets mounted on the flat field is connected with a source of energy, preferably a battery 460, from which current passes through the conductors associated with the parts of the control mechanism and to any set of magnets in accordance with the contacts established through the perforated sheet.

Taking one section of the field as typical of the remainder, it will be noted that there are three shuttles, 461, 462 and 463 which are traveling in the same direction and counter-clockwise with respect to the support 459, and three other shuttles 464, 465 and 466 which are passing in the same direction and clockwise with respect to the support 459.

Control of the motion of these shuttles is effected in the case of shuttle 462 by means of the series of electromagnets 467, 468, 469, 470, 471, 472, 473, 474, 475 and 476, which, acting successively, in pairs, serve to cause the shuttle to move in similar oppositely disposed curves until it reaches substantially the position occupied by the shuttle 466, that is, until its counter-clockwise motion is relinquished and it starts on the clockwise motion taken by the series of shuttles 464, 465 and 466.

The control mechanism, wiring, etc., in order to accomplish the motion of the shuttle just outlined, will now be described: Current passes from the battery 460 through wire 488, armature 489, contact block 490, wire 477, brush 478, contacting with the disk 479, passing then to the disk 480, brush 481, wire 482, contact bar 483, thence (according to Fig. 30) by a finger 484 which contacts through perforation 485 with conductor segment 486 of one of the pairs of segmental bars; thence by wire 487 through a partial winding of magnet 467, and thence to a ground on the support 459; returning thence to the battery by wire 580. Current at the same time passes from the battery through the circuits mentioned as far as contact bar 483 and then, according to the disposition of the perforated sheet shown in Fig. 30, through the finger 492, perforation 493, conductor segment 494, wire 495, to a partial winding on the magnet 468, thence to a ground on the support 459, returning to the battery through the wire 580, as heretofore described in connection with magnet 467.

With magnets 467 and 468 thus energized, the shuttle 462 will stand in the position shown in Fig. 30. In order to start it on its counter-clockwise course, it is necessary to de-energize the magnet 467 and energize magnet 469. This is accomplished by the cessation of flow of current through the fingers 484 and 492 due to brush 481 coming on segment 565 and by the flow of current from the battery through wire 488, armature 489, contact block 490, wire 477, brush 478, disk 479, and disk 480, brush 496, wire 497, contact bar 498, through finger 499, perforation 500, conductor segment 501, wire 501ª, to a second partial winding on the upper half of the magnet 468, passing from this partial winding to a ground on the magnet frame, thence to the support 459, thence by the wire 580 to the battery. Current will also pass from the contact bar 498, through finger 502, perforation 503, conductor segment 504, wire 505 to the upper partial winding on the magnet 469, thence to a ground on the frame of the magnet and support 459, and returning by the wire 580 to the battery. When the magnets 468 and 469 have been thus energized, the shuttle 462 will pass to a position lying therebetween and will thus start on its counter-clockwise course.

The next step in the travel of the shuttle 462 is to a position lying between the magnets 469 and 470. This is accomplished by establishment of contact through bar 483 and perforations in the sheet 507 associated therewith, and the subsequent breaking, at brush 496, the circuit established through contact bar 498, through perforations in the sheet 506 associated therewith. In the meantime sheet 507 will have advanced through the mechanism hereinafter described, so that the perforations 508 and 509 have come into alinement with the contact fingers. At that time said perforations will lie underneath the ends of the fingers 510 and 511, whereupon current will pass from the battery to contact bar 483 along the circuit heretofore described for the bar, thence through finger 510, perforation 508, conductor segment 512 lying thereunder, thence by wire 513 to the lower winding of magnet 469, thence by a ground to the base 459, returning to the battery. At the same time current will flow from the battery through the bar 483, contact finger 511, perforation 509, conductor segment 514 situated thereunder, thence by wire 515 to the lower winding on the magnet 470, thence to a ground on the base 459, and thence to the battery. When these contacts have been made the shuttle will move from its position between magnets 468 and 469 to a position between magnets 469 and 470.

The shuttle is urged to the next position in its course by energization of the magnets 469 and 471, and deenergization of the magnets 469 and 470. This is accomplished by establishing contact through the fingers 502 and 516 held by the bar 498. Contacts are established respectively through the perforations 517 and 518 which have been advanced to alinement with the contact fingers of bar 498, whereupon current will flow from the battery to the contact bar 498 through circuit heretofore mentioned and from the contact finger 502 will pass through perforation 517 to conductor segment 504, thence by the wire 505 to magnet 469, completing the circuit in the manner heretofore indicated. Current will also pass through the finger 516, perforation 518, conductor segment 519, wire 520, to an upper winding of magnet 471, thence to a ground on the upper frame of the magnet to the base 459, and returning to the battery by wire 580.

The next position occupied by the shuttle 462 will be between magnets 469 and 472, the energization of which will take place through bar 483, bar 498 having been cut out of circuit. As shown in Fig. 30ª, perforation 521 having been brought into alinement with the end of finger 522 through the motion of sheet 507, contact will be established with conductor segment 523 lying thereunder and current will flow therethrough and through wire 524 to the lower winding of the magnet 472; thence through the support 459, returning to the other pole of the battery by the circuit heretofore described. The energization of the magnet 469 takes place at the same time through the contact finger 510 which operates through perforation 525 which is advanced to a position thereunder and lies in alinement with the perforation 521. Current will then pass through finger 510, conductor segment 512 and wire 513 to the lower winding of the magnet 469, returning thence to the battery as heretofore described.

The next position occupied by the shuttle 462 will be between the magnets 472 and 473, their energization being accomplished through contact bar 498, which has been again lowered after advancement of sheet 506. The energization of magnet 473 takes place through contact finger 526 operating through perforation 527 to contact with conductor segment 528, from which current flows through wire 529 to the upper winding of magnet 473, and thence through support 459 to the opposite pole of the battery, as heretofore set forth. The energization of magnet 472 takes place through finger 530, perforation 531, which is in alinement with perforation 527, conductor segment 532, wire 533, passing to the upper winding of magnet 472, thence to support 459, and returning to the battery as previously described.

The next movement of the shuttle 462 will carry it to the position now shown as occupied by shuttle 463, that is, lying between magnets 472 and 474. The energization of magnet 472 will now be accomplished through contact bar 483, the sheet 507 meanwhile having been moved to a new position. In causing this energization, current will flow through contact finger 522, perforation 534, conductor segment 523, wire 524, to the lower winding of magnet 472, and thence to the battery as previously described. Magnet 474 will be energized through finger 535 contacting through perforation 536 which lies in alinement with perforation 534, conductor segment 537, through which and the wire 538 current will flow to the lower winding of magnet 474. While shuttle 462 has been traversing the path mentioned, the shuttle 463, which, as shown in Fig. 30, is about to commence a clockwise movement around the support 459, moves through successive positions to that occupied by the shuttle 466. In so doing the time of its passage between successive sets of magnets is twice as long as the time occupied by the shuttle 462 in travelling between successive sets. In order to accomplish this slower movement, the shuttle is alternatively held in position by sheet 507 and moved by sheet 506, instead of being moved by both sheets, as is the case with shuttle 462. Thus, at first, shuttle 463 is held between magnets 472 and 474 by current passing through bar 483. The energization of magnet 472 takes places through finger 522, perforation 539, conductor segment 523 and wire 524, passing to the lower winding of magnet 472 and thence to the battery in a manner similar to that already described. The energization of magnet 474 takes place through finger 535, perforation 540, conductor segment 537, wire 538, to the lower winding of magnet 474.

Passage to a position lying between magnets 472 and 475 is accomplished by energizing these magnets through bar 498. The magnet 472 is energized through finger 530, perforation 541, conductor segment 532, wire 533, passing to the upper winding of the magnet 472, and thence to the battery. Magnet 475 is energized through finger 542, perforation 543, conductor segment 544, wire 545, passing to the upper winding of the magnet 475, and thence to the battery.

The succeeding pause is accomplished by energizing magnets 472 and 475 by contacts established through the sheet 507. Current flows through the finger 522, perforation 546, conductor segment 523, wire 524, to the lower winding of the magnet 472. Current also passes through finger 547, perforation 548, conductor segment 549, wire 550, to the lower winding of magnet 475.

The next position occupied by shuttle 463 is that between the magnets 472 and 476, magnet 472 being energized by current flowing through finger 530, perforation 551, conductor segment 532, wire 533, to the upper winding of magnet 472. The energization of magnet 476 is accomplished by current passing through finger 552, perforation 553, conductor segment 554, wire 555, passing to the upper winding of the magnet.

The shuttle is then held between magnets 472 and 476 by suitable connections through the sheet 507. Thereafter it is advanced to a position between magnets 471 and 472 by suitable connections through the sheet 506 until it occupies the position shown in Fig. 30 as occupied by the shuttle 466.

During the movement of the shuttles 462 and 463 as described, the shuttle 466 will pass to successive positions between the following sets of magnets: 469 and 472, 469 and 473, 469 and 467, 469 and 468, 468 and 470, 468 and the magnet to the left of 470, where it will stand in the position now shown as occupied by shuttle 465. It will be observed that in passing from a position lying between the magnets 468 and 469 to a position lying between the magnets 472 and 475, the shuttle 462 has traversed two oppositely disposed cusps of the figure 8 while traversing a counter-clockwise course with respect to the support 459. Similarly, the shuttle 463, in passing from a position between the magnets 472 and 475 to a position between the magnets 468 and 469 has formed the mates of these cusps and completed the figure 8. It will be noted that in this embodiment of the invention a series of such figures 8 are traversed by the various sets of shuttles positioned on the face of the support 459. There are two shuttles to each set, and together, through a series of six movements controlled by the sheets 506 and 507, all sets, excepting those at the extremities of travel of the shuttles, form oppositely disposed cusps of successive figures 8. At the extremities of travel, where the shuttles change from a clockwise to a counter-clockwise movement, or vice versa, the movement of the shuttle which changes from one series to the other is through a complete circle.

It will be noted that the magnets 468, 469 and 472 are positioned in a line substantially parallel to the adjacent side of the twelve-sided support 459, and in general the magnets about which the figures 8 are traversed are in this embodiment substantially parallel to the adjacent sides. An exception to this rule is made in the case of the magnet 472ª, which occupies a position at the opposite extremity of the series corresponding to the position of magnet 472 and about which the shuttles, in changing from clockwise to counter-clockwise motion with respect to the support 459, pass in a circle. This magnet is offset with respect to the adjacent magnets of its series in order to avoid interference with the magnets grouped about magnet 472 at the opposite extremity. It will be readily understood, in accordance with the disposition of the magnet 472ª, that any of the magnets may be positioned in lines other than those shown in this embodiment. The magnets may be disposed, in fact, so that the shuttles pass between them in an almost infinite number and variety of curves, according to the design to be effected and as controlled through the perforations in the sheets 506 and 507.

As shown more clearly in Fig. 31, the apparatus for causing the alternate rising and falling of the bars 483 and 498, and for feeding the sheets 506 and 507, is similar to that already described in connection with Figs. 14 and 15. It comprises a shaft 556 upon which the disks 479 and 480 form a contact with brushes 478, 481 and 496. Upon the end opposite these disks is mounted a pulley 557 which may be driven by any convenient source of power, and intermediate the disks and the pulley 557 is the cam member 558, coacting with which is a pair of levers 559 and 560, the lever 560 being joined to one extremity of the pivoted bar 483. Motion is transmitted to these levers and the bar through a roller 561 contacting with the cam face. On the opposite side of the shaft 556 from the levers mentioned is a lever 562 provided at one end with a roller 563 contacting with the cam face and pivoted at the opposite end. Intermediate its ends the lever 562 is pivoted to a lever 564 which is in turn connected to one extremity of the pivoted bar 498, transmitting its motion thereto. The cam face is so shaped that the rollers 561 and 563 alternately incline towards the shaft 556 to depress the fingers and rest in such position for a given period, whereupon they are alternately forced downwardly to raise the fingers and maintain them in such position for a given period. Each of the extremities of the bars 483 and 498 opposite to those to which the levers are attached is provided with a ratchet and pawl mechanism operating to turn cylinders provided with pins on the periphery thereof, the pins coacting with holes in the sheets 507 and 506 to move them upon each raising of the bars 483 and 498 in a manner similar to that already described.

The periphery of the disk 480 upon which brushes 481 and 496 bear is provided with an insulated portion 565 which is of such length that current from the battery 460 will be discontinued in each circuit just after the establishment of current in the other circuit. As shown on the drawing, the fingers on bar 483 have been lowered into contact and the fingers on bar 498 have been raised, current is passing through the brush 481, and this has taken place just prior to the discontinuation of current passing through the brush 496. This provision is made in order that, as already pointed out, there may be no interruption of magnetism in a magnet that should be continuously energized.

By reference to Fig. 31 it will be seen that the conducting surface 480 is made longer than the insulating surface 565, so that during rotation of shaft 556, brush 481 makes contact with conductor 480 before brush 496 breaks it. It will therefore be seen that current can at such a time pass through the fingers of bar 483 and also through the fingers of bar 498. It will be evident that cam 558 should have such relation to conductor 480 and insulator 565, that, for example, when brush 481 is about to make contact with 480, cam 558, acting on roller 561, will have permitted the fingers of bar 483 to move toward the conductor segments. After this occurs and just after brush 496 breaks contact with 480, cam 558 acting on roller 563 will cause the fingers of bar 498 to move away from the conductor segments.

In case of the breakage of a thread passing from the various shuttles to the weaving point, a device is provided which will automatically break the circuit through all of the magnets arranged on the support 459. The device is shown more clearly in the detail view of Fig. 32. The shuttle is there shown as provided with a spool-shaped iron frame 566 provided with a bore 567 running longitudinally thereof. The thread in passing from the spool runs first through a thread-eye 568 situated in the extremity of an arm 569 depending from the top 570 of the frame. The thread then passes up through a groove 571 which communicates with the bore 567. In this bore hangs a weight 572, through the upper eye of which the thread passes, and thence through the eye of a thread guide 573 projecting upwardly from the top 570. In case the thread breaks, the weight will drop through the bore and will come to rest upon a contact strip 574 seated in groove 575 in the support 459, and insulated therefrom. The groove is continuous, following all possible shuttle paths, as shown more clearly in Fig. 31, and provided throughout with the contact strip 574. All of the grooves lie below the plane of the feet of the magnets which control the movement of the shuttles. When the weight 572 drops into contact on the strip, a circuit is established through its wire 576, magnet 577, wire 578, battery 460, and wire 580 which is grounded on the support. Current traverses this circuit and thereby attracts the armature 489 which is positioned adjacent the pole of the magnet 577, thereby breaking the main circuit from battery 460, passing through the wire 488, arm 489, contact member 490, wire 477, to the current distributing devices described. The interruption of this circuit causes cessation of flow of current in all the magnets which are energized at that time through the sheet 506 or 507.

As shown more clearly in Figs. 32 and 33, the thread supply is wound on a spool 594 adapted to be mounted about the shank of the thread-supporting frame. The upper surface 595 of the spool is provided with a series of apertures 596 into which enter the extremities of a C-shaped locking pin 597 passing through apertures in the top of the thread-supporting frame. The upper extremity of the weight 572 is adapted to move this locking member 597 upwardly to release the spool and permit the thread to run freely therefrom. This is done only when the tension of the thread is sufficient to lift the weight to a position that it may co-operate with and move the member 597.

A new thread supply may be mounted upon the thread-supporting frame by unscrewing the base 598 thereof which is in screw-threaded engagement with the lower part of the wall of the bore 567.

In process of weaving, the shuttles having been disposed, for example, on the support 459, and power having been applied to the pulley 557 to actuate the perforated sheet-controlling mechanism, the shuttles will pass along the surface of the support in two lines, alternately crossing and recrossing each others' paths, guided in their course by the frames of adjacent magnets against which the frames of the shuttles bear. The threads passing from the shuttles form a fabric at the weaving point A, at which the fabric may be beaten by any suitable beater mechanism and subsequently removed by a suitable take-up ring at the weaving point designated 599 which may co-operate with a fabric core or a mandrel 600 projecting therethrough in forming the fabric. One fabric formed according to this embodiment of the device is shown more clearly in Figs. 36 and 37. This fabric, it will be noted, is in the form of a flat braid. Further, by the addition of shuttles parallel with those described, as indicated by dotted lines at 462ᵃ in Fig. 30, a thicker fabric may be formed, as is shown in Figs. 41 and 42. It will of course be understood that the fabric may be made tubular by causing the magnets to continue their rotation always in the same direction, that is, those magnets that start in a clockwise direction shall continue thus, and likewise for those that start out in a counter-clockwise direction. The braid thus produced will be similar to that formed by the embodiment of the device shown in Fig. 1 and the succeeding figures. This form of braid is represented in Fig. 43.

The showing in Fig. 34 represents an addition to the machine just described, or to any braiding machine, and provides for the production of a fabric like that shown in Fig. 40, providing loops, here shown, at the edges thereof. In the drawing three magnets 601, 602, and 603, which move the shuttles 604 and 605 in the usual manner, are shown. The looping device is here shown as mounted to coact with the outer shuttle 604. It comprises an electromagnet 606 mounted on the magnet 601 and having the face of its pole lying in a plane substantially parallel to the course that the thread takes in passing to the weaving point. It is provided with an armature 607 to which is secured, in any suitable manner, a series of flexible strands 608, for example, wire or horse-hair, which is adapted to be temporarily interwoven with the fabric and then removed therefrom. In the interweaving process the armature is caused to move between the magnets 606 and an oppositely disposed magnet 609 mounted on the upper portion of the frame of the magnet 602 and having the face of its pole inclined similarly to the face of the pole of magnet 606. The alternate energization and de-energization of these magnets serves to move the armature 607 back and forth therebetween to cause the interweaving mentioned. As shown in Fig. 40, the action of this armature and its attached strands, is to pull out threads into loops, as shown. As the fabric is taken up past the weaving point, of course, the resilient members remain stationary, the operation of the loopers being thus, in effect, the looping of a portion of the fabric and passage of the looper to a newly forming part of the material resulting in the production of a rough or looped selvage or stripe. Clearly a plurality of these devices may be employed in a large braider, making several rough or looped stripes. A further use for the device is the introduction into a braid of extra pattern threads, colored or of different material or weight from the main thread supplies. For such an application the solid disk 607 in Fig. 34 may be regarded as a very small flat iron spool, and the strand 608 is to be regarded as the pattern thread.

The showing in Fig. 35 is to illustrate how any fixed magnet pole, of the type of magnet 586 Fig. 31, can be drilled longitudinally, also provided with a thread guide similar to 573 Fig. 32, for the purpose of admitting an additional warp or filler thread 618 into the interior of a braided fabric. The use of such filler threads is well known in the art. This type of braiding machine lends itself particularly well to such use.

Referring now more particularly to the showing in Figs. 44 and 45: There is shown a type of machine similar to the one just described employing a flat field 459 and magnets passing thereover. In the present type of machine the support 619 is in the form of a bowl or hollow substantially hemispherical segment extending in a horizontal plane, and having a flat base. The shuttles are positioned between magnets situated on the inner periphery of the sphere, the advantage thus gained being that the shuttles in their passage about the field remain at a constant distance from the weaving point. The means for causing the shuttles to traverse the field in definite paths is regulated by the perforated sheet control mechanism, as shown.

As shown more clearly in Fig. 45, the magnets are graduated in size from the upper rim of the field towards the base, being largest near the upper rim. The shuttles, however, are of the same size throughout. Both shuttles and magnets are here shown as truncated cones.

Taking the two magnets, 620 and 621, and the shuttle 622 on the extreme left as typical of the other magnets and shuttles, it will be observed that the means for energizing and de-energizing these magnets through the perforated sheet control mechanism is substantially the same as heretofore set forth. With the contact bar 623 on the left in the drawing lowered to permit the fingers to contact through suitable perforations in the sheet 624, current will flow from the battery through wire 638, contact block 637, armature 636, wire 635, brush 626, disk 627, contact disk 628, brush 629, wire 630, bar 623, finger 631, perforation 632, conductor segment 633, wire 634, to the lower winding of the magnet 621, which terminates on the frame of the magnet which is in electrical connection with the base 619. Current then returns through wire 625 to the opposite pole of the battery. At the same time current flows through finger 639, perforation 640, conductor segment 641, wire 642, to the lower winding of the magnet 620, which terminates on the frame of the magnet which is in electrical connection with the base. Current then passes as heretofore through the wire 625 to the battery. By this means the shuttle 622 is caused to move from a position between two previously de-energized magnets to the position shown between magnets 620 and 621, or, if they are successively energized, may be retained therebetween in a manner similar to that already set forth in connection with the description of the flat field machine.

The upper winding of magnets 620 and 621 may be similarly energized upon lowering the contact bar 643, whereupon current will flow from the battery through wire 638, contact block 637, armature 636, wire 635, brush 626, disks 627 and 628, brush 644, which at this time will have passed the insulated portion of the disk 628, wire 645, contact bar 643, finger 646, perforation 647, conductor segment 648, wire 649 to the upper winding of magnet 621 which terminates in the frame. Current then returns to the battery by wire 625, as previously described. At the same time current travels through contact finger 650, perforation 651, conductor segment 652, wire 653 to the upper winding of magnet 620 which is connected to the frame. Current then passes to the battery through wire 625. Mounted upon a common shaft 654 with the disks 627 and 628 is a disk 656 which, with its connections, takes the place of the cam 558 and associated parts in Fig. 31. Associated with this disk are two magnets respectively operating to raise and lower the contact bars 623 and 643. As shown in Fig. 44, the bar 643 is in raised position, which is accomplished by energizing the magnet 657, serving to attract the armature 658 which is attached to the bar.

In order to energize this magnet current flow is established from the battery through wire 625, wire 660, magnet 657, wire 661, brush 662, which is contacting, as with the uninsulated portion of the disk 656, thence through shaft 654, brush 626, wire 635, armature 636, contact block 637, and wire 638 to the opposite pole of the battery.

When the shaft 654 is rotated by a suitable source of outside power through the pulley 664, the insulated portions 665 and 666, respectively, of disks 628 and 656 will be rotated so that current may flow through the bar 643 as heretofore described and the bar 623 will be raised. The raising of bar 623 is accomplished through magnet 667 coacting with armature 668 attached to the end of bar 623. The insulated portions having rotated, current will then flow from the battery through wire 625, wire 669, magnet 667, wire 670, brush 671, disk 656, shaft 654, brush 626, wire 638, etc., to the opposite pole of the battery. As shown in the drawing, insulated segment 665 is less than half the circumference, while insulated segment 666 is more than half. By this arrangement there will be an instant during rotation of shaft 654 in which both brushes 629 and 644 will be on conductor, thus permitting current to flow to bars 623 and 643. In order that the current can at such a time flow from the fingers of bars 623 and 643 to the conductor segments, the insulated segment 666 is made longer than half the circumference, so that, owing to the deenergization of magnets 667 and 657, there will be a longer interval of time during which both bars 623 and 643 will be down.

Starting with the parts in the position shown in Fig. 44, as shaft 654 revolves, brush 662 will travel on insulator 666, thereby causing bar 643 to fall. Then brush 644 will travel on conductor 628, causing current to pass through bar 643. Brush 629 will then travel on insulator 665, thereby causing current to be cut off from bar 623. During further rotation of shaft 654, brush 671 will travel on conductor 656, thereby causing bar 623 to be raised. Then, as brush 671 travels on insulator 666, the bar 623 will fall. Then as brush 629 travels on conductor 628, current will pass through bar 623. When brush 644 travels on insulator 665, current will be cut off from bar 643. As brush 662 travels on conductor 656, bar 643 will be raised, and the parts will again be in the position shown in the drawing.

It will be observed that the perforated sheets are here moved in substantially the same manner as described in connection with previous figures, but the sheets shown in Fig. 44 are of considerably greater length than those heretofore shown, and a provision for conveniently supporting this type of sheet is shown. A description of one means of support shown in Fig. 44 will suffice for both. The sheet is provided at intervals with bars 673 which are secured to the sheet and travel along therewith. The bars project slightly beyond the edges of the sheet and these projecting portions are adapted to be slidably supported upon a pair of inclined ways 674 which are spaced from one another a distance approximately equal to the length of the bars. As the sheet passes over the supporting roll and descends the ends of these bars come in contact with the upper ends of the inclined ways 674, and with the further delivery of the sheet a loop is formed whose length is equal to the distance between successive bars. With further feeding of the sheet, these loops which, as shown in the figure, are closely adjacent one another, travel down the inclined ways 674 until they arrive at the position at the opposite end of the sheet, whereupon they rise, passing under the contact fingers and so continue in an endless path.

The machine is provided with the contact plates 675 seated in grooves below the shuttles adapted to coact through a source of power and a magnet, as heretofore described in connection with the flat field machine, to break the main circuit by attracting the armature 636 which is situated adjacent the pole of the magnet. The circuit-breaking device just mentioned and the thread-tensioning device associated with the shuttle are shown more clearly in Fig. 47. The thread supply support 676 is there shown in the form of a spool, in the bore of which stands a rod 677 whose extremity terminates adjacent the bottom of the support. The rod 677 is held in position by a coiled tension spring 678 attached to the top of the support. The thread supply is wound on a spool 679 which is adapted to revolve about the shank of the support 676. In leaving the spool the thread first passes through a guiding thread-eye similar to that previously described in connection with Fig. 32, then upwardly through a groove in the head of the support 676, then through an aperture in a C-shaped frame 680 positioned on the upper surface of the support, then downwardly through an eye 681 in the head of a downwardly projecting finger 682 which passes through the head of the support 676 and is adapted to project beyond into one of the series of apertures 683 formed in the head of the spool 679. The finger is held in a position coacting with one of the apertures by a spring 684. After passing through the eye 681 the thread passes through the eye 685 formed in the head of the rod 677 and thence upwardly through another aperture formed in the C-shaped frame 680 toward the weaving point.

The action of the shuttle and associated parts is as follows: When tension in the thread has reached a point where it is sufficient to overcome the force of the spring 684 the finger 682 is raised, permitting the bobbin to rotate and supplying thread to the weaving point. When the tension becomes less, the finger again drops into one of the apertures of the spool to stop the thread supply. In case of thread breakage at any time the rod 677 is released and its end comes in contact with the contact plate 675, establishing the circuit through the magnet cut-out device heretofore mentioned and stopping the flow of current to all magnets.

The magnetic beater means provided is similar to that heretofore set forth, and provision is made similar to that heretofore described whereby the various magnets may be energized and controlled by the perforated sheets. Current flow will be established by a finger through a perforation in the sheet contacting with a conductor segment and then passing by the wire 686 to the magnet 687, thence by a wire 688 to the ground, passing thence through a ground connection 659 to the frame 619, and thence through wire 625 to the opposite pole of the battery. Another beater magnet 687 may be similarly energized upon lowering of the fingers on the bar 643.

A magnetic take-up mechanism is shown in connection with the machine, and the means for controlling its operation through the perforated sheet is also provided for. Contact may be made as desired through one of the fingers on the bar 643 through a perforation in the sheet, a conductor segment and wire 689 passing to the magnet 690, thence by a wire 663 to the ground, passing thence through ground connection 659 to the frame 619, and thence through wire 625 to the opposite pole of the battery. The energization of magnet 690 will serve to actuate the various parts of the take-up mechanism, as heretofore described.

Referring now more particularly to the showing in Figs. 46 to 52, there is shown an automatic device for picking up strands of material and moving them to a given position with respect to a rotating support and affixing the strands temporarily in position upon the support. The machine here shown is intended to simulate the action of the lace-maker, for example, in the use of a pin and pin cushion, where a strand of lace is moved to a given position upon the cushion and then secured there by the pin. The mechanism for accomplishing the action mentioned is shown in the figures in connection with a hollow partially hemispherical field extending in a vertical plane with shuttles traveling thereover, similar to that described in Figs. 44 and 45, and comprising, as shown, the perforated sheet control mechanism, magnetically shifted contact bars and thread breakage stop mechanism heretofore detailed.

In order to energize magnet 657, current flow is established from battery 460 through the frame 619 and wire 625, wire 660, magnet 657, wire 661, brush 662, which is contacting, as shown, with the uninsulated portion of the disk 656, thence through shaft 654, brush 626, wire 635, contact block 637, armature 636, and wire 638 to the opposite pole of the battery.

The pin and cushion mechanism comprises a set of pins 691 and a rotatable cylindrical cushion 692, which may be made of cork or other soft material, but is preferably of metal provided with cavities 693 formed in regular lines completely about its whole periphery.

Each of the series of pins 691 is adapted to be given three motions according to this embodiment. The mechanism for providing these motions includes a set of combs 694 and 695 which are disposed substantially in the same vertical plane with their teeth pointing respectively upwardly and downwardly. The teeth of the comb 695 are longer than those of the comb 694 and are so arranged with respect thereto that the two sets of teeth are alined. The pins 691 when idle rest between the teeth of the comb 694. The comb 694 is supported at either end by levers 696, 697, respectively, which are pivotally attached to the frame 698 of the machine. The normal position of the comb 694, that is, with its teeth in alinement with the teeth of comb 695, is maintained through the springs 699 and 700 attached to the frame 698 so that their extremities bear against the extremities of the comb 694. The comb is moved out of normal position by either one of two sets of magnets 701, 702, 703, and 704, 705, 706, situated respectively below opposite ends of the comb and attached to the frame 698. The magnets of each set are vertically staggered from one another and are adapted to coact with armatures which are carried on arms pivoted on the same shaft with levers 707 and 708. These armatures are pressed against levers 707 and 708 by light springs not shown, but are not attached to these levers. The armatures are positioned equidistantly from their respective magnets so that when the magnet 701, for example, is energized its armature will be thrown through substantially the same distance as traversed by the armatures attracted by magnet 702 and 703, but in view of the greater distance of the first-mentioned armature from the pivotal point of the lever 707, the relative throw of the end of the lever opposite the pivotal point will be less than that caused by the magnet 702. In the case of magnet 702 the throw of the extremity of the lever will be less than in the case of magnet 703. This applies to both sets of magnets. When magnet 702, for example, attracts its armature, the armature of magnet 701 is brought to stop against the pole of 701, but lever 707 is not stopped thereby.

At the extremity of each of the levers 707 and 708 are pivoted bell-crank levers 709 and 710, respectively, one end of each bell-crank lever being provided with a hook 711 adapted to coact with the pin 712 situated adjacent the end of the comb 694. The opposite end of each bell-crank lever is held by a spring 713 against a pin 714 projecting from the frame 698. Upon movement of the lever by one of the magnets the bell-crank lever is moved about its pivot so that the hook 711 engages the pin 712 to move the comb. Upon movement of the comb to its normal position the end of the bell-crank lever contacts with the pin 714, whereby the hook is released from its engagement with the pin 712. A description of the lever 709 and its associated parts also answers for that of the lever 710 with its parts. It will be noted in connection with these members that, by causing them alternately to release and engage their pins, interference of one with the other is avoided.

Means for energizing only one magnet, namely, 706, is hereby indicated, but it will be understood that the other magnets are to be energized in the same or any desired manner. Assuming that the bar 623 of the perforated sheet control mechanism is positioned as shown in Fig. 46 and that circuit has been established through one of the fingers with the conductor segment underneath, current will flow from the battery 460 through wire 638, armature 636, contact block 637, wire 635, brush 626, disk 627, contact disk 628, brush 629, wire 630, bar 623 and the finger thereon, and through the conductor segment connected to wire 715, thence through wire 715 to one coil of magnet 706, thence by wire 716 to the ground, passing thence through ground connection 659 to the frame 619, and thence to the storage battery or other source of power 460. Similarly, if desired, the control may be effected through contact bar 643 which, when lowered, will permit current to flow through wire 717, through the other coil of magnet 706, wire 716 to the ground, passing thence through ground connection 659 to the frame 619, and thence to the battery.

The vertical and thrust motions of each pin are provided by an apparatus which is more clearly shown in Fig. 49.

The mechanism for moving the pins 691 vertically and thrusting them into the cavities of the roll 692 comprises a set of jaw members, each jaw member engaging one of the pins, and a set of electromagnets for moving the jaw members. The jaw members are mounted on a common shaft 718 about which each one pivots, and each of the members is separated from adjacent members of the set by thin partitions 719 projecting downwardly from a supporting bar 720.

There are two types of jaw members, 721 and 722, the former being in the form of a bell-crank lever and the latter being in the form of a substantially straight lever. The remaining parts of the jaw members are substantially the same and a description of one will do for all. Each comprises a mouth 723 communicating with a substantially 8-shaped aperture 724. The pin passes through the mouth and is provided with a bent portion 725 overhanging the inner edge of the mouth and resting in the lower portion of the 8-shaped aperture.

Connected to the end of the bell-crank lever 721 is a spring member 726 serving to hold the jaw member in retracted position. Also connected to the end of the bell-crank lever is a rod 727 which in turn is connected to a flexible member 728 terminating in an armature 729 adapted to be attracted by an electromagnet 730.

Similarly, the end of the straight lever 722 is connected to a spring 731, and at the same end a rod 732 is connected to a flexible arm 733 terminating in an armature 734 adapted to be attracted by an electromagnet 735. The electromagnet 735 is here shown as operated by a wire 736 leading from one of the conductor segments which is to be supplied with electric current from bar 623, the current then passing through one coil of magnet 735 to the ground and thence through ground connection 659 to the frame 619, and thence to the battery. A wire 737 leading from one of the conductor segments which is to be supplied with electric current from bar 643, conducts current through the other coil of magnet 735 to the ground, and thence through ground connection 659, etc., to the battery. Similarly, magnet 730 is to be actuated by means of a wire 738 leading from another of the conductor segments supplied with electric current from bar 623; and a wire 739 leading from another of the conductor segments supplied with electric current from bar 643. When these magnets are energized, the jaw members will be given a counter-clockwise rotation, each urging the pin connected therewith toward the roll 692.

In order initially to receive the end of the pin and to carry it to a position where it may be projected into one of the cavities 693, a set of magnetically controlled levers is provided. Two levers 740 and 741 are employed and they are mounted to pivot about a shaft 742. The lever 741 is a bell-crank lever provided at its lower extremity with an armature portion 743 adapted to be attracted by an electromagnet 744 which may be energized by a wire 745 passing from one of the conductor segments with which contact may be established by a finger mounted on the bar 623, whereby current will flow through one of the coils of magnet 744 to the ground, and thence through ground connection 659, etc., to the battery. A wire 746 leading from one of the conductor segments which is to be supplied with electric current from bar 643, conducts current through the other coil of magnet 744 to the ground and thence through ground connection 659, etc. to the battery. The lever 740 is provided with a spring member 747 which bears upon lever 741, thereby holding lever 740 normally above the lever 741. Upward movement of lever 740 is limited by a wall of a notch 749 formed in the lever engaging a pin 748 secured to the lever 741. The lever 740 is provided with an upturned flange 750 at its extremity, and similarly the lever 741 is provided with a somewhat longer flange 751. In normal position of the levers the flange 751 will lie with its upper edge some distance below the upper edge of flange 750, thus providing a ledge or stop upon which the extremity of the pin 691 rests when it is projected inwardly through the action of magnet 730. Magnet 730 is so proportioned that the pin may be projected into one of the apertures 693. Accordingly, when projected against the face of the flange 750, there is a tendency to a binding between these parts, which is, however, avoided by the employment of a flexible arm 728 which tends to relieve any extraordinary strain.

After the end of the pin has been positioned, as indicated, action of magnet 744 on armature 743 causes lever 741 to move upwardly. During the first part of this upward movement, the lever 740 is also moved upward together with the end of the pin 691 resting on the upper edge of flange 751. Upward movement of lever 740 is finally checked by contact with the cylinder 692, while upward movement of lever 741 continues until checked by engagement of pin 748 with the top wall of notch 749.

At this time the top of the flange 751 will be on a line substantially with the top of flange 750 and the pin will then slide very rapidly into a selected cavity 693. Having been thus positioned, the pin is carried upwardly by motion of the roll 692, which may be driven from an outside source of power through the gears 752, which may be provided with a continuous or intermittent motion, as required.

Referring now to Fig. 49ª: A pin $a$ to the right of the strand shown is moved to the left of it, is thrust in and moved back to the right to its original position, carrying the strand with it, and the pin $a$ and strand are then raised and left against the cushion. The strand will then hang to right of its original position, as is indicated by dotted lines. Then a pin $b$ to the left of the dotted position of the strand is moved to the right of it, is thrust in and moved back to the left to its original position, carrying the strand with it, and the pin $b$ and strand are then raised and left against the cushion. A portion of the strand then has the form of a loop $c$, and the strand will hang near to its original position.

A magnetic take-up mechanism similar to that heretofore described is provided comprising a roll 753 provided with a ratchet 754 coacting with a pawl 755 actuated by a magnet 756. The magnet 756 may be connected as shown through a wire 757 with a suitable conductor segment, with which connection may be established through fingers on the bar 623 associated therewith in a manner similar to that already indicated. Current then passes through this wire and through the magnet 756 to the ground.

Operation of the parts just described is as follows: The filament passes upwardly from the shuttles positioned on the base 619 toward the roll 692, passing between the faces of the flanges 750 and 751 and the extremities of the pins 691. Lever 708 is then thrown, for example, to the left in Fig. 46, causing like movement of comb 694 and pins 691. When the throw has been terminated, one or more of the magnets in the set 730, 735 will be energized to throw the pins 691 associated therewith into position against the face of flange 750. Lever 708 is then thrown, for example, to the right in Fig. 46, causing like movement of comb 694 and pins 691, the projected pin or pins sweeping with them the filaments in their path. When the throw has been terminated, the magnet 744 is energized, attracting the armature 743 and raising the pin into position to be forced into one of the cavities 693. The levers 740 and 741 may then be released, the pin traveling upwardly with the roll 692, until the back of comb 695 has been reached, the pin then holding the strand in its changed position. It will be noted that the jaw members 721, etc., are so shaped that movement of the pins is permitted in both an up and down and lateral direction. When the strand is further moved to form a loop, as has been described, and the loop has become part of the fabric woven, the pin holding the strand may be released from the roll 692. At such a time, the magnet 730 may be de-energized, permitting the spring 726 to return the pin to its original position. At that time, of course, the comb 694 will have been moved into alinement with comb 695, so that the pin will drop into its place between the teeth of comb 694. According to the operation detailed, the looping of the filaments may be accomplished in a great number of ways to form the varied patterns desired.

The modification shown in Figs. 50 and 51 is directed to a somewhat different form of comb and mechanism for its operation. Only one comb, 758, is provided in this case, operating as before, with a cushion 759 into which the pins may be projected as controlled by the comb. The vertical movement of the pins is regulated through a swinging cradle comprising a cross bar 760 connected at either end by bell-crank levers 761 and 762 pivoted to the frame of the machine. The opposite end of bell-crank lever 762 to that pivoted to the cross bar 760 is in the form of a segment provided with a ratchet 763 on its periphery. This ratchet is adapted to be controlled by a magnetically operated pawl 764 comprising an electromagnet 765 and a spring-held armature 766 pivoted to the frame of the magnet, the opposite end of the armature being pivoted to the pawl. Co-operating also with this ratchet is a spring-held stop member 767 operated by the electromagnet 768. The extremity of bell-crank lever 761 opposite to its attachment to the bar 760 is provided with a spring 769. The operation of the device is as follows:

Vertical movement of bar 760 is caused by swinging movement of bell-cranks 761 and 762. Motion of bar 760 downward and to the right in Fig. 50 is effected through the downward pull of pawl 764, the spring 770 attached to the armature 766 serving to force the pawl against the ratchet teeth 763 on bell-crank 762. When the pawl has ceased its travel the ratchet will be held in position by the stop member 767. The magnet 765 being de-energized, the action of spring 771 on armature 766 causes the pawl 764 to return to its former position for a subsequent engagement.

When this occurs the hook of the pawl contacts with the lower portion of the stop member 767, thereby causing the pawl to be thrown out of engagement with the ratchet. Upon release of magnet 765 and attraction of magnet 768, the spring 769 will turn the bell-cranks 761, 762, causing movement of bar 760 to the left and upward, until checked by engagement of bell-crank 762 with a stop pin 762ª.

The modification described in Figs. 50 and 51 shows a pin and cushion mechanism similar to that already described, employing however a roll 759 of soft material such as cork, rubber or the like, into which the pins may be projected. The pins in this case are somewhat different in form, comprising a straight portion 772 having a sharply pointed tip and bend 773 to constitute a spring portion adjoining an offset portion 774 provided with an apertured head 775 through which a shaft 776 projects to support the pins and to permit further pivoting thereabout. Each pin is raised and lowered by operating the levers 777 carrying links 778, the links 778 being provided with an eye for engaging the straight portion of the pin adjacent the spring member, and the lever 777 being provided with an armature 779 adapted to be attracted by a magnet 780. The straight portion 772 of each pin is adapted to be supported by a bar 781 extending through and positioning the pins adjacent the lower extremities of the teeth of the member 758.

The operation of this embodiment of the device is as follows: The armature 779 being actuated, the lever 777 and link 778 raise the pin until it assumes the position shown by dotted lines in the figure, namely, lying approximately in a plane passing through the shaft 776 and the shaft 782 by which the roll 759 is rotated. It will be seen that as the pin is raised, the straight portion 772 takes against the bar 760, the height of which bar has been regulated by the devices shown in Fig. 50, and as the upward pull caused by lever 777 continues the spring portion 773 permits the pin to bend on the offset portion 774, causing the pin to straighten out and be projected against the roll 759 in the manner shown. Upon further upward travel of the roll and de-energizing of the magnet 780, the pin will be returned to its original position.

In Fig. 52 are shown portions of two machines, each similar to that shown in Figs. 46 and 49, with electrical connections to but one pair of perforated pattern sheets and one time shaft 654. The parts are shown in the same position as in Figs. 46 and 49, and the description of said figures can apply to Fig. 52, an extra machine with the necessary electrical connections being added. The stop magnet of one machine is however omitted, and the two machines are electrically connected to one stop magnet, so that, if a thread breaks in either machine, the single stop magnet operates and stops both. This is accomplished by electrically connecting through wire 655 the contact strips 675 of both machines, and by grounding the frames of both machines through wires 659. If, for example, a thread breaks in the machine to the left of Fig. 52, current will flow from battery 460, through the frame 619 of the machine to the right, thence through ground connections 659 to the frame 619 of the machine to the left, and thence through the contact strip 675 thereon to wire 655 connected to the contact strip 675 on the right hand machine; the wire 655 being also connected to the stop magnet, so that the current will pass through the stop magnet and return to the opposite pole of the battery. As has been previously described, the stop magnet attracts the armature 636 away from contact block 637, causing the main circuit through wire 635 to be broken, thereby serving to stop both machines, and also to stop movement of the perforated sheets.

In order to energize magnet 657, current flow is established from battery 460 through the frame 619 of the machine to the ground connection 659, and a ground connection 625ª to wire 660, magnet 657, wire 661, brush 662, conductor 656, thence through shaft 654, brush 626, wire 635, contact block 637, armature 636, and wire 638 to the opposite pole of the battery.

When bar 623 is moved to the position shown, current will flow through a finger 783, perforation 784, conductor segments 785, and a wire 786 having two branches, one branch leading to the lower coil of a magnet 787 on the field 619, shown to the right of Fig. 52, and the other branch leading to the lower coil of a similar magnet 787 on the field 619 to the left. At the same time current will flow through a finger 788, a perforation 789, conductor segment 790, and a branching wire (not shown) leading to the lower coil of a magnet 791, on the right hand field, and to the lower coil of the similar magnet 791 on the left hand field. This causes the thread carrying shuttle 792 to occupy the position shown in the two fields.

When movement of bar 623 causes the attached fingers to swing clear of the perforated pattern sheet, and movement of bar 643 causes the attached fingers to swing downward, current will flow through finger 793, perforation 794, conductor segment 795, and a branched wire 796 leading to the upper coil of the magnet 787 on the right hand field, and to the upper coil of the similar magnet 787 on the left hand field. At the same time current will flow through finger 797, perforation 798, conductor segment 799, and a branched wire 800 leading to the upper coil of a magnet 801 on the right hand field, and to the upper coil of the similar magnet 801 on the left hand field. This will cause the shuttle 792 on both fields to be moved from the position shown to a position between the magnets 787 and 801.

When the fingers on bar 643 are moved clear of the perforated sheet and the fingers on bar 623 are again moved downward, if the sheet 624 is provided with a perforation which permits the finger 802 to make contact with conductor segment 803, current will flow through such perforation, conductor segment 803 and a branched wire 804 leading to the lower coil of the magnet 801 on the right hand field, and to the lower coil of the similar magnet 801 on the left hand field. If sheet 624 is provided with a perforation which causes the magnet 787 of the right and left fields to remain magnetized, the shuttle 792 on both fields will remain in the position last referred to.

A series of braided or woven strands that could be formed by movement of the thread carrying shuttles in the manner described, on the right and left hand machines, can be made to occupy different positions at the braiding point, by movement of pins 691, horizontally moving combs 694, and the vertically moving flanges or beaters 750 and 751 coacting with the cushion roll 692. Assuming that when the parts occupy the position shown, movement of the shuttles has caused formation of braided or woven strands of some length, if, when the fingers on bar 623 move downward, the sheet 624 is provided with a perforation which permits the finger 805 to make contact with the conductor segment to which wire 736 is attached, current will flow through one branch of said wire to one coil of the magnet 735 on the right hand machine, and through the other branch to one coil of the similar magnet 735 on the left hand machine.

When the fingers on bar 623 are moved clear of the perforated sheet and the fingers on bar 643 are moved downward, if the pattern sheet is provided with a perforation which permits the finger 806 to make contact with the conductor segment to which wire 737 is attached, current will flow through one branch of said wire to the other coil of the magnet 735 on the right hand machine, and through the other branch to the other coil of the similar magnet 735 on the left hand machine.

Action of magnet 735 on armature 734 and connections to lever 722, causes a pin 691 to be projected on comb 694 across the path of the braided strands, and forward to rest on the flange 751. When the fingers on bar 643 are moved clear of the perforated sheet and the fingers on bar 623 are moved downward, if a perforation in the sheet 624 permits a finger to make contact with the conductor segment to which wire 715 is attached, current will flow through one branch of said wire to one coil of the magnet 706 on the right hand machine, and through the other branch to one coil of the similar magnet 706 on the left hand machine.

When the fingers on bar 623 are moved clear of the perforated sheet and the fingers on bar 643 are moved downward, if the pattern sheet is provided with a perforation which permits a finger to make contact with the conductor segment to which wire 717 is attached, current will flow through one branch of said wire to the other coil of the magnet 706 on the right hand machine, and through the other branch to the other coil of the similar magnet 706 on the left hand machine.

Action of magnet 706 on lever 708 and connections to comb 694 causes horizontal movement of the comb, thereby causing the free ends of all inwardly projected pins 691 to move laterally, carrying the braided strands in their path. Then, when the fingers on bar 643 are moved clear of the perforated sheet and the fingers on bar 623 are moved downward, a perforation in sheet 624 will permit a finger to make contact with a conductor segment to which wire 745 is attached, causing the current to flow through one branch of said wire to one coil of the magnet 744 on the right hand machine, and through the other branch to one coil of the similar magnet 744 on the left hand machine.

When the fingers on bar 623 are moved clear of the perforated sheet and the fingers on bar 643 are moved downward, if the pattern sheet is provided with a perforation which permits a finger to make contact with the conductor segment to which wire 746 is attached, current will flow through one branch of said wire to the other coil of the magnet 744 on the right hand machine, and through the other branch to the other coil of the similar magnet 744 on the left hand machine.

Action of magnet 744 on armature 743, bell-crank lever 741 and flange 751, and on lever 740 and flange 750 causes vertical movement of pins 691 between the teeth of comb 695.

It will be understood that the pattern sheets are to be provided with perforations which shall cause magnets 735 and 706 to remain magnetized during upward movement of the flanges or beaters 750 and 751. Further, it will be understood that magnets 735 will remain magnetized in order that the pins shall engage the recesses 693 of roll 692 during the time the perforated sheets may cause movement of the thread carrying shuttles on the right and left fields.

It will be seen that the position of braiding points will be controlled by the position of the pins against the cushion roll, and that such positions are changed by horizontal movement of comb 694.

Pattern sheet 624 is provided with perforations which, at regular intervals, cause a finger on bar 623 to make contact with a conductor segment, permitting current to flow through a branched wire 757 leading to the take-up magnet 756 on the right and left hand machines.

It will thus be seen that according to the embodiments of the invention herein given the objects enumerated, among others, are attained.

As many apparently widely different modifications of this invention may be made without departing from the spirit thereof, it is intended that all the embodiments described shall be considered as illustrative, and that it is not intended that the invention shall be limited thereto except as indicated in the appended claims.

Having thus described my invention, I claim:

1. In a textile machine, means for controlling all displacement of two filament supplies, separate means to deflect across the path of one supply filament drawn from the other, opposed electromagnets for reciprocating said separate means, a circuit changer, mechanical connection between the first mentioned means and said circuit changer, and circuits for said electromagnets alternately controlled by said circuit changer.

2. In a textile machine, means continuously to swing a filament, and an electromagnetically controlled spring pendulum to deflect a filament across the path of the first filament.

3. In a textile machine, means to swing a filament, and an electromagnetically controlled spring pendulum to deflect an oppositely swinging filament across the path of the first filament.

4. In a textile machine, means continuously to swing a filament, a spring adapted to control, and, at predetermined times, to deflect a filament across the path of the first filament, and alternately energized magnets oppositely acting upon said spring.

5. In a textile machine, filament supplies, means to revolve a filament, and an electromagnetically controlled spring pendulum to deflect a filament across the path of the first filament, the operation of said spring pendulum being unaccompanied by change in the motion of a filament supply.

6. In a textile machine, filament supples, means to move a filament, means oppositely to move another filament, and an electromagnetically controlled spring pendulum to deflect said oppositely moving filament across the path of said first filament.

7. In a textile machine, filament supplies, means to revolve a filament, resilient means adapted to deflect a revolving filament across the path of the first filament without altering the motion of a filament supply, and alternately energized magnets oppositely acting upon said resilient means.

8. In a textile machine, means to revolve a filament, and spring pendulum means to reciprocate a filament across the path of the first filament.

9. In a textile machine, means continuously to move a filament, and spring pendulum means to reciprocate another filament across the path of the first filament.

10. In a textile machine, means continuously to move a filament in a lateral sense, means to reciprocate a second laterally moving filament across the path of the first, and resilient means tending to maintain the reciprocating means in intermediate position.

11. In a textile machine, means to revolve a filament, a filament guide for determining the vibration of a revolving filament across the path of the first filament, and balanced resilient means for accelerating said filament guide.

12. In a textile machine, a filament carrier and means to revolve the same, and an electromagnetically controlled vibrating resilient switch to deflect a filament across the path of said filament carrier.

13. In a textile machine, a filament carrier, means to move the same, a spring actuated vibrator to deflect a portion of an oppositely moving filament across the path of said filament carrier, an electromagnet for controlling said vibrator, a circuit changer for controlling the circuit of said electromagnet, and means controlled by the first mentioned means for operating said circuit changer.

14. In a textile machine, at least two filament carriers, means for moving said carriers relatively about a fabric in closed paths whereby the filaments from said carriers are spirally laid in the fabric, magnetic means to sway a portion of filament from one of said carriers across the path of the other of said carriers without deflecting either of said carriers, an electrical circuit changer for controlling said magnetic means, and means controlled by said first mentioned means for actuating said circuit changer.

15. In a textile machine, means to generate a magnetic field, a filament carrier in this field solely propelled by the forces thereof, and means to deflect a portion of a laterally moving filament across the path of said filament carrier.

16. In a textile machine, magnetic means to move a filament, and means comprising a resiliently balanced vibrating member to deflect a filament across the path of the first filament.

17. In a textile machine, means to generate a magnetic field, a filament carrier in this field solely propelled by the forces thereof, and means comprising a reciprocating member having a filament passing therethrough to deflect a laterally moving filament across the path of said filament carrier.

18. In a textile machine, a source of mechanical power, means to generate a magnetic field, a filament carrier in the field solely propelled by the forces thereof, and spring vibrator means to vibrate a laterally moving filament across the path of said carrier.

19. In a textile machine, means to generate a magnetic field, a filament carrier in this field propelled in a path solely by the forces of this field, an oppositely moving member, and a vibrating member mounted thereon to deflect a filament across the path of said carrier.

20. In a textile machine, two sets of filament supplies oppositely moving in closed paths, means to generate a magnetic field, a carrier for one of said supplies in this field and solely propelled by the forces thereof, and separate means to deflect a filament from the other of said supplies across the path of said carrier.

21. In a textile machine, means to generate a rotating magnetic field, a filament carrier in this field solely revolved by the forces thereof, and individual reciprocating means to deflect oppositely moving filaments across the path of said carrier.

22. In a textile machine, magnets, means to revolve said magnets, a filament carrier in the field of said magnets solely propelled by said field, and means to deflect a filament moving oppositely to said carrier across the path thereof.

23. In a textile machine, means for generating a shifting magnetic field, a magnetic filament carrier in said field and moved solely thereby, and a switch member to deflect an oppositely moving filament across the path of said carrier.

24. In a textile machine, two sets of filament supplies oppositely moving in closed paths, a carrier for one of said supplies comprising magnetic material, a moving magnet nearby adapted by attraction to move said carrier, undeviatingly in a circular path, and means to deflect a filament across said path without altering the motion of a filament supply.

25. In a textile machine, filament carriers comprising magnetic material, magnets steadily attracting said carriers, a moving filament mass, and means to deflect filament from said mass to pass over and under said carriers.

26. In a textile machine, means to generate a magnetic field, a filament carrier in this field solely propelled by the forces thereof, another filament carrier, means for controlling all displacement of said other filament carrier, means to deflect across the path of the first carrier filament drawn from the other, and electrical means for timing the operation of said last mentioned means in accordance with the propulsion of said first mentioned filament carrier.

27. In a textile machine, filament carriers as armatures, magnets attracting them constantly, a moving filament supply, and electromagnetically-controlled vibrating members deflecting filament of said supply over and under said carriers.

28. In a textile machine, magnets holding filament carriers on a raceway moving with respect to said carriers, a moving filament mass, and a filament switch fixed with respect to said raceway for deflecting filament of said mass over and under said carriers.

29. In a textile machine, a fabric take-up means cooperating with bobbins revolving relatively to the fabric whereby filaments from the bobbins are diagonally laid in the fabric, magnetic shuttles, magnets by their fields controlling said shuttles, and switches fixed relatively to said bobbins to deflect filaments from said bobbins over and under said shuttles.

30. In a textile machine, means for oppositely moving sets of filament supplies, a carrier for one of said supplies comprising magnetic material and a moving constant magnet nearby adapted to move said carrier.

31. In a textile machine, means to generate a shifting magnetic field, a filament carrier in this field solely propelled by the forces thereof, means laterally to move a filament, and means individual to the laterally moving filament to deflect the filament across the path of said filament carrier.

32. In a textile machine, a filament carrier comprising magnetic material, magnetic means to move the same, and oppositely moving means comprising a vibrating member having a filament passing therethrough to deflect said filament across the path of said filament carrier.

33. In a textile machine, moving magnets continuously attractive, filament carriers comprising magnetic material adapted to be moved thereby and means to deflect laterally moving filaments across the path of said filament carriers, such carriers and such filaments capable of deflection being equal in number.

34. In a textile machine, a moving magnet continuously attractive, a filament carrier comprising magnetic material adapted to be moved thereby, and means to deflect an oppositely moving filament across the path of said filament carrier.

35. In a textile machine, a magnet constantly attractive, a filament carrier adapted to be controlled by the action thereof, and means to deflect laterally moving filaments to pass under and over said filament carrier.

36. In a textile machine, magnetic means to move a filament, and travelling electromagnetically controlled vibrating means spring actuated to deflect a filament across the path of the first filament.

37. In a textile machine, two systems oppositely revolving relatively about the fabric, comprising magnetic shuttles and magnets controlling them on the one hand, filament supplies, a raceway for the shuttles and filament switches on the other hand.

38. In a textile machine, a moving magnet, a filament carrier at a distance from said magnet moved by the attraction thereof, and magnetic means to deflect a moving filament across the path of said filament carrier.

39. In a textile machine, two systems oppositely revolving relatively about the fabric, the first comprising a constant magnetic pole and a filament carrier at a distance from said pole but controlled thereby, the second comprising a raceway for said filament carrier, filament supplies, magnets, and switches for filaments operated by said magnets.

40. In a textile machine, at least two sets of filament supplies revolving in true circles, magnetically operated vibrating pattern forming means and circuit control means determining groups and cycles, in which are operated said pattern forming means, said groups and cycles being changeable by changing only said circuit control means.

41. In a textile machine, oppositely moving filament supplies and magnetically operated switch means comprising a spring pendulum member passing through a neutral or balanced position between the extremes of its travel.

42. In a textile machine, a plurality of filament supplies moving in two general directions, a switch for a particular filament from one of said supplies operable to and fro by magnetic forces and resilient means imparting to said switch spring pendulum action.

43. In a textile machine, two sets of moving filament supplies, and means to braid filaments of one set with filaments of the other set, comprising a resilient vibrating filament switch of high period alternately held at opposite ends of its throw.

44. In a textile machine, revolving filament supplies, a revolving resilient switch controlling a filament and having a high period of vibration, and opposed magnets revolving with and operating said resilient switch.

45. In a textile machine, a spring pendulum switch, for revolving filaments, of high natural period operated by opposed magnets, both magnets never being simultaneously de-energized, 46. In a textile machine, magnets, filament carriers directly receiving their motion from the forces of said magnets, a plurality of electrically controlled pattern-forming means, and circuit control means determining the cycles of their operation.

47. In a textile machine, magnets, filament carriers directly receiving their motion from the attraction of said magnets, a plurality of electrically controlled pattern-forming means, and circuit control means determining the cycles of their operation, said circuit control means having a time relation to a moving part of the machine.

48. In a textile machine, three systems of elements relatively revolving;—a first system comprising take-up means for braided fabric;—a second system comprising filament carriers magnetically revolved in one direction relatively to said first system;—a third system revolved relatively to said first system, and in the opposite direction from said second system, and comprising a filament supply, means for deflecting a filament from said supply across the path of the carriers of said second system, and a raceway for said carriers.

49. In a textile machine, filament carriers, magnetic means to revolve said carriers in one direction; rotating in the other direction, firstly a raceway for said carriers, secondly a filament supply, and means for deflecting filaments across the path of said filament carriers.

50. In a textile machine, revolving magnets, filament carriers revolving in one direction by the attraction of said magnets; rotating in the other direction, firstly a raceway for said carriers, secondly a filament supply, and means for deflecting filaments across the path of said filament carriers.

51. In a textile machine, means to generate a revolving magnetic field, filament carriers in the field revolved solely by the forces thereof in one direction; rotating in the other direction, firstly a raceway for said carriers, secondly a filament supply; and means for deflecting filaments across the path of the filament carriers.

52. In a textile machine, filament carriers, wheels on said carriers, magnetic means for revolving said carriers in one direction; rotating at one angular velocity in the opposite direction, firstly a raceway for said carriers, secondly a filament supply, thirdly, means for deflecting filaments across the path of said filament carriers.

53. In a textile machine, filament carriers, wheels on said carriers, magnetic means for revolving said carriers in one direction; mechanically connected and rotating together in the opposite direction, firstly a raceway for said carriers, secondly a filament supply, thirdly, means for deflecting filaments across the path of said filament carriers.

54. In a textile machine, filament carriers revolved in one direction; rotating in the other direction, firstly a raceway guiding said carriers in a circular path, secondly a series of filament supplies with tension devices, thirdly, magnetic means to deflect a filament across the path of said filament carriers.

55. In a textile machine, filament carriers revolved in one direction; rotating in the other direction, firstly a circular raceway of section confining said carriers, secondly, a removable portion on said raceway whereby a carrier may be released to be removed, thirdly, filament supplies, fourthly, tension devices, fifthly, magnetic means to deflect a filament across the path of said filament carriers.

56. In a textile machine, filament carriers revolved in one direction; rotating in the other direction, firstly, a track for said carriers having openings wherein filaments may lie in such manner as not to interfere with the passage of one of said carriers along said track, secondly, a series of filament supplies, thirdly, magnetic means to deflect a filament across the path of said filament carriers.

57. In a textile machine, filament carriers comprising magnetic material, and magnets adjacently revolving for revolving said carriers in one direction by attraction; rotating at one angular velocity in the opposite direction, firstly a raceway guiding said carriers, secondly a series of filament supplies, thirdly, magnetic means for deflecting a filament of said supply across the path of said filament carriers.

58. In a textile machine, filament carriers comprising magnetic material revolving in one direction, magnets adjacently revolving; rotating at one angular velocity in the opposite direction, firstly a circular raceway of section confining said carriers, secondly, a removable portion on said raceway whereby a carrier may be released to be removed, thirdly a series of filament supplies with tension devices, fourthly electrically controlled means for deflecting a filament of said supply across the path of said filament carriers.

59. In a textile machine, filament carriers comprising magnetic material revolving in one direction, magnets adjacently revolving but not in contact; rotating at one angular speed in the opposite direction, firstly a track for said carriers having depressions wherein filaments may lie to avoid interference with the passage of said carriers, secondly a filament supply, thirdly, magnetic means for deflecting a filament of said supply across the path of the filament carriers.

60. In a textile machine, magnets for producing magnetic forces, shuttles controlled by said forces, means to deflect a portion of laterally moving filament to pass over and under said shuttles; and surfaces laterally moving with said filament against which may be deflected the deflected portion of said filament to avoid friction with said shuttles.

61. In a textile machine, means to generate a magnetic field, a filament carrier in this field propelled by the forces thereof, magnetic means to deflect a filament across the path of said carrier, electrical means for controlling the operation of said magnetic means relative to the propulsion of said carrier, and surfaces laterally traveling with said filament against which said filament may be deflected.

62. In a textile machine, a filament carrier moved by magnetic forces undeviatingly in a circular path, a magnetically controlled resilient switch to deflect a filament across said path, and surfaces traveling with said filament on which said filament may contact.

63. In a textile machine, a magnet to generate a field, a filament carrier in this field propelled by the forces thereof, means to throw a laterally traveling filament to and fro across the path of said carrier, a surface traveling with said filament against which it may be pressed at the extreme of the throw.

64. In a textile machine, a filament carrier having wheels or rollers, magnets attracting the same in one direction; moving in a generally opposite direction, firstly surfaces run upon by said wheels or rollers, secondly a filament supply, thirdly means for pressing a filament against said surfaces while passing said carrier.

65. In a textile machine, magnets, shuttles as armatures controlled by said magnets through a distance, a revolving track holding the shuttles distant from said magnets, and a bobbin attached to or revolving with said track.

66. In a textile machine, magnets, shuttles as armatures therefor, a revolving shuttle track maintaining a magnetic separation between said magnets and said shuttles, bobbins carrying filaments and revolving with said track, and switches deflecting said filaments to pass through said magnetic separation between said magnets and shuttles.

67. In a textile machine, a source of driving power, a magnetic filament carrier, magnetic means for moving said carrier in a circle, an oppositely revolving filament supply, and a filament switching means.

68. In a textile machine, a driving means, a filament supply and a circular track mechanically revolved together by said driving means, a shuttle on the track, magnetic means to hold the shuttle against the motion of the track, and switching means for a filament.

69. In a textile machine, driving means for the machine, a filament carrier magnetically propelled along a constraining guideway of different velocity, and filament supplies moving oppositely to said carrier and fixed in relative position to each other.

70. In a textile machine, a source of mechanical driving power, a filament carrier continuously moved by magnetism, and filament supplies oppositely moving and fixed in relative location to each other.

71. In a textile machine, a driving motor, a circular shuttle track revolved thereby, a group of filament-carrying bobbins on or connected to said track and revolving therewith, likewise on said track but held by magnetic forces against revolving with it a shuttle carrying a filament, and means to cross filament from the bobbins with the filament from the shuttle.

72. In a textile machine, a driving motor, two sets of filament carriers adapted to revolve in opposite directions, and magnetic means for revolving one set undeviatingly in a circular path.

73. In a textile machine, two sets of filament carriers adapted to revolve in opposite directions, magnetic means for revolving the carriers of one set undeviatingly in a circular path comprising continuously energized magnets revolving adjacent but not touching said carriers.

74. In a textile machine, at least two sets of filament supplies adapted to revolve in opposite directions, carriers for at least one set of said supplies, magnetic means for moving said carriers in a circular path, comprising magnets separated from said carriers by a space, and a member of non-magnetic material in said space having a motion different from the motion of said carriers.

75. A textile machine having magnetically revolved shuttles, a driving means, bodily revolving thread deflecting means magnetically controlled, magnets to revolve the shuttles, different magnets controlled by electrical impulses to control the thread deflecting means, and means having a time relation to the driving means to govern said impulses.

76. In a textile machine, means to revolve a filament, an electromagnet to deflect a filament, means to consolidate the fabric, an electromagnet to operate the last-mentioned means at intervals as required by the pattern of the fabric, and common circuit control means for both electromagnets.

77. In a textile machine, a circuit changer, means for braiding a pattern, magnets to control the braided pattern under the control of said circuit changer, beater means for consolidating the fabric, other magnets operating said beater means at intervals as required by the pattern and under the control of said circuit changer.

78. In a textile machine, magnetic means to move a shuttle, means to move a filament supply, means to cross filaments from the supply and from the shuttle to form a fabric, a pattern control means determining the action of the filament crossing means according to a pattern, a beater mechanism for varying the appearance of the pattern of the fabric, an electromagnet to operate said beater mechanism, and means associated with the pattern control means to control said electromagnet.

79. In a textile machine, electrically operated fabric producing elements comprising magnetic shuttles, a bobbin on a moving support, a filament switch, and an electrically operated beater element to consolidate the fabric.

80. In a textile machine, means continuously to move two filament supplies, a magnet to deflect across the path of one supply filament drawn from the other, beater mechanism, a magnet to operate said beater mechanism, and a circuit changer to control both magnets.

81. In a textile machine, two filament supplies, means continuously to move said filament supplies, means to deflect across the path of the one a filament drawn from the other, electrically controlled beater and take-up mechanisms, and a circuit changer to operate both mechanisms.

82. In a textile machine, in combination, means to move oppositely two sets of filaments, means to cross one with the other to produce a fabric, and means for producing alternate tight and loose areas in the fabric in predetermined patterns comprising electrically controlled beater elements and circuit changing means controlling said beater elements in desired cycles.

83. In a textile machine, a plurality of electrically controlled beater elements and an electrically controlled take-up means, circuit changing means individually controlling said beater elements and said take-up means in desired cycles to produce a pattern of tight and loose areas in the fabric.

84. In a textile machine, filament switching means, beater means, take-up means, and coordinated pattern controller means determining the operation of said switching, beater and take-up means.

85. In a textile machine, a bobbin, means continuously to move said bobbin, a shuttle, magnetic means continuously to move said shuttle, means to deflect filament from the bobbin across the path of the shuttle, magnetic beater and take-up means, and a circuit changer to control the three aforesaid magnetic means.

86. In a textile machine, a drive shaft and source of power, a circuit changer operatively connected with said shaft, filament carriers comprising magnetic material, magnets attracting said carriers, a moving filament supply, means to deflect filament from said supply to pass over and under said carriers to form a fabric, and electromagnetically operated take-up mechanism for said fabric, controlled by said circuit changer.

87. In a textile machine, a drive shaft, a contact operatively connected therewith, a source of electricity, filament carriers comprising magnetic material, magnets attracting said carriers, a moving filament supply, means to deflect filament from said supply to pass over and under said carriers to form a fabric, an electromagnet, and take-up means for said fabric operated by said electromagnet.

88. In a textile machine, magnets, revolving shuttles as armatures, an oppositely revolving frame carrying bobbins, means to pass a bobbin filament around a shuttle to form a fabric, step-by-step take-up means for said fabric, and a magnet to operate said take-up means.

89. In a textile machine, a pattern controller, a magnet, and step by step take-up mechanism adapted to be operated by said magnet at intervals predetermined by said pattern controller.

90. In a textile machine, means for interlacing filaments to produce a fabric, means for taking up said fabric while it is being produced, at speeds differing at different spots of the pattern, comprising a take-up roll and at least one electromagnet controlling said roll, pattern control mechanism, and means associated therewith for operating said electromagnet.

91. In a textile machine, means to revolve a plurality of threads comprising a revoluble carriage, a thread supply mounted thereon, a raceway for said carriage, an armature on said carriage, magnets revolving in a path adjacent said raceway; magnetically controlled means to deflect one of said threads across the path of revolution of another of said threads.

92. In a textile machine, means to revolve a plurality of filaments comprising a rotatable table, a raceway forming part of said table, a thread carrier operating in said raceway, revolving magnets to revolve said carrier, a second revolving carrier mounted on said table; means to cause the thread from said second carrier to deflect across the thread from said first carrier comprising an electromagnet mounted on said table and rotatable therewith.

93. In a textile machine, means to revolve a plurality of filaments comprising a rotatable table having a raceway, a thread carrier operating in said raceway, revolving magnets to revolve said carrier, and a second revolving carrier mounted on said table; means to cause thread from said second carrier to vibrate across the path-way of said first carrier comprising an electromagnet mounted on said table adjacent said raceway, and an armature having a thread passing therethrough, said armature being vibrated by said electromagnet.

94. In a textile machine, means to revolve a plurality of filaments comprising a rotatable table having a raceway hereon, a filament carrier operating in said raceway, a magnetic device operating adjacent said raceway to revolve said carrier, and magnetically controlled means for causing one filament to cross the path of another filament comprising an armature serving to guide the first filament; opposed magnets mounted on said table and adapted to cause said armature and thereby said thread to vibrate therebetween.

95. In a textile machine, means to revolve a plurality of filaments, comprising a rotatable table, a filament carrier riding thereon, a magnetic device for revolving said filament carrier independently of the rotation of the table, a support for said magnetic device mounted substantially concentrically with said table, and means to cause one of said filaments to deflect across the path of the filament carrier.

96. In a textile machine, a rotatable turret, a filament carrier adapted to revolve about said turret, a projecting rim on said turret forming part of a guiding raceway for said carrier, a rotatable magnetic device mounted substantially concentrically with said turret to revolve said carrier, a filament supply revolving oppositely to said filament carrier, and means to move a filament from said supply across the path of said filament carrier.

97. In a textile machine, a rotatable table having a raceway with inclined walls, a rotatable magnet support positioned within the walls of said table, a magnet positioned on said support, a filament carrier comprising an armature mounted in said raceway and adapted to be driven along said raceway by said magnet, a filament supply moving oppositely to said filament carrier and means to deflect one filament across the pathway of another filament.

98. In a textile machine, means to revolve a plurality of filaments comprising a rotatable table, a raceway including sloping plates attached to said table and guide members co-operating therewith, a filament carrier having portions thereof contacting with the sloping plates and guide members of said raceway, a magnet support rotatably mounted above said table and within said plates, a magnetic device mounted on said magnet support and adapted to cause said filament carrier to revolve, and means to deflect one of said filaments across the path of another of said filaments.

99. In a textile machine, means to revolve a plurality of filaments comprising a rotatable table having an upturned angularly disposed rim and a channel in said rim, a frustum-shaped wall mounted on said rim, an inclined filament carrier having a portion bearing against said wall and another portion traveling in said channel, and a rotatable magnetic device positioned within said wall and adapted to cause said filament carrier to revolve, and means to deflect one of said filaments across the pathway of another of said filaments.

100. In a textile machine, means to revolve a plurality of filaments comprising a rotatable table having an upturned angularly disposed rim and a channel in the rim, a substantially frustum-shaped wall rising above said channel, an annular band substantially concentric with said wall and supported above said channel, a filament carriage having a rotatable member adapted to travel in said channel, and a second rotatable member adapted to be partially supported by said wall and partially supported by said band, said filament carriage comprising magnetic material, and a magnetic device rotatably mounted adjacent said channel and adapted to cause said filament carriage to revolve, and means to deflect one of said filaments across the path of another of said filaments.

101. In a textile machine, means to revolve a plurality of filaments comprising a rotatable table having an upturned angularly disposed rim and a channel in said rim, segmental sloping plates attached to the inner wall of said channel, said plates constituting spaced frusta, a band secured to the under-surface of the plates and forming with the spaces therebetween recesses for the reception of thread, a ring supported above said channel and serving as a guide member, said ring being provided with grooves on the inner periphery thereof substantially radially alined with the spaces between said plates, a filament carriage, rotatable magnetic mechanism for causing the revolution of said filament carriage, and means to deflect one of said filaments across the path of another of said filaments.

102. In a textile machine, means to revolve a plurality of filaments comprising a rotatable table having an upturned angularly disposed rim, and a channel in said rim, said channel being provided with a V-shaped groove, a wall rising above said channel, an annulus rising above said channel and substantially concentric with said wall, a filament carriage having rotating members positioned at the top and bottom thereof, the top members contacting with the upper portion of said wall and said annulus, the lower members lying in said channel, said annulus being removable, whereby said filament carriage may be swung about said V-shaped groove to permit the removal of said carriage, and magnetic means adapted to revolve said carriage, and means adapted to deflect one of said filaments across the path of another of said filaments.

103. In a textile machine, a rotatable table, a magnet to generate a field, a filament carriage revolubly supported by said table lying in said field and propelled by the forces thereof about said table, a filament carrier secured to said table and revoluble therewith, and means to deflect filament drawn from said carrier across the path of said carriage.

104. In a textile machine, means to revolve a plurality of filaments comprising a rotatable table having a raceway associated therewith, a filament carrier supported in said raceway, magnetic means rotating adjacent said raceway and adapted to revolve said filament carrier, a second filament carrier secured to said table, and means to vibrate the thread from said second mentioned carrier back and forth across said raceway.

105. In a textile machine, means to revolve a plurality of filaments comprising a rotatable table having a raceway associated therewith, a filament carrier supported in said raceway, magnetic means rotating adjacent said raceway and adapted to revolve said filament carrier, a second filament carrier secured to said table, a slot in said raceway, the filament from said second filament carrier being adapted to pass through said slot, and means to deflect the filament from said second carrier in said slot across the path of the filament from said first mentioned carrier.

106. In a textile machine, a rotatable table provided with a raceway, a series of filament carriers mounted to revolve in a direction opposite to the rotation of said table, each of said filament carriers being mounted to revolve about said table, a rotatable magnet support, a series of magnets about said support adapted to move said carriers, a support for a second series of filament carriers, said support being secured to said table, and a series of filament engaging arms for deflecting one of said filaments across the path of another of said filaments to thereby cause interweaving.

107. In a textile machine, a rotatable table provided with a raceway, said raceway comprising a channel in an offset portion of said table, a wall rising above said channel and a guide bar situated above said channel and spaced from said wall, a series of filament carriers mounted to revolve in a direction opposite to the rotation of said table, magnetic means rotating adjacent said raceway adapted to cause the revolution of said series of carriers, a second series of filament carriers mounted on means secured beneath said table, and a series of filament-engaging members secured to said table, the number of filament-engaging members being equal to the number of filament carriers in the second series, said engaging members being adapted to deflect the filament engaged by each across the path of a filament revolved by one of the first mentioned series of filament carriers.

108. In a textile machine, means to revolve a plurality of filaments comprising a filment carrier, a magnetic device adapted to revolve said carrier comprising a magnet rotatably mounted adjacent said carrier, a carrier for a second filament, and magnetically controlled means to deflect the filament from said second carrier across the path of the filament of the first mentioned carrier comprising a reed having an aperture in one end thereof adapted to engage said second filament, said reed being provided with magnetic material and a magnet adapted to cause said reed to deflect said thread.

109. In a textile machine, means to revolve a plurality of filaments, comprising a rotatable table provided with a raceway, a filament carrier in said raceway, a magnetic device adapted to revolve said carrier, a second filament carrier secured to said table and rotatable therewith, an armature having thread engaging means secured to said table adjacent said raceway, and a magnet positioned adjacent said armature and adapted to cause said armature to move and thereby deflect one of said filaments across the pathway of another of said filaments.

110. In a textile machine, means to revolve a plurality of filaments comprising a rotatable table having an upturned angularly disposed rim, a raceway about said rim, a filament carrier in said raceway, a magnetic device adapted to revolve said carrier about said raceway, a second filament carrier secured to said table, a filament-engaging member comprising magnetic material, and a plurality of oppositely disposed magnets mounted on said rim, said filament engaging member being adapted to pass back and forth between said magnets to cause said filaments to vibrate across said raceway.

111. In a textile machine, means to revolve a plurality of filaments comprising a rotatable table, a filament carrier, a magnetic device mounted adjacent and rotatable in an opposite direction, said table being provided with a raceway adjacent the rim thereof, said magnetic device being adapted to cause the revolution of said carrier, a second filament carrier supported below said table, a substantially radial slot in said table, the filament from said second carrier passing upwardly through said slot, a pair of oppositely disposed magnets, and a reed member having an aperture in one end thereof for the reception of the thread from said second filament carrier and being provided adjacent the other end thereof with an armature adapted to be attracted and carried back and forth between the poles of said oppositely disposed magnets to thereby cause said second filament to vibrate across said raceway and to interweave with the filament from said first mentioned carrier.

112. In a textile machine, means to revolve a plurality of filaments comprising a filament carrier, a rotatable magnetic device adapted to cause the revolution of said carrier, means to supply a constant flow of current to said magnetic device, and means to deflect one of said filaments across the path of revolution of another of said filaments comprising an electromagnetic device and means for establishing and disestablishing a flow of current through said magnetic device to alternately move one of said filaments toward said device and to release it therefrom.

113. In a textile machine, means to revolve a plurality of filaments comprising a filament carrier, a rotatable magnetic device adapted to cause said filament carrier to revolve, means to supply a continuous flow of current to said magnetic device comprising a source of electrical energy, and rotatable conductors adapted to establish a circuit through said magnetic device, and means to deflect one of said filaments across the path of another of said filaments comprising a filament-engaging member including magnetic material, a magnet adapted to actuate said member, and means to establish and disestablish a flow of current through said magnet including a source of current and rotatable contact members connected therewith, one of said contact members being in the form of insulated segments whereby upon making and breaking of contact with said segments said magnet will be energized and de-energized to attract and release said filament-engaging member.

114. In a textile machine, means to revolve a plurality of filaments comprising a rotatable table, a support for said table comprising a base and a central shaft, a revoluble filament carrier, a magnet, a support for said magnet rotatably mounted about said central shaft, said magnet being adapted to cause the revolution of said carrier, a second filament carrier mounted on said table, means adapted to rotate said table in one direction, means to revolve said magnet and thereby also said first mentioned filament carrier in an opposite direction, and means adapted to deflect one of said filaments across the path of another of said filaments.

115. In a textile machine, means to revolve a plurality of filaments comprising a rotatable table, a support for said table comprising a base and a centrally mounted shaft, a filament carrier mounted to revolve about said table, a magnet support mounted on one end of said shaft and gearing connected with an outside source of power adapted to drive said magnet support, said table being provided with gearing connected with said outside source of power adapted to be driven in an opposite direction to said magnets, a second filament carrier mounted beneath said table and rotatable therewith, and means adapted to deflect one of said filaments across the path of another of said filaments.

116. In a textile machine, means to revolve a plurality of filaments comprising a rotatable table, a support for said table comprising a framework and a centrally mounted shaft, a filament carrier revolubly mounted upon said table, a magnetic device mounted on one end of said shaft adapted to cause the revolution of said filament carrier, a second filament carrier mounted on said table, oppositely disposed magnets, a filament-engaging device controlled by said magnets adapted to deflect one of said filaments across the path of another of said filaments, means adapted to supply a continuous flow of current to said magnetic device and to establish and disestablish flow of current alternately through said magnets comprising a plurality of contact rings mounted about said shaft, brushes mounted on said framework adapted to contact with said rings, said brushes and rings being adapted to establish a continuous circuit through the magnetic device, the two sets of commutator segments and rings connecting said oppositely disposed magnets respectively, and brushes coacting therewith, said brushes, segments and rings being adapted to make and break circuit through their respective magnets.

117. In a textile machine, a filament carrier as an armature, a magnet controlling the same constantly attractive, revolving filament supplies and filament switches whereby filaments from said supplies are passed over and under said carriers, and magnetically controlled means for removing the fabric from the braiding point.

118. In a textile machine, a revolving raceway, filament supplies revolving in the same direction, filament carriers as armatures revolving and upon said raceway in an opposite direction, magnets acting upon said carriers, and magnetic take-up means for the fabric, comprising a roll for the fabric to pass over, and a magnet to rotate the roll.

119. In a textile machine, a plurality of filament carriers, means oppositely to revolve them comprising magnetic material in one of said carriers and a magnet acting thereon, a raceway revolving oppositely to the carrier having magnetic material, and means magnetically controlled to consolidate the fabric comprising a magnet near the braiding point and a beater element movable by the latter magnet.

120. In a textile machine, in combination means to revolve a plurality of filaments comprising a filament carrier and a magnetic device for revolving said carrier; magnetically controlled means for removing the fabric from the point of weaving comprising a roll over which the fabric travels, and a magnetic device for causing the rotation of said roll; and magnetically controlled beater means comprising a beater arm located adjacent the point of weaving, and a magnetic device for causing the operation of said beater arm; said magnetic devices for revolving said filament carrier, for operating said rolls, and for rotating said beater arm being connected to a common source of power.

121. In a textile machine, a thread carrier, a track for the same, a source of mechanical power, magnetic means for smoothly driving said carrier on said track, means to deflect a thread across the path of said carrier comprising a pivoted member with its pivoting axis directed toward the braiding point, a guide for said deflected thread on said member, and another guide for said thread substantially in the line of the aforesaid pivoting axis.

ARTHUR H. ADAMS.